United States Patent
Tanaka et al.

[11] Patent Number: 6,072,558
[45] Date of Patent: *Jun. 6, 2000

[54] ELECTROOPTICAL ELEMENT SWITCHABLE BETWEEN A PLURALITY OF METABSTABLE STATES

[75] Inventors: Takaaki Tanaka; Yuzuru Sato, both of Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/872,288

[22] Filed: Jun. 9, 1997

Related U.S. Application Data

[60] Continuation of application No. 08/547,634, Oct. 24, 1995, abandoned, which is a division of application No. 08/093, 290, Jul. 15, 1993, Pat. No. 5,488,499.

[30] Foreign Application Priority Data

| Jul. 16, 1992 | [JP] | Japan | 4-189436 |
| Jul. 23, 1992 | [JP] | Japan | 4-197034 |
| Aug. 17, 1992 | [JP] | Japan | 4-217931 |
| Oct. 1, 1992 | [JP] | Japan | 4-263836 |
| Dec. 18, 1992 | [JP] | Japan | 4-339051 |
| Jul. 14, 1993 | [JP] | Japan | 5-195601 |

[51] Int. Cl.$^7$ .............. G02F 1/13; C09K 19/02
[52] U.S. Cl. .................... 349/179; 349/160
[58] Field of Search .............. 359/102, 93, 55, 359/63; 345/87; 349/33, 179, 180, 175, 160

[56] References Cited

U.S. PATENT DOCUMENTS

| 3,837,730 | 9/1974 | Hatfield et al. ................ 350/160 LC |
| 4,239,345 | 12/1980 | Berreman et al. ............... 350/331 R |
| 4,333,708 | 6/1982 | Boyd et al. ..................... 350/346 |

(List continued on next page.)

FOREIGN PATENT DOCUMENTS

| 1010136 | 5/1977 | Canada . |
| 0155033 | 9/1985 | European Pat. Off. . |
| 0 197 743 | 10/1986 | European Pat. Off. . |
| 0 285 402 | 10/1988 | European Pat. Off. . |
| 0 300 755 | 1/1989 | European Pat. Off. . |
| 0 379 326 | 7/1990 | European Pat. Off. . |
| 0 422 904 | 4/1991 | European Pat. Off. . |

(List continued on next page.)

OTHER PUBLICATIONS

Matsumoto, et al. "Liquid Crystals: Basics And Application", Kogyo Chosakai Publishing Co., Ltd. 1991, pp. 66–77.

Robert B. Meyer and R.N. Thurston entitled, "Discovery Of DC Switching Of A Bistable Boundary Layer Liquid Crystal Display", Applied Physics Letters, vol. 43(4), pp. 342–344, (Aug. 15, 1983).

D.W. Berreman entitled, "Numerical Modeling Of Twisted Nematic Devices", Bell Laboratories, New Jersey; Phil. Trans. R. Soc. Lond. A, pp. 203–216, 1983.

(List continued on next page.)

*Primary Examiner*—Kenneth Parker

[57] ABSTRACT

A display characteristic of a high contrast ratio and a high transmittance through the application of a chiral nematic liquid crystal medium switchable between metastable states via Frederick's transition is utilized as a liquid crystal electrooptical element. The electrooptical element employs a white light source and is switchable between metastable states in which the polarization axes of both polarization plates are set to predetermined angles P and A according to the initial state of the liquid crystal medium and the product, R, of the thickness, d, and the difference, $\Delta n$, in the refractive indices of the liquid crystal medium for extraordinary light, $n_e$, and ordinary light, $n_o$ ($\Delta n = n_e - n_o$).

22 Claims, 10 Drawing Sheets

U.S. PATENT DOCUMENTS

| | | |
|---|---|---|
| 4,367,924 | 1/1983 | Clark et al. . |
| 4,411,496 | 10/1983 | Nonomura et al. . |
| 4,505,548 | 3/1985 | Berreman et al. ............... 350/346 |
| 4,529,271 | 7/1985 | Berreman et al. ............... 350/333 |
| 4,566,758 | 1/1986 | Bos ............................... 350/346 |
| 4,582,396 | 4/1986 | Bos et al. ................... 350/347 E |
| 4,601,542 | 7/1986 | Meyer ........................... 350/334 |
| 4,601,543 | 7/1986 | Boyd et al. .................... 350/334 |
| 4,601,544 | 7/1986 | Cheng et al. ................... 350/334 |
| 4,634,229 | 1/1987 | Amstutz et al. ................ 350/346 |
| 4,664,483 | 5/1987 | Van Sprang et al. ........... 350/346 |
| 4,701,026 | 10/1987 | Yazaki et al. . |
| 4,717,243 | 1/1988 | Boyd et al. .................... 350/332 |
| 4,770,500 | 9/1988 | Kalmanash et al. ......... 350/345 E |
| 4,850,676 | 7/1989 | Yazaki et al. . |
| 5,095,376 | 3/1992 | Umeda et al. . |
| 5,189,535 | 2/1993 | Mochizuki et al. . |
| 5,287,205 | 2/1994 | Yamazaki et al. . |
| 5,488,499 | 1/1996 | Tanaka et al. .................. 349/177 |

FOREIGN PATENT DOCUMENTS

| | | |
|---|---|---|
| 0 479 530 | 4/1992 | European Pat. Off. . |
| 0 536 975 | 4/1993 | European Pat. Off. . |
| 59-58420 | 4/1984 | Japan . |
| 59-219720 | 12/1984 | Japan . |
| 60-196728 | 10/1985 | Japan . |
| 3-26368 | 4/1991 | Japan . |
| 3177817 | 8/1991 | Japan . |
| 2 117 157 | 10/1983 | United Kingdom . |
| 211717 | 10/1983 | United Kingdom . |
| 2 233 106 | 1/1991 | United Kingdom . |

OTHER PUBLICATIONS

IEEE Transcations on Electron Devices, vol. 36, on.9–I, Sep. 1989 New York, US, pp. 1895–1899, "Ferroelectric Liquid–Crystal Video Display", W.J.A.M. Hartmann.

M. Schadt and W. Helfrich entitled, "Voltage–Dependent Optical Activity of A Twisted Nematic Liquid Crystal", Applied Physics Letters, vol. 18(4), pp. 127–128 (1971).

T.J. Scheffer and J. Nehring "A New, Highly Multiplexable Liquid Crystal Display",. Applied Physics Letters, vol. 45(10), pp. 1021–1023 (Nov. 15, 1984).

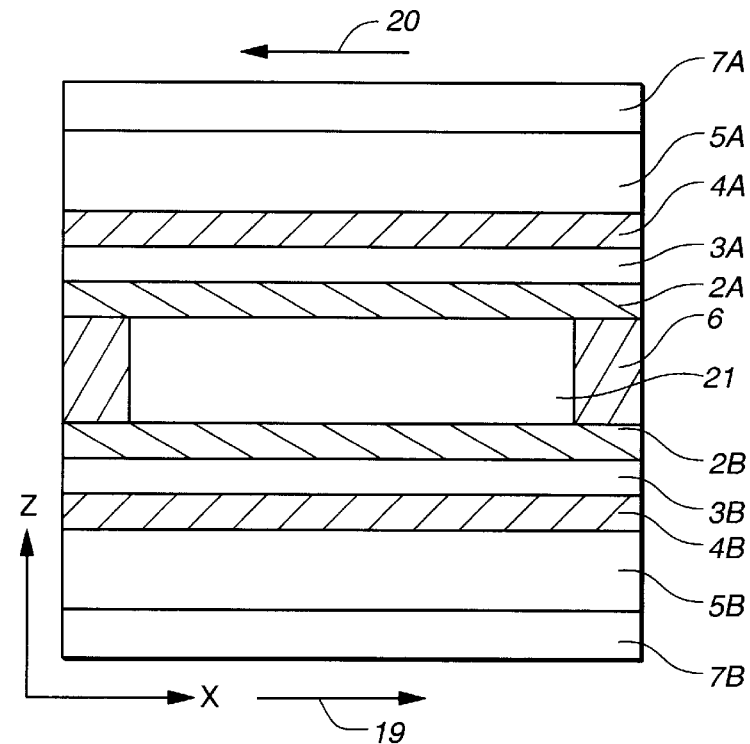
FIG._1
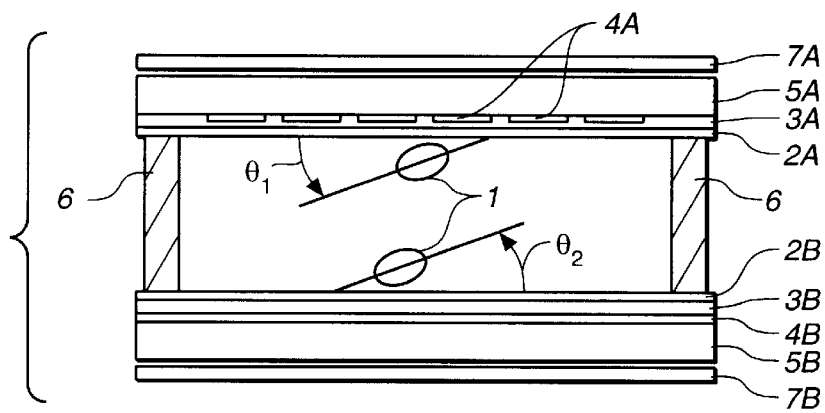
FIG._2
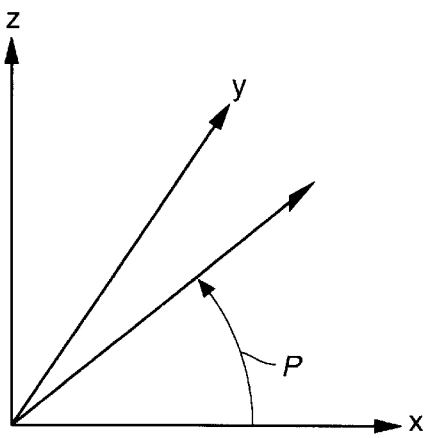
FIG._3

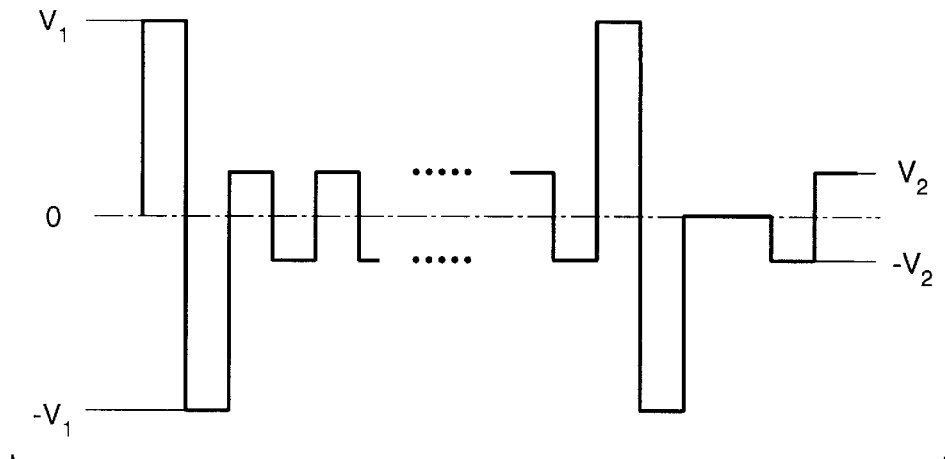
FIG._4
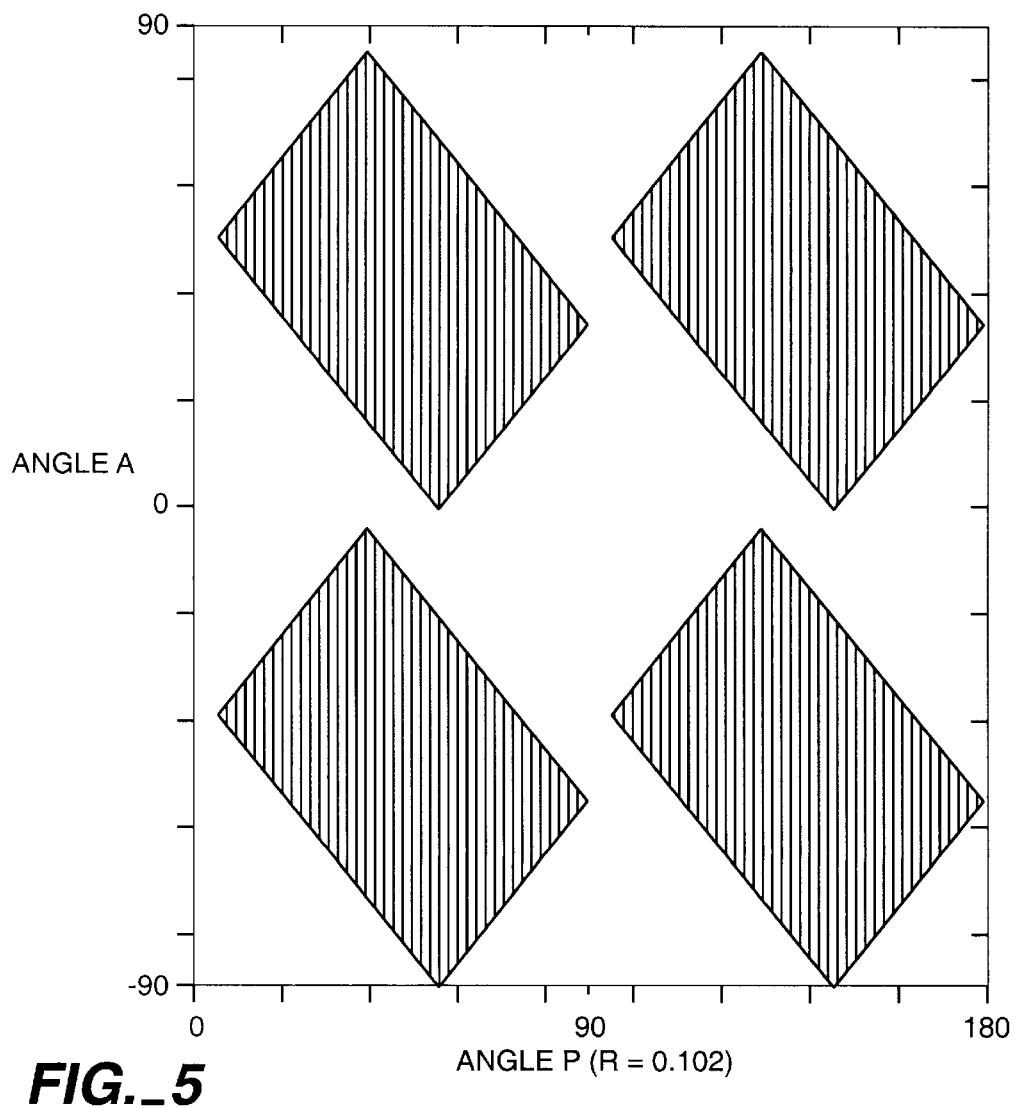
FIG._5

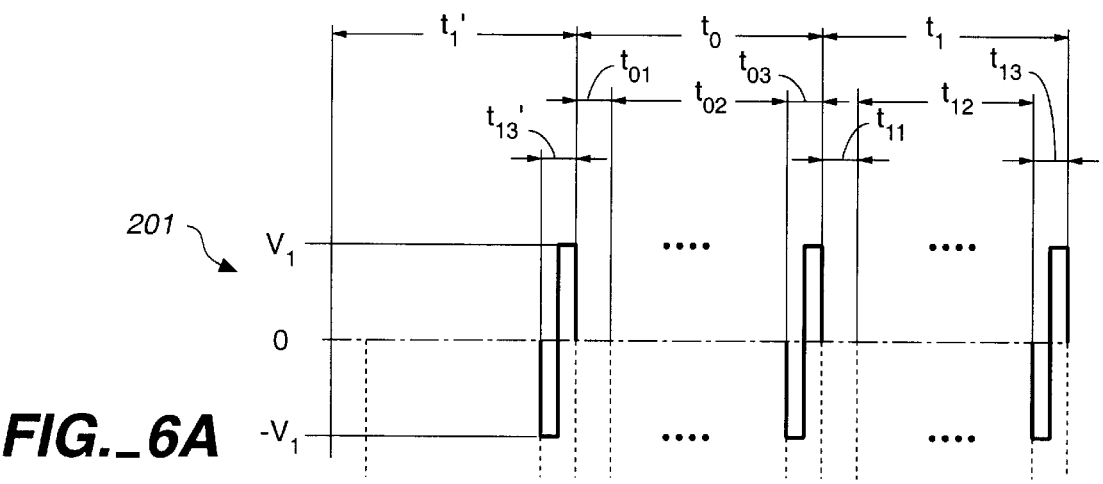
FIG._6A
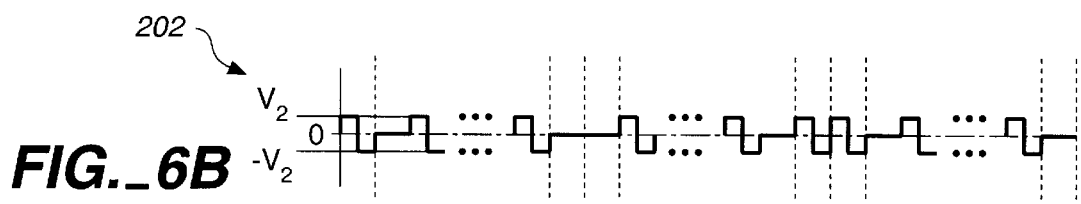
FIG._6B
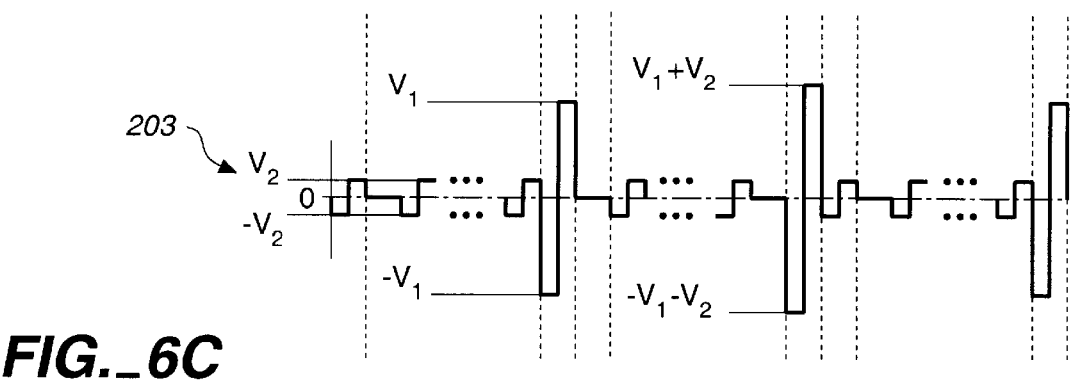
FIG._6C
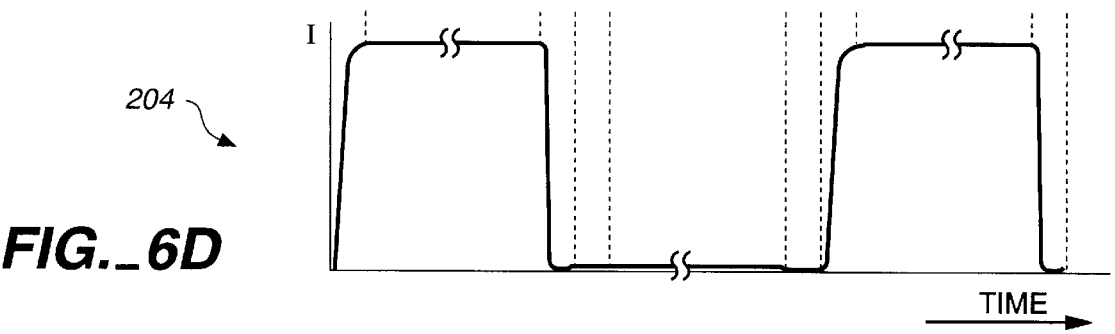
FIG._6D

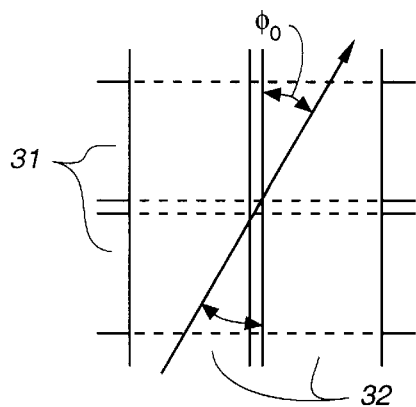
FIG._7
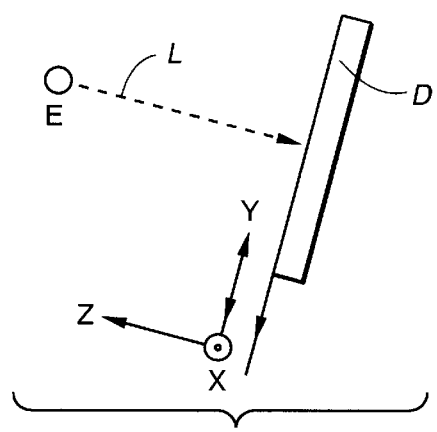
FIG._9
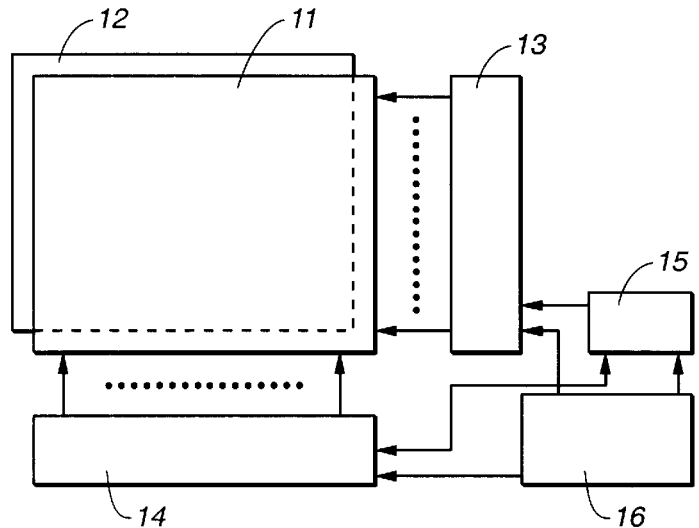
FIG._8
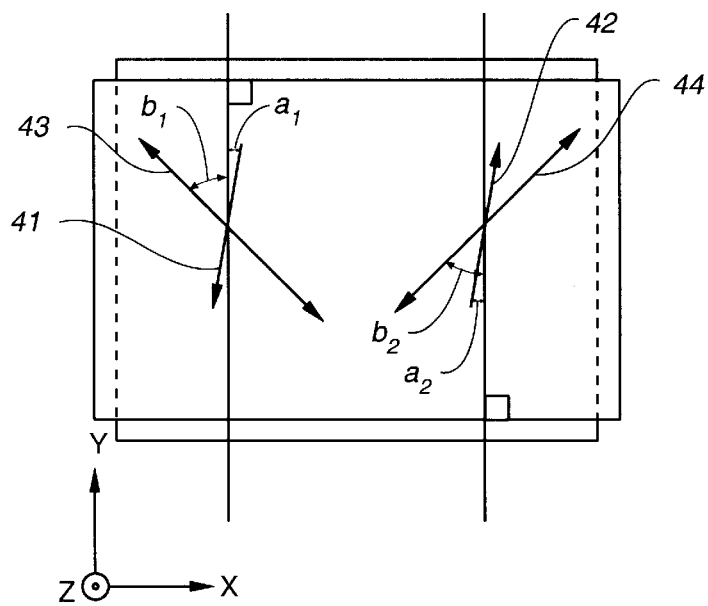
FIG._10

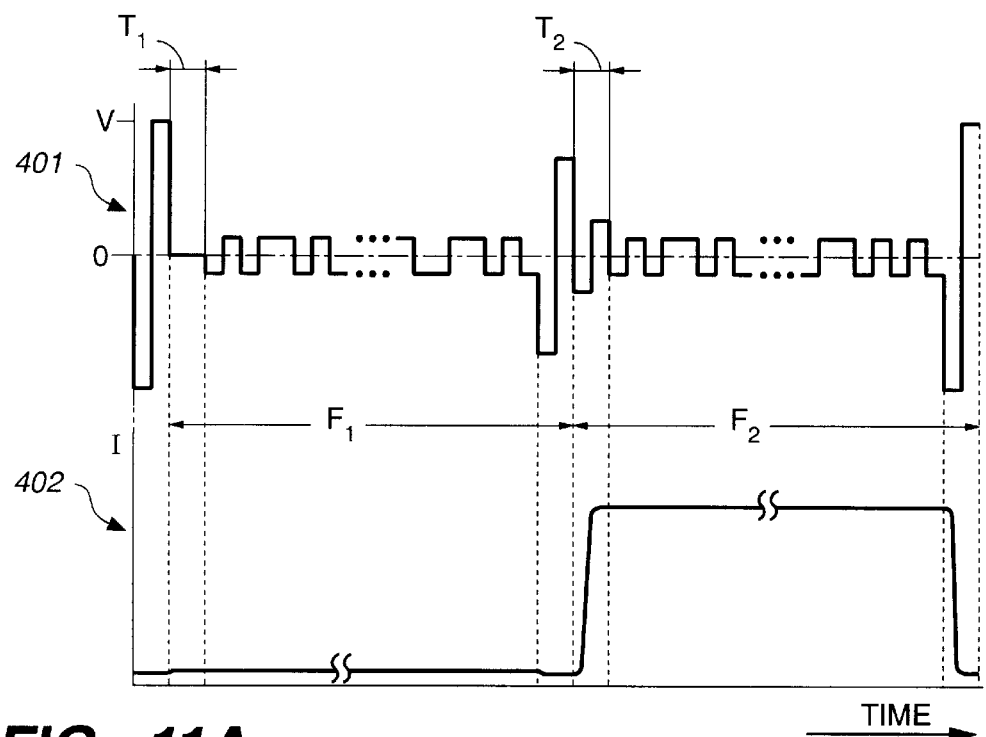
FIG._11A
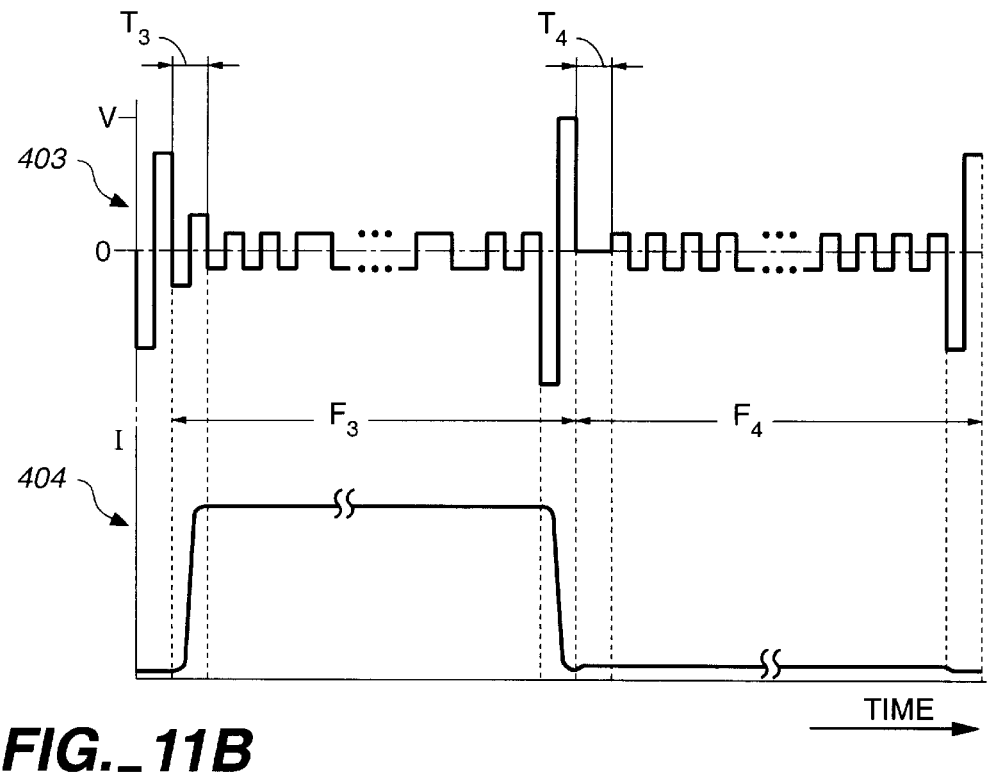
FIG._11B

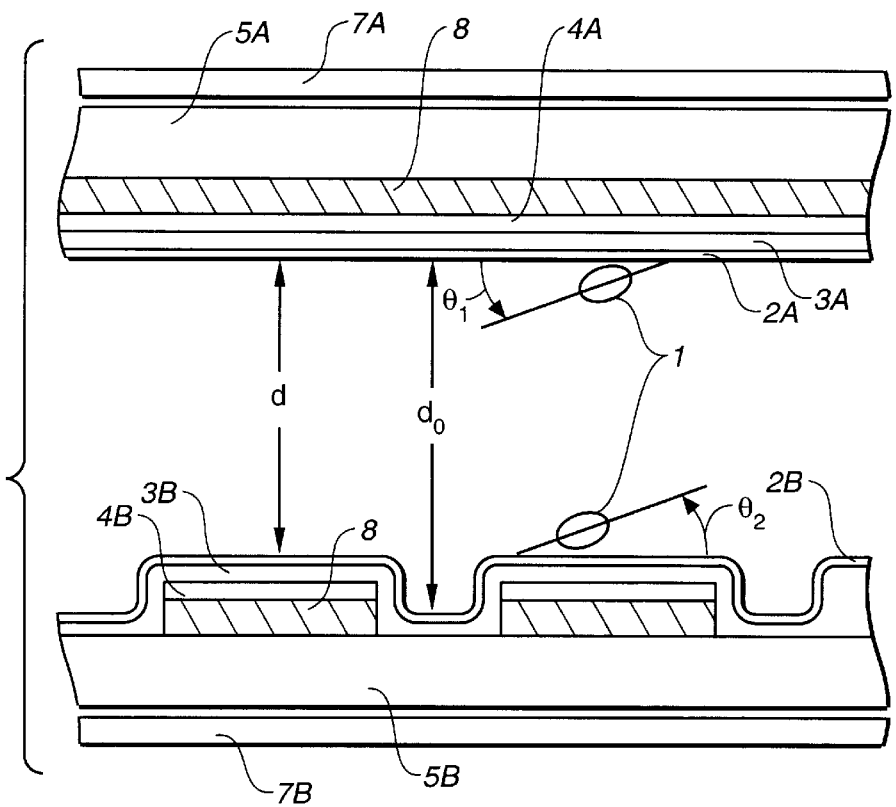
FIG._12
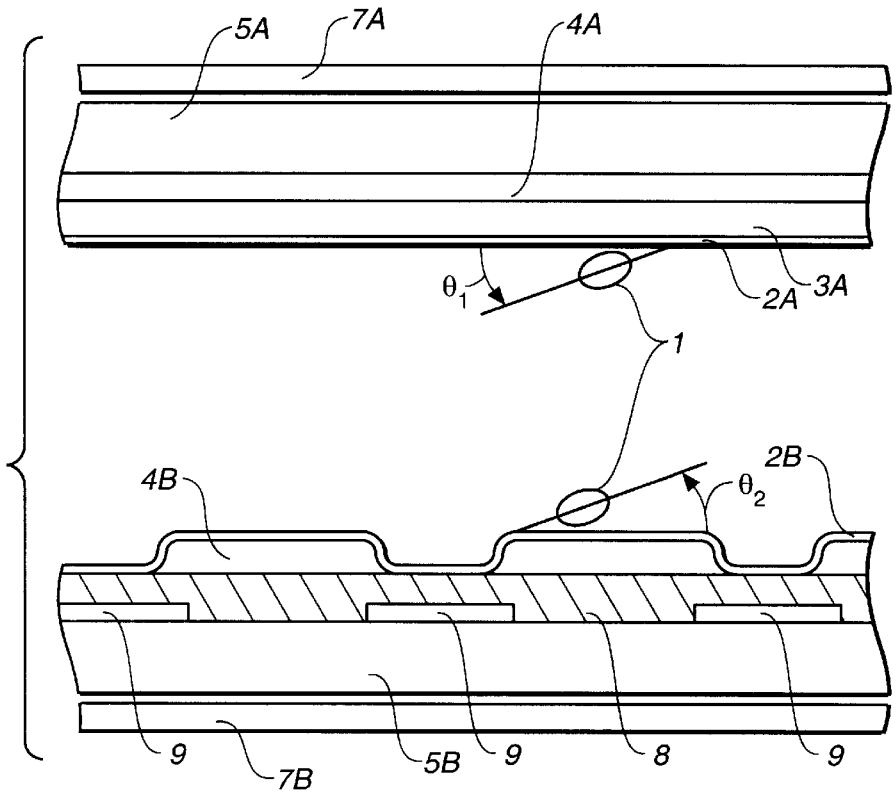
FIG._14

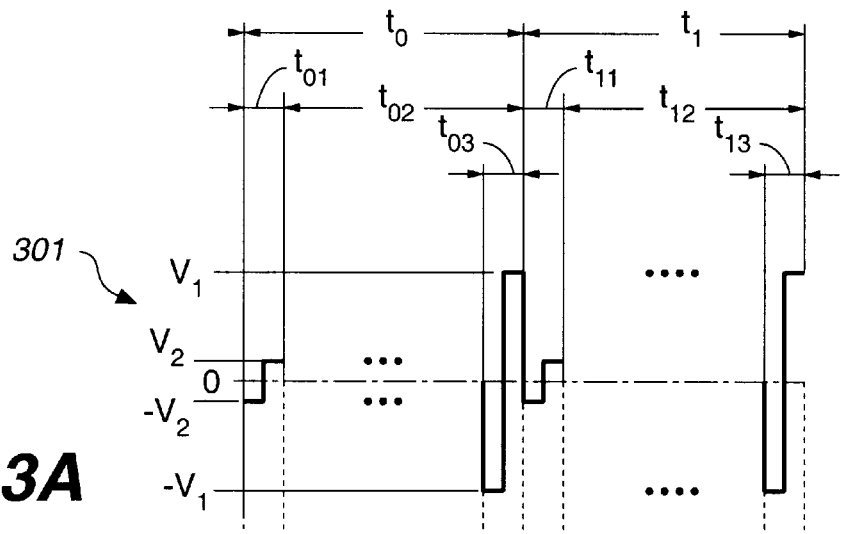
FIG._13A
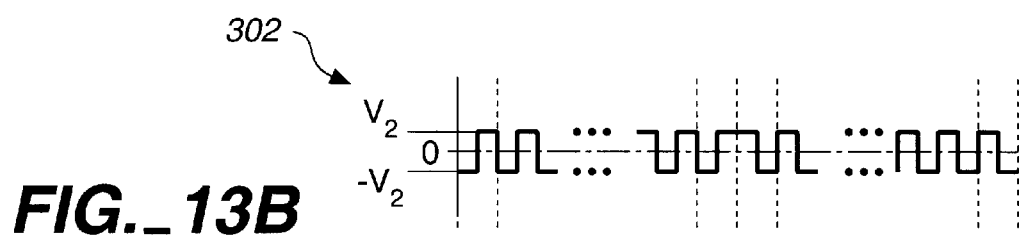
FIG._13B
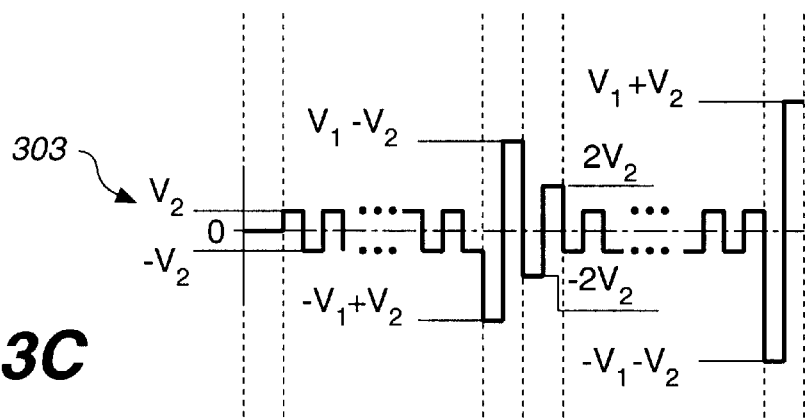
FIG._13C

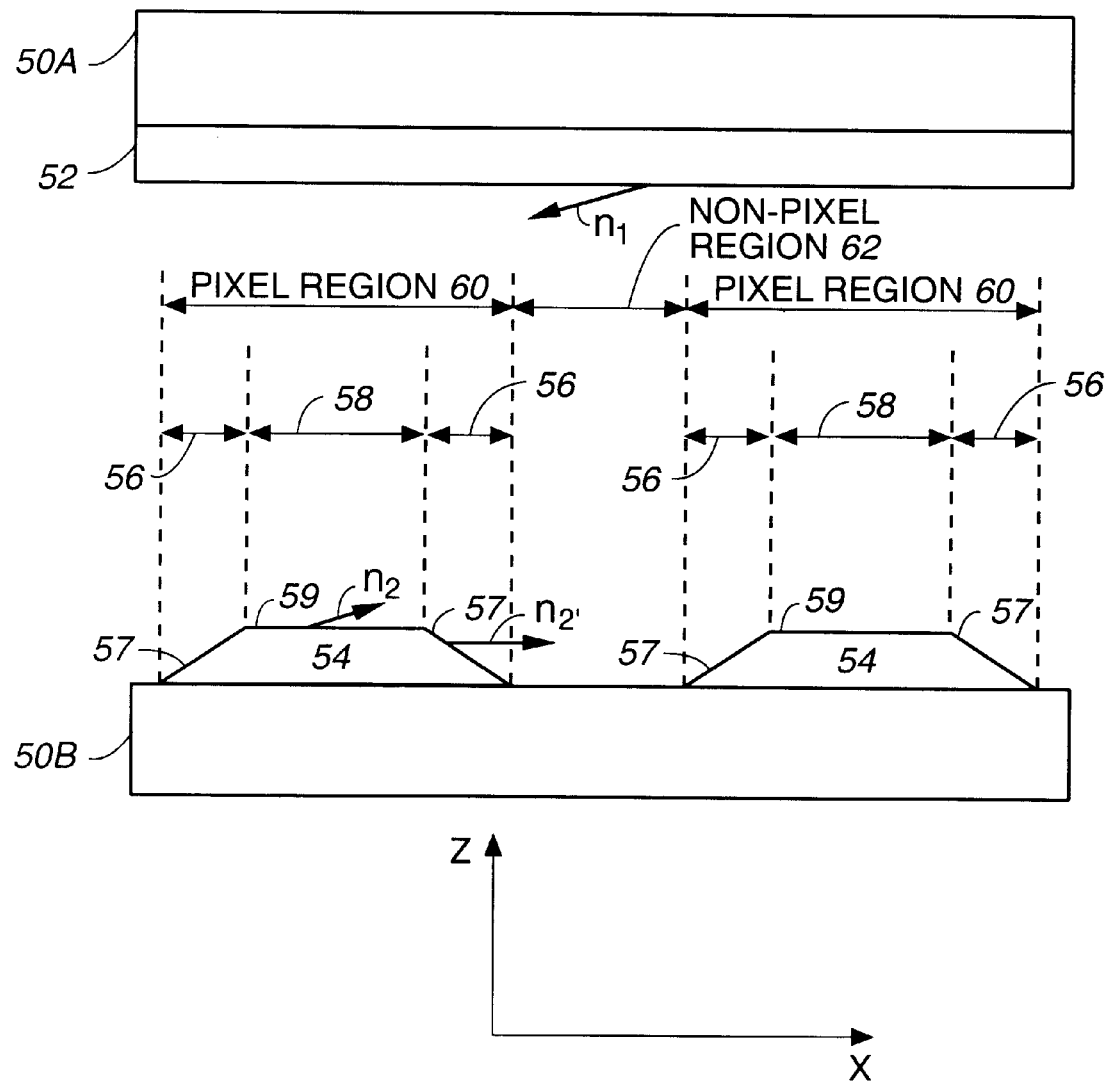
FIG._15

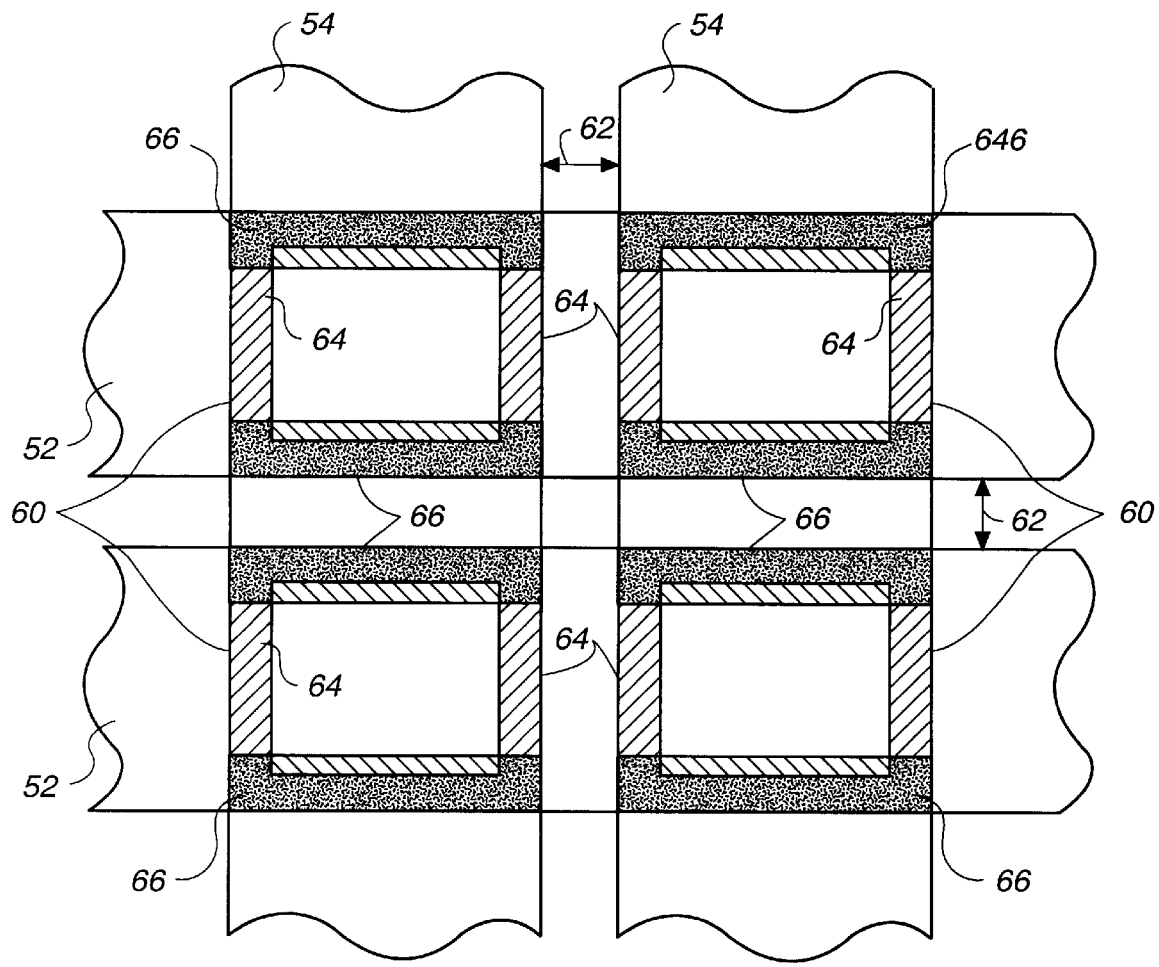
FIG._16

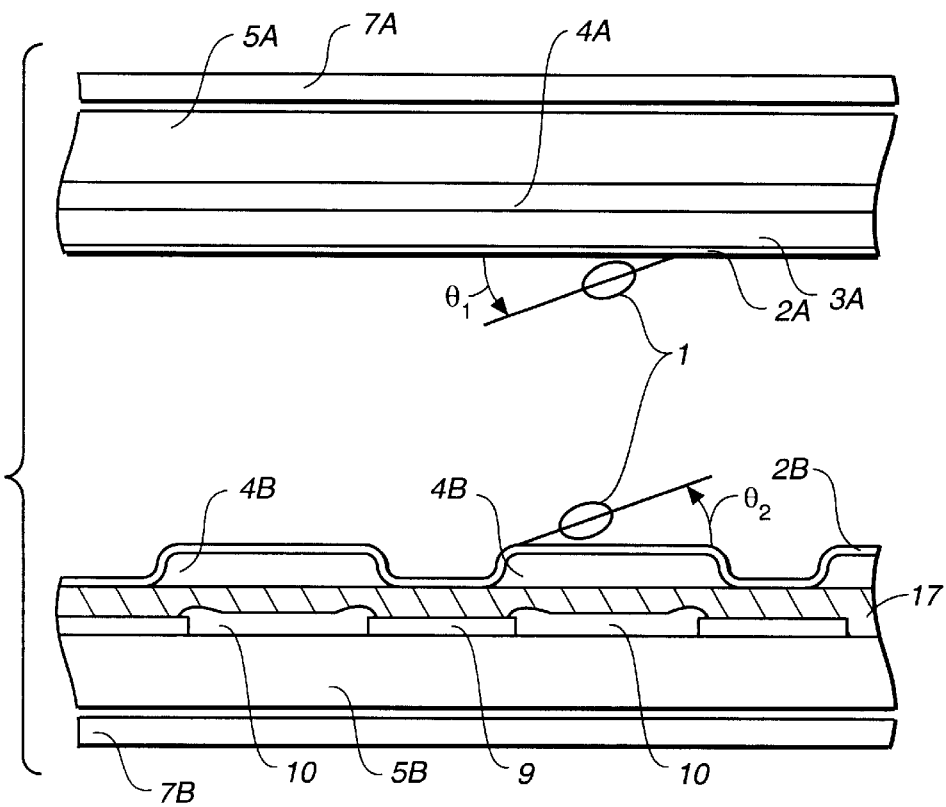

ELECTROOPTICAL ELEMENT SWITCHABLE BETWEEN A PLURALITY OF METABSTABLE STATES

CROSS-REFERENCE TO RELATED APPLICATION

This is a Divisional of prior application Ser. No. 08/093,290 filed on Jul. 15, 1993 now U.S. Pat. No. 5,488,499. This is a Continuation of application Ser. No. 08/547,634 filed Oct. 24, 1995, abandoned. This application is related to the subject matter of patent application Ser. No. 08/059,226, filed May 7, 1993 entitled, "LIQUID CRYSTAL DISPLAY DEVICE HAVING TWO METASTABLE STATES AND DRIVING METHOD THEREFOR" and is incorporated herein by reference thereto.

BACKGROUND OF THE INVENTION

This invention relates generally to a liquid crystal electrooptical element that employs a chiral nematic liquid crystal having a bistable capability and, more particularly, to a liquid crystal electrooptical element capable of being multiplex driven employing the bistable quality of the element to perform the switching function.

Currently, the liquid crystal display devices employed as display devices for office equipment and machines, portable display devices and the like employ twisted nematic (TN) liquid crystal medium or supertwisted nematic (STN) liquid crystal medium. As an example, such liquid crystal display systems are described generally in the article of M. Schadt and W. Helfrich entitled, "Voltage-Dependent Optical Activity of A Twisted Nematic Liquid Crystal", *Applied Physics Letters*, Vol. 18(4), pp. 127–128 (1971) and in the article of T. J. Scheffer and J. Nehring "A New, Highly Multiplexable Liquid Crystal Display", *Applied Physics Letters*, Vol. 45(10), pp. 1021–1023 (Nov. 15, 1984). However, these mediums do not have a lasting stable memory effect. Therefore, these mediums need to be actively driven, e.g., by a multiplexing driving method using voltage averaging or by an active matrix driving method in which a transistor or other active element is provided at each picture element.

Other liquid crystal display systems are being currently researched and developed in addition to the foregoing, although they have not reached a reliable product stage. For example, high speed addressing technologies utilizing voltage averaging are disclosed in U.S. Pat. No. 4,566,758 and U.S. Pat. No. 4,582,396. LC systems utilizing bistable switching properties are disclosed in U.S. Pat. Nos. 4,239,345 and 4,505,548.

However, these disclosed LC systems inherently have several problems. When a twisted nematic liquid crystal is driven by voltage averaging, the ratio of the voltage $V_{ON}$, for selecting the ON condition, to the voltage $V_{OFF}$, for selecting the OFF condition, is given by the following equation, $$V_{ON}/V_{OFF}=((N^{1/2}+1)/(N^{1/2}-1))^{1/2},$$

wherein N is the number of scan lines.

As can be seen from this equation, since $V_{ON}/V_{OFF}$ approaches 1 as N becomes large, the contrast ratio also approaches 1. Considering both electrooptical characteristics of current liquid crystal materials and the delay experienced upon the application of voltage waveforms to such current liquid crystal materials, N is presently limited up to about 500 scan lines as a maximum. Therefore, it is impossible to employ this kind of system as display devices for use in workstations and the like requiring high definition displays. Also, the display characteristic is significantly dependent on the viewing angle, and, further, the switching time is comparatively too long.

The LC system disclosed in U.S. Pat. No. 4,582,396 is aimed at shortening the required switching time. By the disclosed addressing means in this publication, the switching from the ON condition to the OFF condition can be advanced by providing for opposite signs proscribed to the pretilt angle, $\theta_1$, on the lower substrate, i.e., the angle formed between the molecular director of the liquid crystal molecules in contact with the alignment layer formed on the substrate surface, and the pretilt angle, $\theta_2$, on the upper substrate. Also, U.S. Pat. No. 4,566,758 is aimed at stabilizing the operating condition by adding a chiral component to the liquid crystal medium. Even if, however, these technologies are utilized, bistable operation cannot be achieved and the liquid crystal electrooptical element must be driven by means of a voltage averaging method. As a result, there is no possibility of realizing a high definition liquid crystal display device through the utilization of these conventionally applied technologies.

A chiral nematic liquid crystal electrooptical element with bistable characteristics is disclosed in U.S. Pat. No. 4,239,345. This liquid crystal electrooptical element has a 180° twist in its initial state, but after the voltage is applied, the element relaxes to two states different from its initial state, which are highly stable states. The difference in twist between the two states is approximately 360°, and bistable switching is performed between the two states. The two states can be optically distinguished by sandwiching the liquid crystal electrooptical element between two polarizing plates. In this situation, it should be noted that a high contrast ratio can be achieved by configuring the liquid crystal electrooptical element such that the result of dividing the product, R, (comprising the birefringence, $\Delta n$, of the liquid crystal medium and the layer thickness, d, ($\mu$m) of the liquid crystal medium) by the wavelength, $\lambda$, of the incident light, i.e., R/$\lambda$, is less than 2.

The foregoing patent mentions a simple matrix driving system without detailing such a system. U.S. Pat. No. 4,505,548 discloses a system for relatively rapid bistable switching by controlling the applied voltage. However, the liquid crystal medium requires a rather high pretilt angle of 35° so that the liquid crystal alignment film must be formed by means of oblique deposition to achieve such a high pretilt angle. However, this type of alignment has not been proven to be sufficiently practical for use in production.

Further, liquid crystal electrooptical elements utilized in display devices requiring a high pretilt angle and liquid crystal display devices driven at a high duty ratio by a voltage-averaging method provide a narrow effective viewing angle.

When a liquid crystal electrooptical element is employed as a display panel, normally a red, green and blue three-wavelength light source or white light source is employed. Therefore, the element must have a high contrast ratio and a high light transmittance in its ON state for those kinds of light sources. Therefore, it is necessary to know the conditions for obtaining good display characteristics when employing these kinds of light sources.

Parameters that determine good display characteristics include the birefringence, $\Delta n$, and the layer thickness, d, of the liquid crystal medium as well as the angles of the polarization axes of the two polarizing plates. U.S. Pat. No. 4,239,345 indicates only that, with respect to R (=d·$\Delta n$), a high contrast ratio can be achieved by making R/$\lambda \leq 2$ when a monochromatic light is employed as the light source. There is no recognition, appreciation or reference to the conditions required to achieve high ON light transmittance or to the necessary angle of the polarization axes. There is no discussion or appreciation at all of the conditions required when employing white light. Although mentioned is made that a high contrast ratio can be achieved by making $R/\lambda \leq 2$, $R/\lambda$ in each of the disclosed embodiments is greater than 2, i.e., $R/\lambda \geq 2$. Also, there is no data relating to the resulting electrooptical characteristics of light transmittance or the contrast ratio and a clear understanding and knowledge as to what requirements are necessary to consider in achieving these characteristics on a high level or, further, at to optimum level.

In experiments conducted by the inventors herein employing white light, they were able to optically distinguish the two metastable states, but we did not obtain display characteristics that would render the liquid crystal electrooptical element useful as a display panel device.

As will be described below, in a liquid crystal display which utilizes two metastable states in which the twist angle is $\phi_r \pm 180°$ setting the polarization axes, which is one of the parameters that determines the display characteristics, to an optimum angle is not easy to achieve. In such a bistable liquid crystal display system, the twist angle is 180° in the initial state, and one of the two metastable states is a uniform state with a twist angle of 0°. Therefore, the light transmittance when the two polarizing plates are each disposed at a predetermined angle can be achieved relatively easily. However, the twist angle of the other metastable state is approximately 360° and, in order to speed up the response time of the medium as much as possible, the liquid crystal layer must be formed as thin as possible. When the twist angle is large, such as 360°, and the liquid crystal layer made thin, the linearly polarized light (white light) incident on the liquid crystal medium is exited as elliptically polarized light, thus rendering it difficult to achieve the transmitted light spectrum in the 360° twisted state. Thus, it has not been established and determined as to how the polarization axes should be set to increase both the contrast ratio and the ON transmittance when R is a predetermined value.

It is, therefore, an object of this invention to offer a bistable liquid crystal electrooptical element that employs a chiral nematic liquid crystal having a sufficiently good display characteristic as a display element with a high contrast ratio and a high ON transmittance.

In the liquid crystal electrooptical element of the invention, the respective stabilities of the initial state and the two metastable states are dependent on the ratio, $d/p_0$, of the liquid crystal layer thickness, d, to the liquid crystal helical pitch, $p_0$. Where the twist angle in the initial state is $\phi_r$, the desired alignment state in the initial state can be realized by satisfying the condition, $$0.5\phi_r/360° \leq d/p_0 \leq 1.5 \phi_r/360°.$$

However, regarding the two metastable states obtained by applying a driving waveform, the metastable state having a twist angle of approximately, or $\phi_r+180°$, becomes more unstable compared to the other metastable state under the condition, $$d/p_0 \approx 0.5 \phi_r/360°,$$

while under the condition, $$d/p_0 \approx 1.5 \phi_r/360°,$$

the metastable state having a twist angle of approximately, $\phi_r+180°$, becomes more unstable compared to the other metastable state. A liquid crystal display device having unbalanced stabilities relative to the two metastable states requires comparatively a larger amount of energy to select the unstable state, which has the undesirable problem of increasing the drive voltage or requiring a drive pulse voltage applied over a longer period of time. Further, since the time required for relaxation from a selected unstable metastable state to return to the initial state, which is referred to as the memory retention time, is short, relaxation may occur in a nonselection period in the case where display device contains a large number of scanning electrodes thereby degrading display quality.

The pretilt angle, formed between the planar extent at the substrate interface and the molecular director vector of the liquid crystal molecules at the interface, also has an effect on the balance achieved between the stabilities of the two metastable states. According to the results of experiments conducted by the inventors, they have discovered that the stability of the metastable state having a twist angle $\phi_r+180°$ dropped as the pretilt angle became larger. Such a display has the same problems as described above. In addition, high pretilt angle will provide a narrow effective viewing angle.

Further, in a bistable liquid crystal display or in a multistable liquid crystal display, the alignment states employed for display of information are frequently not sufficiently stable, and plural states may occur at the same time due to local displacement in the surface condition or shape of the substrate resulting in poor display quality.

In a liquid crystal display utilized in accordance with this invention, a shape effect occurs along the edges of the transparent segment electrodes, i.e., the tapered edges along the length of the electrodes have an effect in selection of metastable states. This is illustrated in FIGS. 15 and 16. FIG. 15 schematically illustrates scan electrodes 54 formed on substrate 50B while signal electrodes 52 are formed on substrate 50A. These electrodes are formed in orthogonal relation, as seen in FIG. 16, defining pixel regions 60. As noted best in FIG. 15, pixel regions 60 include areas 58 plus areas 56 between electrodes 52 and 54. The regions between pixel regions 60 are non-pixel regions 62. Side edges 57 of electrodes 52 and 54 are not planar like surfaces 59 of electrodes 52 and 54, due to fabrication methods. As a result, the alignment state of the liquid crystal molecules in a region of areas 58 between surfaces 59 of electrodes 52 and 54 will be different from the affects on the liquid crystal medium in a region of areas 56 between edges 57 of electrodes 52 and 54, particularly since the alignment direction, $n_2$, of the liquid crystal molecules at surfaces 59 of electrodes 52 and 54 will be different from the alignment direction, $n_1$ and $n_2$, of the liquid crystal molecules at tapered edges 57 of electrodes 52 and 54. As an example, when the twist angle $\phi_r+180°$ is selected as the metastable state through application of an appropriate drive voltage waveform forming a domain having the twist angle $\phi_r+180°$ above pixel regions 60, a domain having the twist angle $\phi_r-180°$ concurrently appears in areas 56 immediately above the scan electrode tapered edges 57 so that the contrast ratio is reduced due to the result of this shape effect. This tendency is most evident at a selected longitudinal side portions of the pixels, comprising the intersections of signal electrodes 52 and scan electrodes 54, as illustrated in FIG. 16 by the hatching and stippling around the edge of pixel regions 60, as indicated at 64 and 66 respectively, when the rubbing direction is parallel to either the direction of the scan electrode or the direction of the signal electrode. In the case of FIG. 16, the rubbing direction is shown parallel in the direction of signal electrodes 52 so that this shape effect tendency appears most prominent in regions 66 and also appears to a lesser extent in regions 64. The utilization of the present invention has been able to substantially eliminate this shape effect.

Thus, it is an another object of this invention to offer a high definition liquid crystal display device having plural scan lines wherein the display characteristic of the bistable liquid crystal electrooptical element provides little dependence on the viewing angle.

SUMMARY OF THE INVENTION

Thus, according to this invention, a liquid crystal electrooptical element comprises an electrode arrangement and alignment films, having predetermined alignment directions, e.g., rubbing directions, formed on the film surfaces, are disposed on respective opposed inner surfaces of each a pair of substrates. A polarizing plate is positioned on the outer surface of each of the substrates. A chiral nematic liquid crystal medium is provided between the spatially positioned substrates. The helical pitch of the chiral nematic liquid crystal is adjusted such that an initial twist angle, $\phi_r$, of said chiral nematic liquid crystal medium in an initial state prior to application of an applied voltage to said electrodes is substantially equal to the angular relation between the respective alignment directions formed on the alignment films. The angles formed in the initial state by the molecular director vector of the liquid crystal molecules at the respective alignment film surfaces relative to the respective substrates have mutually opposing signs. The chiral nematic liquid crystal medium is capable of relaxing to one of two metastable states after application of an applied voltage waveform in the initial state wherein the twist angles of the liquid crystal medium in the metastable states, respectively, approximate $\phi_r+180°$ and $\phi_r-180°$. The respective polarization axes angles P, A of the polarizing plates formed by the polarization axis of one of each of the polarizing plates relative to one of the respective alignment film alignment directions is set according to (1) a value of product R ($=d\cdot\Delta n$) where d is the layer thickness of the liquid crystal medium and where $\Delta n$ of the liquid crystal medium is the apparent difference in the refractive indices of the liquid crystal medium for extraordinary light, $n_e$, and ordinary light, $n_o$, ($\Delta n=n_e-n_o$), and (2) twist angle, $\phi_r$, so that the contrast ratio between the metastable states is 2 or greater.

The chiral nematic liquid crystal medium of this invention has two metastable states comprising relaxation states that are different from the initial state of the medium. As an example, assuming the initial state has a twisted structure in which the twist angle is 180°, the chiral nematic liquid crystal medium has two metastable states wherein the twist angle is 0° in one metastable state, also referred to as the uniform state, and 360° in the other metastable state when a pulse voltage is applied with an absolute value sufficiently large to initiate Frederick's transition. The applied voltage waveform and the absolute value of the applied pulse voltage determine which of the two metastable states will be activated, i.e., whether the molecular orientation becomes the metastable state of 0° twist angle or the metastable state of 360° twist angle. Both metastable states have a property that cause them to spontaneously relax to the initial state.

The twist angle, $\phi_r$, in the initial state is not limited to 180°, and it can be set as desired. For example, assuming the twist angle $\phi_r$ in the initial state is 90°, the two metastable states after Frederick's transition have twist angles of $\phi_r\pm180°$, i.e., −90° and 270°. It has been confirmed by experiment that switching between these metastable states is possible. As used herein, the twist angles $\phi_r\pm180°$ of the metastable states are not exact values but rather approximate $\phi_r\pm180°$.

The liquid crystal display device of the invention selectively switches between the two metastable states whose selection is dependent on the applied voltage waveform. The inventors confirmed by experiment that the time until the selected metastable state spontaneously relaxes to the initial state, i.e., the memory retention time, is dependent on $d/p_0$ and discovered through statistical analysis of the results that a practical memory retention time for a display device could be achieved under the condition, $$0.8\ \phi_r/360° \leq d/p_0 \leq 1.4\ \phi_r/360°. \tag{1}$$

As used herein, the terminology, "practical retention time for a display device" refers to a time period equal to or longer than the time required for scan line selection per line times the number of scan lines, and is basically different from the bistable selection referenced in U.S. Pat. No. 4,239,345, termed as "lasting existence". Also, in the technology disclosed in this patent, the recommended range for the pretilt angle is indicated from 25° to 45°. However, in this invention, a practical retention time can be realized taking into consideration the condition (1) with the pretilt angle in the range of about 1° to 25° range. In other words, a practical retention time is realized with an appropriate pretilt angle accomplished by a simple rubbing method applied to the surface of an alignment film. Even when the twist angle, $\phi_r$, is not 180°, the practical retention time can be achieved by adjusting the helical pitch in a similar manner.

In a liquid crystal display having bistability or multistability, the alignment state used for display is often not sufficiently stable and, as a result, plural alignment states may occur at the same time due to local displacement in the surface condition or shape of the substrate, resulting in poor display quality. This problem is solved when the following condition is satisfied relative to each of the substrates:

$$10°\leq\phi_o\leq80°, \tag{2}$$

where $\phi_o$ is the angle formed by a selected side of the pixel and the rubbing direction is satisfied on each of upper and lower substrates, in which case, a high definition display having a high number of scan lines is possible with a simple matrix system while maintaining a wide viewing angle and preventing the occurrence of undesirable domains in the pixels resulting in a uniform displayed image.

The effective viewing angle can be increased when one of or both of the angles formed by the rubbing directions and the vertical direction of the liquid crystal display as viewed by the observer is greater than or equal to −45° and less than or equal to 45°.

In a liquid crystal display with bistable or multi-stable states, as previously above, particularly where state switching is performed by applying an electric field, there are many situations in which alignment of non-pixel regions between adjacent pixels, cannot be controlled because the electrodes are formed relative to only one substrate, and, as a consequence, there results a leakage of transmitted light in undesirable areas degrading the contrast ratio. As a countermeasure, the light transmittance in non-pixel regions should be rendered lower than that in formed pixel regions. This can be achieved by forming a layer of light masking material on non-pixel regions. On the other hand, the light transmittance in non-pixel regions can be rendered lower than the light transmittance at the formed pixel regions by adjusting the twist angle of the liquid crystal in the non-pixel regions to satisfy the following condition, $$d_o/p_o \geq 0.75 \quad (3)$$

where, $d_o$, is the thickness of the liquid crystal layer in the non-pixel regions.

Multiplex driving can be performed in conjunction with this invention through switching between two metastable states of a chiral nematic liquid crystal medium. This invention is achieved by appropriately setting the polarization plate angles P and A, formed by the polarization axes of the polarizing plates and the alignment, i.e., rubbing, direction on one of the alignment films, according to the parameters for the twist angle, $\phi_r$, in the initial state of the liquid crystal medium and the value for R ($= \Delta n \cdot d$). Optimum values for angles P and A are dependent on one another, and their relationship is significantly influenced by the values chosen for $\phi_r$ and R.

The Mauguin condition is a condition for rotating the polarization axis of the propagated light so that the polarization axis follows the twist of the liquid crystal molecules when linearly polarized light is incident in the direction of the helical axis of the chiral nematic liquid crystal medium. This is expressed by the equation, $$p' \cdot \Delta n \ll \lambda \quad (4)$$

where the helical pitch of the liquid crystal when provided between two substrates that had undergone alignment treatment is p', the difference in the refractive indices of the liquid crystal medium for extraordinary light, $n_e$, and ordinary light, $n_o$, is $\Delta n$ ($\Delta n = n_e - n_o$), and the wavelength of the light is $\lambda$.

When linearly polarized light, having a polarization axis either parallel or perpendicular to the alignment direction, $n_1$, of the liquid crystal molecules in contact with a first substrate, is introduced in a liquid crystal cell wherein the parameters have been set to satisfy the Mauquin condition, the axis of the polarized light is rotated to follow the helical twist of the liquid crystal molecule alignment so that it becomes, respectively, linearly polarized light polarized either parallel or perpendicular to the alignment direction, $n_2$, of the liquid crystal molecules in contact with the other substrate, and the linearly polarized light is emitted out of the medium. Also, when linearly polarized light having a polarization axis in a direction other than parallel or perpendicular to the alignment direction, $n_1$, of the liquid crystal molecules in contact with a first substrate is introduced, the light emitted out of the medium is elliptically polarized. Conventionally employed TN type liquid crystal display devices perform switching between a homeotropically aligned state and a twisted state that satisfy the Mauguin condition. The twist angle is 90°, and the optimum value for p'·$\Delta n$ is approximately 1.88 μm (p'≈20 μm, $\Delta n$≈0.094). By setting the two polarizing plates so that their polarization axes are either parallel or perpendicular to the alignment directions $n_1$ and $n_2$, respectively, an extremely high contrast ratio and a high ON transmittance condition can be achieved.

The foregoing, however, does not apply to the relationship between the display characteristic of the bistable liquid crystal display device employed in this invention and the Mauguin condition. In the present invention, where $\phi_r$ is the twist angle in the initial alignment state, switching is performed between two twist states in which the twist angle is $\phi_r + 180°$ and $\phi_r - 180°$. The twist state of the twist angle whose absolute value is the larger of the two is referred to as S$^+$ and the other twist state is referred to as S$^-$. Here, in this invention, if each of the parameters are set so that both S$^+$ and S$^-$ satisfy the Mauguin condition, and if the two polarizing plates are disposed such that their respective polarization axes are parallel or perpendicular to alignment directions $n_1$ and $n_2$, S$^+$ and S$^-$ are hardly optically distinguishable. This is because, since the alignment directions $n_1$ and $n_2$ of S$^+$ coincide with the alignment directions $n_1$ and $n_2$ of S$^-$, respectively, the emitted polarized light of both S$^+$ and S$^-$ are linearly polarized light and are polarized in the same direction. Also, when the two polarization plates are disposed such that their polarization axes are other than parallel or perpendicular relative to alignment directions $n_1$ and $n_2$, respectively, then S$^+$ and S$^-$ are optically distinguishable but the display element will not have a display characteristic suitable for practical application. This is true irrespective of the value of the twist angle, $\phi_r$.

On the other hand, if S$^+$, for example, does not satisfy the Mauguin condition, then the following conditions can be considered. A situation is explained wherein the twist angle, $\phi_r$, is approximately 180°, which is the angle at which an optimum display characteristic is expected to be achieved. In the explanation to follow, L is the helical pitch in S$^+$ in a liquid crystal device according to the present invention.

(1) When L·($n_e - n_o$) is significantly smaller than $\lambda$:

S$^+$ is optically isotropic, but behaves as an optically active medium with several degrees of rotation power per 1 μm. See the book of P. G. de Gennes, entitled, *The Physics of Liquid Crystals*, p. 226, Oxford University Press (1974). When an optical rotation angle of $\phi_{rot}$ is assumed, the light transmittance of S$^+$ reaches a minimum if the angle $\phi_{12}$ formed by the polarization axes of the two polarizing plates is 90°+$\phi_{rot}$.

On the other hand, the twist angle of S$^-$ is 0°. However, since a chiral nematic liquid crystal medium has an intrinsic twist, the twist angle of S$^-$ is not strictly 0° even if the twist angle, $\phi_r$, is equal to 180°. However, if the twist angle is not very large, S$^-$ may be considered to be a birefringent medium with no twist under the condition $\phi_r$ approximates 180°. Therefore, if the angle, $\phi_n$, formed by the direction of the polarization axis of one polarizing plate and the average alignment direction of the liquid crystal molecules in S$^-$, is set to be approximately 45° in order to raise the light transmittance of S$^-$ under the condition $\phi_{12} = 90° + \phi_{rot}$, it is possible to obtain an extremely high contrast ratio and a high ON state brightness.

(2) When L·($n_e - n_o$) is larger than $\lambda$ but is not sufficiently large to satisfy the Mauguin condition:

In this situation, even if $\phi_n = 0°$, the emitted polarized light from S$^+$ becomes elliptically polarized light and the direction of the larger axis of the elliptically polarized light is not parallel to alignment condition, $n_2$. Therefore, a high contrast ratio and ON state brightness can be achieved, assuming that, for example, $\phi_n = 0°$ and $\phi_{12} = 90°$.

(3) When L·($n_e - n_o$) is a value intermediate between the conditions (1) and (2) above:

In this situation, a display characteristic intermediate between (1) and (2) can be expected. It is not easy to imagine the display characteristic when $\phi_r$ has shifted to a value larger than 180°. However, if the Mauguin condition is not satisfied, it is possible to avoid the situation in which the polarization conditions of the emitted light relative to S$^+$ and S$^-$ become substantially the same and optically indistinguishable.

In this invention, the relaxed state is regarded as a metastable state because the memory retention time is not infinite. It may be possible, however, that the stability of the metastable state significantly increases and that the memory retention time approaches infinity. Of course, therefore, this invention is applicable to the case of infinite memory retention time.

Moreover, the term, "optically isotropic medium", in general, means that Δn is zero. Thus, the liquid crystal medium is regarded as an optically isotropic medium if the apparent Δn of the liquid crystal medium is much smaller than its intrinsic Δn.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a schematic cross sectional view of an embodiment of a liquid crystal electrooptical element of this invention.

FIG. 2 is schematic a cross sectional view of another embodiment of a liquid crystal electrooptical element of this invention.

FIG. 3 is a graphic illustration defining the angles of the polarization axes.

FIG. 4 is a diagram illustrating the basic drive voltage waveform employed in connection with this invention.

FIG. 5 is a diagram showing the optimum values for angles P and A of the polarization axes.

FIG. 6 illustrates the combination of drive voltage waveforms employed in connection with this invention.

FIG. 7 is a diagram for explaining the relationship between the electrodes and the alignment directions, $n_1$ and $n_2$.

FIG. 8 is a block diagram of the driving circuit employed in conjunction with the voltage drive waveforms employed with this invention.

FIG. 9 is a diagram for explaining the relationship between an observer and the x, y, z coordinate axes of a display panel.

FIG. 10 is a diagram illustrating the relationship between the alignment directions and the polarization axes.

FIG. 11 illustrates drive voltage waveforms employed in connection with this invention.

FIG. 12 is a schematic cross sectional view illustrating the structure of a liquid crystal display element of another embodiment of comprising this invention.

FIG. 13 illustrates drive voltage waveforms employed in connection with this invention.

FIG. 14 is a schematic cross sectional view illustrating the structure of a liquid crystal display element of a further embodiment of comprising this invention.

FIG. 15 is a schematic side view of a liquid crystal element for explaining the shape effect of the side edges of the scan and signal electrodes.

FIG. 16 is a schematic plan view of the view shown in FIG. 15.

FIG. 17 is a schematic cross sectional view illustrating the structure of a liquid crystal display element of a still further embodiment of comprising this invention

DESCRIPTION OF THE PREFERRED EMBODIMENTS

Reference is now made to FIG. 1 illustrating the application of the liquid crystal electrooptical element of this invention as applied to a liquid crystal display device. As shown in FIG. 1, the liquid crystal display comprises substrates 5A and 5B upon the inner surfaces of which are formed upper and lower electrodes 4A and 4B followed by upper and lower $SiO_2$ insulating films 3A and 3B and upper and lower alignment films 2A and 2B. Upper and lower alignment films 2A and 2B have respective alignment directions formed on their surfaces, such as, by rubbing their surfaces in a uniform direction. The outer surfaces of substrates 5A and 5B respectively contain upper and lower polarizing plates 7A and 7B. Substrates 5A and 5B are sealed in spaced relation by means of sealing member 6 functioning also as a spacer. Assuming an initial alignment state where $\phi_r$ is equal to 180°, for example, the two substrates are mated together via spacer 6 so that the rubbing directions are parallel to one another and are in opposite directions. Assuming an initial alignment state where $\phi_r$ is equal to 90°, the two substrates are thus mated together via spacer 6 so that the respective rubbing directions on the alignment films form an angle of 90° relative to one another.

Prior to sealing these substrates, chiral nematic liquid crystal medium 21 is provided in the cavity provided between spaced substrates 5A and 5B. Upper and lower alignment films 2A, 2B may be comprised of polyimide and undergo alignment treatment. Lower alignment film 2B has a rubbing direction 19 whereas upper alignment film 2A has a rubbing direction 20 as both indicated in FIG. 1. Also, as shown in FIG. 1, rubbing directions 19 and 20 are formed in opposing parallel directions ($\phi_r$=180°), and chiral nematic liquid crystal medium 21 is provided between substrates 5A and 5B mated together and spatially sealed with sealing member 6.

In the initial state, the angles formed by the molecular director of the liquid crystal molecules at or in contact with the alignment films 2A and 2B are $\theta_1$ and $\theta_2$ with opposing signs. In other words, assuming a twist angle of 180° in the initial state, the respective director vectors are approximately parallel to each other but extending in opposite directions.

Assuming the rubbing direction on lower substrate 5B is along the X axis and the normal line of direction of the substrate is along the Z axis, in the measurement of angles using the X axis direction as a reference, the angles of the polarization axes of lower polarization plate 7B on lower substrate 5B and upper polarization plate 7A on upper substrate 5A are, respectively, angles P and A. If the direction of twist of the chiral nematic liquid crystal viewed in the Z axis direction is clockwise, a positive angle of P indicates rotation of the polarization axis in the clockwise direction, and a negative angle of P indicates rotation of the polarization axis in the counterclockwise direction. FIG. 3 shows the condition where the angle of the polarization axis relative to the X axis, indicated by the arrow, is defined as P when the helical structure of the liquid crystal has a clockwise twist when viewed in the Z axis direction. A similar measurement is performed for angle A formed by the polarization axis of upper polarization plate 7A and the X axis. P and P±180°. n (where n is an integer) are equivalent. The same is true for A.

To employ this liquid crystal electrooptical element as a reflective type device, a reflective plate is disposed on the outside surface of either the upper polarizing plate or the lower polarizing plate. The liquid crystal medium employed in the following embodiments comprises a nematic liquid crystal material of positive dielectric anisotropy (Δε>0) available on the market and an optically active compound that induces a helical structure is added to the nematic liquid crystal material to adjust the value for $p_o$. In the first to the seventh embodiments to be explained, product No. R-811, available from Merck Co., was employed as the optically active compound, while in the eighth and subsequent embodiments, product No. S-811, available from Merck Co., was employed.

The difference in the refractive indices of the liquid crystal for extraordinary light, $n_e$, and ordinary light, $n_o$, i.e., $\Delta n$, as previously referred to, has been in reference to apparent $\Delta n_a$. However, in the following embodiments illustrating this invention, the intrinsic $\Delta n$ of the liquid crystal medium is employed. This is because the pretilt angle is generally in the range 1° to 5°, and, therefore, the apparent $\Delta n$ in the nontwisted state and the intrinsic $\Delta n$ of the liquid crystal medium can be considered to be substantially the same. However, when the pretilt angle is large, the intrinsic $\Delta n$ of the liquid crystal and the apparent $\Delta n$ differ greatly and the apparent $\Delta n$ must be employed. Further, since the molecular alignment of the liquid crystal medium in a case wherein the display is performed in a memory state without an applied voltage differs from that in a case in which display is performed in a state wherein voltage is applied, the values of the apparent $\Delta n$ must be different. However, since the voltage is about 1 volt, the difference in the apparent $\Delta n$ when a voltage is applied and when a voltage is not applied is very small so that this difference may be ignored. Therefore, it is natural that the average apparent $\Delta n$ during display operation be employed, but the intrinsic $\Delta n$ of the liquid crystal is employed in the following embodiments. When a display operation is performed by applying a large voltage such that the alignment distribution deviates significantly, or when the pretilt angle is large, the average apparent $\Delta n$ during the display operation must be employed.

In order to set R to various values, several varieties of liquid crystal material with differing $\Delta n$ were employed and the thickness of the liquid crystal layer was set between the range of 1.7 μm and 25.0 μm. The $\Delta n$ of the liquid crystal materials and the number of the embodiments in which each liquid crystal medium was employed are shown in Table 50 below. Also, though the pretilt angle differed depending on the type of liquid crystal medium, alignment film and employed rubbing method, the range of pretilt angles was about 1° to 5° from the first to the seventh embodiments.

TABLE 50

| Liquid Crystal Medium | Δn | Embodiments |
| --- | --- | --- |
| ZLI-4119 | 0.06 | (1–1) |
| ZLI-4262 | 0.10 | (1–2) to (1–9), (1–12), (1–15), (1–26), (1–27), (2–1), (2–2), (3–1), (3–2), (4–1), (4–2), (5–1), (5–2), (6), and (7) |
| ZLI-1370 | 0.14 | (1–10), (1–14), (2–4), (2–5), (3–4), (3–5), (4–4), (4–5), (5–4), and (5–5) |
| ZLI-2140-000 | 0.15 | (1–13) |
| ZLI-4454-000 | 0.159 | (1–16) to (1–19), (1–21), (1–22), (2–3), (3–3), (4–3), and (5–3) |
| ZLI-4155 | 0.186 | (1–11), and (1–24) |
| ZLI-5049-000 | 0.208 | (1–20), (1–23), and (1–25) |

An evaluation was made as to whether or not the liquid crystal element satisfies the Mauguin condition employing the helical pitch, L, of the metastable state with the larger twist angle value between the two metastable states, the $\Delta n$ and the wavelength of the light (380 nm to 780 nm). The twist angle, $\phi_r$, in the initial state and helical pitch, L, have the following relationship:

$$L = \{2 \cdot 180°/(\phi_r + 180°)\} \cdot d \tag{5}$$

Also, taking into consideration the value of L·$\Delta n$ which describes the Mauguin condition, and R, they have the following relationship:

$$L \cdot \Delta n = 2 \cdot 180° \cdot R/(\phi_r + 180°) \tag{6}$$

Therefore, setting the direction of the polarization axis according to the value of L·$\Delta n$ is nothing more than setting the direction of the polarization axis according to the value of both R and $\phi_r$. Further, only when $\phi_r = 180°$ does L·$\Delta n$ equal the retardation of S⁻ because L is equal to d from Equation (5).

Rubbing direction 19 on lower substrate 5B is along the X axis. Relative from the first to the seventh embodiments, the helical structure observed in the direction normal to the substrate surface, i.e., z axis direction, is a right handed twist, i.e., a clockwise twist, and, therefore, the angle P of the polarization axis of lower polarization plate 7B is defined as shown in FIG. 3. The values of P and P±nπ (where n is an integer) are equivalent. The same is true for the value of A. Sets of (P, A) and (P±90°·n, A±90°·n) are equivalent. For example, (P, A)=(160°, 50°) and (P, A)=(70°, 140°) yield the same display characteristics.

Switching between the two metastable states in which the twist angles, $\phi_r$, of the liquid crystal are approximately 360° and 0°, respectively, is performed by applying a voltage waveform of the type shown in FIG. 4. The values for P and A were set to various angles and the light transmittance in the 360° and 0° states was measured, employing a polarizing microscope, model BH-2, produced by Olympus, with an attached white light source, in order to calculate the contrast ratio. The light transmittance of the polarizing plate employed was approximately 48%.

The display properties of a reflective type display may be evaluated with reference to the display properties of transmission type display, as illustrated below. In the transmission type liquid crystal display, shown in FIG. 1, assume that a display is employed as a reflective type display by placing a reflector plate beneath or at the outside surface of lower polarizing plate 7B. Assume that light of intensity, $I_o$, is introduced at upper polarizing plate 7A and light of intensity, $I_d$, is reflected from the reflector plate. Assume, further, that the intensity of the incident light proceeding into the liquid crystal layer 21 after transmission through upper polarizing plate 7A is $I_a$, the intensity of the light after transmission through lower polarizing plate 7B is $I_b$. The intensity of the light returning through lower polarizing plate 7B again after reflection from the reflection plate is also $I_b$. The intensity of the reflected light proceeding into the liquid crystal layer 21 again after transmission through lower polarizing plate 7B is $I_c$, and the intensity of the reflected light after transmission through upper polarizing plate 7A is $I_d$. The ratio of $I_d$ and $I_c$ is equal to the ratio of $I_b$ and $I_a$. Hence the following relation is true:

$$I_d = I_c \cdot I_b / I_a \tag{7}$$

Next, assume the light transmissivity of polarizing plate for unpolarized light is x and the light transmissivity of polarizing plate for the linear polarized light which is polarized parallel to the light transmission axis of polarizing plate is y, then $I_a$ and $I_c$ can be expressed as follows:

$$I_a = x \cdot I_o \tag{8}$$

$$I_c = y \cdot I_b \tag{9}$$

When the equations (8) and (9) are substituted into the equation (7), the result is:

$$I_d = (I_b^2 / I_o) \cdot (y/x). \tag{10}$$

In reality, however, y≠1, but is close to 1. Further, light intensities in ON and OFF states can be distinguished by adding to equation (10) the terms, (ON) and (OFF). As a result, the contrast ratio (C. R.) for a reflective type display can be expressed as follows:

$$C.R.=I_d(ON)/I_d(OFF)=(I_b(ON)/I_b(OFF))^2$$

Thus, the reflectivity, $I_d/I_o$, and contrast ratio in a reflective type display can be obtained from the transmissivity, $I_b/I_o$, and contrast ratio in transmission type display.

First Embodiment

When $\phi_r=180°$ (1-1) When R=0.102

The value for $p_o$ was adjusted so that the twist angle, $\phi_r$, was nearly 180° by adding an appropriate amount of the optically active compound, product No. R-811, to liquid crystal medium, product No. ZLI-4119 ($\Delta n=0.060$), both available from E. Merck Co. The thickness, d, of the liquid crystal layer was 1.7 μm. L=d=1.7 μm and $d/p_o \approx 0.5$. The relationship between L·Δn and the wavelength, λ, is given by $$L \cdot \Delta n = 0.102 < \lambda(0.38 \sim 0.78)$$

Therefore, the Mauguin condition is not satisfied.

Table 1 shows the light transmittance, $I^+$, in the 360°-twisted state, the transmittance, $I^-$, in the 0° uniform state and the contrast ratio, CR, for various combinations of polarization axes angles P and A (rounded off in the nearest one-hundredths).

TABLE 1

| No. | P | A | I+ | I– | CR | T | R |
|---|---|---|---|---|---|---|---|
| 1 | 135 | 45 | 0.08 | 18.18 | 232.40 | o | o |
| 2 | 50 | –40 | 0.08 | 17.62 | 223.53 | o | o |
| 3 | 35 | –55 | 0.08 | 16.04 | 204.23 | o | o |
| 4 | 155 | 65 | 0.08 | 10.66 | 138.45 | o | o |
| 5 | 70 | –30 | 0.86 | 11.33 | 13.18 | o | o |
| 6 | 30 | –70 | 0.86 | 11.33 | 13.18 | o | o |
| 7 | 50 | –60 | 4.34 | 20.62 | 4.75 | * | o |
| 8 | 70 | –50 | 10.10 | 22.70 | 2.25 | * | o |
| 9 | 60 | –70 | 17.42 | 28.86 | 1.66 | * | o |
| 10 | 60 | 20 | 28.95 | 17.64 | 1.64 | * | o |
| 11 | 40 | 40 | 46.18 | 28.68 | 1.61 | * | o |
| 12 | 45 | 55 | 44.19 | 27.71 | 1.59 | * | o |
| 13 | 35 | 65 | 33.15 | 21.25 | 1.56 | * | o |
| 14 | 20 | 20 | 46.17 | 38.62 | 1.20 | * | * |
| 15 | 30 | 10 | 41.94 | 35.72 | 1.17 | * | * |
| 16 | 60 | 80 | 39.67 | 35.35 | 1.12 | * | * |
| 17 | 80 | –80 | 39.68 | 42.96 | 1.08 | * | * | d=1.7 μm, L=1.70, L·Δn=0.102, λ=0.38 nm~0.78 nm

The value of 100 in transmittance is equal to the intensity of the incident light. Also, the values of L·Δn, the wavelength, λ, layer thickness, d, and L are given beneath the table. The asterisk (*) in both of the T and R columns of the combination of each of the values for angles P and A indicate that these combinations are provided as comparison examples, i.e., combinations for example Nos. 1 to 13 are embodiment examples, and combinations for examples Nos. 14 to 17 are comparison examples.

The meaning of T and R are that the "O" in the T column indicates the combination is sufficiently good for employment as a transmission type display element, and the "O" in the R column indicates that the combination is sufficiently good for employment as a reflective type display element. When R=0.102, the combinations for examples Nos. 1 to 6 may be employed both as a transmission type element and as reflective type element. Also, combinations for examples Nos. 7 to 13 are not sufficiently good for employment as a transmission type element. However, since greater emphasis is being placed on brightness in the bright state rather than on the contrast ratio when employing a reflective type element, these examples may be employed as reflective type elements. The contrast ratio for a reflective type element should be at least 1:2. Therefore, if the contrast ratio when measured as a transmission type element is 1:1.4, it will sufficiently good for employment as a reflective type element. Combinations for examples Nos. 14 to 17 provided as comparison examples are not sufficiently good for employment as both a transmission type element and as a reflective type element.

The results achieved by human visual observation in determining whether or not an element may be employed as a reflective type element through the use of a reflective plate are shown in FIG. 5. We have found that, if P and A are combined to fall within values depicted by the cross-hatching in FIG. 5, the liquid crystal electrooptical element may be employed as a reflective type element. The results for various conditions for R are shown below.

All remaining Tables illustrating examples are interpretative in the same manner as Table 1.

(1-2) When R=0.16.

The results are shown in Table 2:

TABLE 2

| No. | P | A | I+ | I– | CR | T | R |
|---|---|---|---|---|---|---|---|
| 1 | 45 | –45 | 0.23 | 28.52 | 125.16 | o | o |
| 2 | 50 | –40 | 0.23 | 27.66 | 121.40 | o | o |
| 3 | 40 | –50 | 0.23 | 27.66 | 121.40 | o | o |
| 4 | 50 | –50 | 0.53 | 28.83 | 54.02 | o | o |
| 5 | 50 | 50 | 45.91 | 18.80 | 2.44 | * | o |
| 6 | 55 | 55 | 45.91 | 21.28 | 2.16 | * | o |
| 7 | 30 | 20 | 45.60 | 29.29 | 1.56 | * | o |
| 8 | 60 | 70 | 43.48 | 28.94 | 1.50 | * | o |
| 9 | 60 | –80 | 24.03 | 35.07 | 1.46 | * | o |
| 10 | 40 | 10 | 37.26 | 25.78 | 1.45 | * | o |
| 11 | 60 | 80 | 38.60 | 32.14 | 1.20 | * | * |
| 12 | 20 | 10 | 45.60 | 38.83 | 1.17 | * | * |
| 13 | 80 | –80 | 38.60 | 44.03 | 1.14 | * | * |
| 14 | 80 | 80 | 45.92 | 43.24 | 1.06 | * | * |
| 15 | 0 | 20 | 38.59 | 40.35 | 1.05 | * | * |
| 16 | 0 | 0 | 45.90 | 46.22 | 1.01 | * | * |
| 17 | 90 | 80 | 45.63 | 45.46 | 1.00 | * | * | d=1.6 μm, L=1.60, L·Δn=0.160, λ=0.38~0.78 nm (1-3) When R=0.2.

The results are shown in Table 3:

TABLE 3

| No. | P | A | I+ | I– | CR | T | R |
|---|---|---|---|---|---|---|---|
| 1 | 50 | –50 | 0.24 | 37.80 | 160.17 | o | o |
| 2 | 45 | –55 | 0.24 | 36.60 | 155.08 | o | o |
| 3 | 55 | –45 | 0.24 | 36.60 | 155.08 | o | o |
| 4 | 40 | –60 | 0.24 | 33.30 | 141.10 | o | o |
| 5 | 60 | –40 | 0.24 | 33.30 | 141.10 | o | o |
| 6 | 65 | –25 | 0.53 | 22.10 | 41.54 | o | o |
| 7 | 50 | 40 | 45.80 | 8.85 | 5.18 | * | o |
| 8 | 20 | 70 | 14.50 | 2.96 | 4.90 | * | o |
| 9 | 40 | 40 | 45.50 | 9.98 | 4.56 | * | o |
| 10 | 30 | 40 | 42.50 | 12.70 | 3.35 | * | o |
| 11 | 160 | 30 | 14.50 | 39.50 | 2.72 | * | o |
| 12 | 70 | 50 | 43.40 | 17.70 | 2.45 | * | o |
| 13 | 40 | –20 | 16.10 | 36.20 | 2.25 | * | o |
| 14 | 50 | –80 | 14.50 | 31.20 | 2.15 | * | o |
| 15 | 90 | 30 | 16.10 | 12.30 | 1.31 | * | * |
| 16 | 60 | 0 | 16.10 | 12.30 | 1.31 | * | * |
| 17 | 0 | 20 | 37.20 | 40.60 | 1.09 | * | * | d=2.0 μm, L=2.00, L·Δn=0.200, λ=0.38 nm~0.78 nm (1-4) When R=0.22.

The results are shown in Table 4:

TABLE 4

| No. | P | A | I+ | I− | CR | T | R |
|---|---|---|---|---|---|---|---|
| 1 | 50 | −50 | 0.13 | 42.49 | 332.60 | o | o |
| 2 | 60 | −40 | 0.13 | 37.51 | 293.87 | o | o |
| 3 | 40 | −60 | 0.13 | 37.51 | 293.87 | o | o |
| 4 | 30 | −70 | 0.13 | 24.91 | 195.49 | o | o |
| 5 | 80 | −20 | 0.13 | 10.62 | 83.33 | o | o |
| 6 | 130 | 40 | 0.78 | 41.23 | 52.54 | o | o |
| 7 | 35 | −75 | 2.34 | 25.18 | 10.76 | o | o |
| 8 | 50 | 40 | 47.91 | 5.67 | 8.45 | * | o |
| 9 | 50 | 50 | 47.22 | 6.89 | 6.85 | * | o |
| 10 | 160 | 40 | 7.25 | 38.32 | 5.28 | * | o |
| 11 | 30 | 40 | 43.85 | 10.09 | 4.35 | * | o |
| 12 | 40 | −80 | 7.18 | 25.76 | 3.59 | * | o |
| 13 | 140 | 70 | 10.10 | 32.97 | 3.26 | * | o |
| 14 | 20 | −50 | 10.19 | 33.01 | 3.24 | * | o |
| 15 | 0 | 20 | 38.11 | 42.01 | 1.10 | * | * |
| 16 | 20 | 0 | 45.87 | 42.94 | 1.07 | * | * |
| 17 | 90 | 80 | 47.75 | 46.72 | 1.02 | * | * | d=2.2 μm, L=2.20, L·Δn=0.220, λ=0.38 nm~0.78 nm
(1-5) When R=0.24.
The results shown in Table 5:

TABLE 5

| No. | P | A | I+ | I− | CR | T | R |
|---|---|---|---|---|---|---|---|
| 1 | 50 | −50 | 0.06 | 42.66 | 658.13 | o | o |
| 2 | 45 | −55 | 0.06 | 41.41 | 640.21 | o | o |
| 3 | 55 | −45 | 0.06 | 41.41 | 640.21 | o | o |
| 4 | 40 | −60 | 0.06 | 37.79 | 588.01 | o | o |
| 5 | 60 | −40 | 0.06 | 37.79 | 588.01 | o | o |
| 6 | 30 | −70 | 0.06 | 25.32 | 402.85 | o | o |
| 7 | 40 | 50 | 42.68 | 2.46 | 17.37 | o | o |
| 8 | 30 | 50 | 36.52 | 3.40 | 10.75 | o | o |
| 9 | 60 | −60 | 6.28 | 42.92 | 6.84 | * | o |
| 10 | 40 | −30 | 10.53 | 42.17 | 4.01 | * | o |
| 11 | 45 | −25 | 10.53 | 38.55 | 3.66 | * | o |
| 12 | 60 | −70 | 12.76 | 42.01 | 3.29 | * | o |
| 13 | 20 | −40 | 18.01 | 39.01 | 2.17 | * | o |
| 14 | 80 | 80 | 46.59 | 40.37 | 1.15 | * | * |
| 15 | 20 | 0 | 45.52 | 40.53 | 1.12 | * | * |
| 16 | 0 | 20 | 36.49 | 39.84 | 1.09 | * | * |
| 17 | 90 | 80 | 47.62 | 44.07 | 1.08 | * | * | d=2.4 μm, L=2.40, L·Δn=0.240, λ=0.38nm~0.78 nm
(1-6) When R=0.28.
The results are shown in Table 6:

TABLE 6

| No. | P | A | I+ | I− | CR | T | R |
|---|---|---|---|---|---|---|---|
| 1 | 50 | −50 | 0.10 | 46.10 | 443.27 | o | o |
| 2 | 40 | −60 | 0.10 | 40.70 | 402.97 | o | o |
| 3 | 60 | −40 | 0.10 | 40.70 | 402.97 | o | o |
| 4 | 25 | −75 | 0.09 | 19.10 | 218.54 | o | o |
| 5 | 75 | −25 | 0.09 | 19.10 | 218.54 | o | o |
| 6 | 60 | 30 | 41.40 | 0.50 | 83.13 | o | o |
| 7 | 50 | 40 | 46.00 | 0.62 | 74.55 | o | o |
| 8 | 80 | 20 | 20.40 | 1.66 | 12.29 | o | o |
| 9 | 160 | 30 | 10.50 | 44.90 | 4.28 | * | o |
| 10 | 60 | −70 | 10.60 | 44.90 | 4.24 | * | o |
| 11 | 65 | 55 | 46.00 | 12.00 | 3.83 | * | o |
| 12 | 40 | 20 | 45.00 | 12.00 | 3.75 | * | o |
| 13 | 40 | −30 | 12.70 | 44.80 | 3.53 | * | o |
| 14 | 140 | −20 | 33.40 | 12.00 | 2.78 | * | o |
| 15 | 20 | −10 | 41.40 | 45.00 | 1.09 | * | * |
| 16 | 10 | 10 | 44.20 | 41.10 | 1.08 | * | * |
| 17 | 90 | 80 | 46.00 | 45.00 | 1.02 | * | * | d=2.8 μm, L=2.80, L·Δn=0.280, λ=0.38 nm~0.78 nm
(1-7) When R=0.32.
The results are shown in Table 7:

TABLE 7

| No. | P | A | I+ | I− | CR | T | R |
|---|---|---|---|---|---|---|---|
| 1 | 80 | 10 | 15.10 | 0.07 | 220.12 | o | o |
| 2 | 50 | −50 | 0.49 | 43.90 | 89.78 | o | o |
| 3 | 60 | −50 | 0.53 | 43.10 | 81.78 | o | o |
| 4 | 40 | −60 | 0.48 | 38.90 | 81.38 | o | o |
| 5 | 160 | −70 | 30.90 | 0.59 | 52.46 | o | o |
| 6 | 75 | −25 | 0.44 | 18.50 | 42.53 | o | o |
| 7 | 70 | 10 | 23.00 | 1.53 | 15.03 | o | o |
| 8 | 120 | 40 | 8.34 | 38.20 | 4.58 | * | o |
| 9 | 85 | −45 | 8.43 | 27.60 | 3.27 | * | o |
| 10 | 40 | 10 | 43.00 | 19.40 | 2.22 | * | o |
| 11 | 80 | 50 | 43.00 | 19.40 | 2.22 | * | o |
| 12 | 50 | −20 | 15.20 | 32.40 | 2.13 | * | o |
| 13 | 0 | 10 | 38.00 | 45.20 | 1.19 | * | * |
| 14 | 20 | 0 | 45.70 | 40.30 | 1.13 | * | * |
| 15 | 90 | −90 | 43.10 | 46.30 | 1.07 | * | * |
| 16 | 10 | 10 | 43.10 | 41.20 | 1.05 | * | * |
| 17 | 90 | 80 | 45.80 | 44.60 | 1.03 | * | * | d=3.2 μm, L=3.20, L·Δn=0.320, λ=0.38 nm~0.78 nm
(1-8) When R=0.36.
The results are shown in Table 8:

TABLE 8

| No. | P | A | I+ | I− | CR | T | R |
|---|---|---|---|---|---|---|---|
| 1 | 55 | −55 | 0.36 | 39.37 | 108.63 | o | o |
| 2 | 45 | −65 | 0.33 | 35.06 | 104.81 | o | o |
| 3 | 65 | −45 | 0.33 | 35.06 | 104.81 | o | o |
| 4 | 75 | −35 | 0.26 | 24.18 | 91.59 | o | o |
| 5 | 75 | 15 | 25.88 | 1.02 | 25.45 | o | o |
| 6 | 70 | 10 | 25.88 | 2.11 | 12.26 | o | o |
| 7 | 80 | 20 | 25.89 | 2.12 | 12.20 | o | o |
| 8 | 40 | −40 | 10.77 | 36.57 | 3.40 | * | o |
| 9 | 50 | 10 | 39.92 | 12.91 | 3.09 | * | o |
| 10 | 80 | 40 | 39.95 | 12.98 | 3.08 | * | o |
| 11 | 40 | 20 | 46.06 | 16.21 | 2.84 | * | o |
| 12 | 70 | −80 | 20.44 | 44.51 | 2.18 | * | o |
| 13 | 40 | −30 | 18.10 | 35.63 | 1.97 | * | o |
| 14 | 45 | −25 | 18.09 | 32.46 | 1.79 | * | o |
| 15 | 10 | 0 | 45.26 | 43.68 | 1.04 | * | * |
| 16 | 80 | 80 | 41.58 | 41.92 | 1.01 | * | * |
| 17 | 20 | −20 | 40.10 | 40.19 | 1.00 | * | * | d=3.6 μm, L=3.60, L·Δn=0.360, λ=0.38 nm~0.78 nm
(1-9) When R=0.4.
The results are shown in Table 9:

TABLE 9

| No. | P | A | I+ | I− | CR | T | R |
|---|---|---|---|---|---|---|---|
| 1 | 85 | 5 | 13.14 | 0.02 | 709.01 | o | o |
| 2 | 55 | −55 | 0.70 | 31.83 | 45.49 | o | o |
| 3 | 60 | −60 | 1.51 | 34.68 | 22.90 | o | o |
| 4 | 80 | −40 | 1.31 | 23.40 | 17.92 | o | o |
| 5 | 70 | −70 | 10.76 | 40.68 | 3.78 | * | o |
| 6 | 75 | −75 | 18.06 | 43.10 | 2.39 | * | o |
| 7 | 90 | 40 | 36.31 | 16.21 | 2.24 | * | o |
| 8 | 50 | 0 | 36.00 | 16.49 | 2.18 | * | o |
| 9 | 60 | −90 | 17.92 | 36.37 | 2.03 | * | o |
| 10 | 90 | −60 | 17.92 | 36.37 | 2.03 | * | o |
| 11 | 40 | 10 | 44.99 | 23.00 | 1.96 | * | o |
| 12 | 30 | −50 | 13.53 | 24.52 | 1.81 | * | o |
| 13 | 60 | 60 | 39.66 | 24.83 | 1.60 | * | o |
| 14 | 0 | 0 | 39.62 | 47.33 | 1.19 | * | * |
| 15 | 10 | −10 | 45.94 | 43.11 | 1.07 | * | * | d=4.0 μm, L=4.00, L·Δn=0.400, λ=0.38 nm~0.78 nm
(1-10) When R=0.42.

The results are shown in Table 10:

TABLE 10

| No. | P | A | I+ | I− | CR | T | R |
|---|---|---|---|---|---|---|---|
| 1 | 175 | −85 | 0.04 | 14.96 | 374.00 | o | o |
| 2 | 55 | −65 | 31.59 | 1.35 | 23.40 | o | o |
| 3 | 170 | −80 | 1.00 | 22.84 | 22.84 | o | o |
| 4 | 45 | −75 | 26.55 | 1.19 | 22.31 | o | o |
| 5 | 90 | −30 | 15.07 | 0.83 | 18.16 | o | o |
| 6 | 5 | 65 | 12.00 | 0.74 | 16.22 | o | o |
| 7 | 105 | −15 | 10.00 | 0.64 | 15.63 | o | o |
| 8 | 70 | −20 | 15.75 | 3.60 | 4.38 | * | o |
| 9 | 90 | −50 | 31.02 | 9.22 | 3.36 | * | o |
| 10 | 150 | −35 | 24.30 | 44.20 | 1.82 | * | o | d=3.0, L=3.00, L·Δn=0.420, λ=0.38 nm~0.78 nm (1-11) When R=0.428.

The results are shown in Table 11:

TABLE 11

| No. | P | A | I+ | I− | CR | T | R |
|---|---|---|---|---|---|---|---|
| 1 | 175 | −85 | 0.05 | 15.80 | 316.00 | o | o |
| 2 | 55 | −65 | 30.51 | 1.34 | 22.77 | o | o |
| 3 | 50 | −70 | 28.70 | 1.27 | 22.60 | o | o |
| 4 | 90 | −30 | 15.48 | 0.73 | 21.21 | o | o |
| 5 | 105 | −15 | 10.23 | 0.51 | 20.06 | o | o |
| 6 | 10 | 70 | 10.00 | 0.54 | 18.52 | o | o |
| 7 | 165 | −85 | 1.80 | 23.79 | 13.22 | o | o |
| 8 | 90 | −50 | 31.71 | 8.77 | 3.62 | * | o |
| 9 | 70 | −20 | 13.50 | 5.20 | 2.60 | * | o |
| 10 | 155 | −40 | 23.54 | 41.53 | 1.76 | * | o | d=2.3 μm, L=2.30, L·Δn=0.428, λ=0.38 nm~0.78 nm (1-12) When R=0.44.

The results are shown in Table 12:

TABLE 12

| No. | P | A | I+ | I− | CR | T | R |
|---|---|---|---|---|---|---|---|
| 1 | 85 | 5 | 16.64 | 0.05 | 315.58 | o | o |
| 2 | 105 | −15 | 0.38 | 11.15 | 28.98 | o | o |
| 3 | 150 | 30 | 1.35 | 29.99 | 22.17 | o | o |
| 4 | 70 | −50 | 1.25 | 27.30 | 21.90 | o | o |
| 5 | 55 | −65 | 1.33 | 28.88 | 21.69 | o | o |
| 6 | 80 | 10 | 24.73 | 1.32 | 18.70 | o | o |
| 7 | 40 | −70 | 1.48 | 20.25 | 13.65 | o | o |
| 8 | 100 | 30 | 25.20 | 8.97 | 2.81 | * | o |
| 9 | 75 | −75 | 15.66 | 43.46 | 2.77 | * | o |
| 10 | 50 | 10 | 44.68 | 18.08 | 2.47 | * | o |
| 11 | 75 | 45 | 47.38 | 23.00 | 2.06 | * | o |
| 12 | 80 | 50 | 47.57 | 25.97 | 1.83 | * | o |
| 13 | 10 | −30 | 45.19 | 30.00 | 1.51 | * | o | d=4.4 μm, L=4.40, L·Δn=0.440, λ=0.38 nm~0.78 nm (1-13) When R=0.45.

The results are shown in Table 13:

TABLE 13

| No. | P | A | I+ | I− | CR | T | R |
|---|---|---|---|---|---|---|---|
| 1 | 175 | −85 | 0.05 | 16.64 | 332.80 | o | o |
| 2 | 100 | −20 | 11.73 | 0.41 | 28.61 | o | o |
| 3 | 150 | 30 | 29.43 | 1.36 | 21.64 | o | o |
| 4 | 165 | −85 | 1.89 | 24.74 | 13.09 | o | o |
| 5 | 90 | −50 | 32.40 | 8.32 | 3.89 | * | o |
| 6 | 120 | −90 | 32.69 | 47.52 | 1.45 | * | o |
| 7 | 100 | 50 | 22.40 | 31.05 | 1.39 | * | o |
| 8 | 10 | 10 | 44.96 | 39.00 | 1.15 | * | * | d=3.0 μm, L=3.00, L·Δn=0.450, λ=0.38 nm~0.78 nm (1-14) When R=0.56.

The results are shown in Table 14:

TABLE 14

| No. | P | A | I+ | I− | CR | T | R |
|---|---|---|---|---|---|---|---|
| 1 | 85 | 5 | 25.01 | 0.21 | 117.74 | o | o |
| 2 | 90 | 10 | 25.10 | 0.29 | 87.68 | o | o |
| 3 | 110 | −20 | 0.41 | 22.48 | 55.13 | o | o |
| 4 | 75 | −5 | 25.47 | 0.50 | 51.30 | o | o |
| 5 | 90 | −40 | 1.94 | 23.53 | 12.11 | o | o |
| 6 | 70 | −90 | 13.77 | 42.63 | 3.09 | * | o |
| 7 | 85 | 35 | 41.05 | 14.20 | 2.89 | * | o |
| 8 | 40 | −10 | 43.19 | 15.35 | 2.81 | * | o |
| 9 | 135 | 85 | 42.26 | 15.04 | 2.81 | * | o |
| 10 | 100 | 50 | 42.85 | 15.45 | 2.77 | * | o |
| 11 | 20 | −30 | 44.03 | 15.88 | 2.77 | * | o |
| 12 | 120 | −50 | 17.62 | 42.85 | 2.43 | * | o |
| 13 | 140 | −30 | 17.66 | 42.76 | 2.42 | * | o |
| 14 | 140 | −50 | 30.99 | 39.52 | 1.28 | * | * |
| 15 | 120 | −70 | 32.44 | 40.63 | 1.25 | * | * |
| 16 | 160 | −30 | 32.61 | 40.44 | 1.24 | * | * | d=4.0 μm, L=4.00, L·Δn=0.560, λ=0.38 nm~0.78 nm (1-15) When R=0.64.

The results are shown in Table 15:

TABLE 15

| No. | P | A | I+ | I− | CR | T | R |
|---|---|---|---|---|---|---|---|
| 1 | 85 | 5 | 29.95 | 0.24 | 124.72 | o | o |
| 2 | 80 | 0 | 30.27 | 0.57 | 53.28 | o | o |
| 3 | 90 | 10 | 30.06 | 0.57 | 52.80 | o | o |
| 4 | 170 | 0 | 15.97 | 46.91 | 2.94 | * | o |
| 5 | 0 | −50 | 41.86 | 16.07 | 2.60 | * | o |
| 6 | 40 | 40 | 15.37 | 35.56 | 2.31 | * | o |
| 7 | 100 | 50 | 42.88 | 19.46 | 2.20 | * | o |
| 8 | 175 | −5 | 22.12 | 46.84 | 2.12 | * | o |
| 9 | 0 | 0 | 22.34 | 47.20 | 2.11 | * | o |
| 10 | 60 | 20 | 37.23 | 17.84 | 2.09 | * | o |
| 11 | 100 | −80 | 21.11 | 43.84 | 2.08 | * | o |
| 12 | 80 | 80 | 21.11 | 43.84 | 2.08 | * | o |
| 13 | 120 | 70 | 44.29 | 21.85 | 2.03 | * | o |
| 14 | 40 | 0 | 41.63 | 24.18 | 1.72 | * | o |
| 15 | 20 | −20 | 44.78 | 28.91 | 1.55 | * | o |
| 16 | 60 | 50 | 22.42 | 33.91 | 1.51 | * | o | d=6.4 μm, L=6.40, L·Δn=0.640, λ=0.38 nm~0.78 nm (1-16) When R=0.7.

The results are shown in Table 16:

TABLE 16

| No. | P | A | I+ | I− | CR | T | R |
|---|---|---|---|---|---|---|---|
| 1 | 175 | −85 | 0.23 | 32.52 | 141.39 | o | o |
| 2 | 0 | −90 | 0.22 | 27.42 | 124.64 | o | o |
| 3 | 170 | −90 | 0.83 | 32.85 | 39.58 | o | o |
| 4 | 85 | 15 | 2.53 | 36.34 | 14.36 | o | o |
| 5 | 95 | 15 | 2.54 | 33.71 | 13.27 | o | o |
| 6 | 130 | −20 | 25.35 | 1.99 | 12.74 | o | o |
| 7 | 20 | 60 | 19.46 | 1.91 | 10.19 | o | o |
| 8 | 90 | −85 | 43.50 | 12.31 | 3.53 | * | o |
| 9 | 105 | 50 | 24.10 | 48.34 | 2.01 | * | o |
| 10 | 150 | −50 | 23.75 | 23.71 | 1.00 | * | * | d=4.4 μm, L=4.40, L·Δn=0.700, λ=0.38 nm~0.78 nm (1-17) When R=0.72.

The results are shown in Table 17:

TABLE 17

| No. | P | A | I+ | I− | CR | T | R |
|---|---|---|---|---|---|---|---|
| 1 | 90 | 0 | 28.61 | 0.13 | 228.70 | o | o |
| 2 | 85 | 5 | 32.40 | 0.18 | 184.09 | o | o |
| 3 | 80 | 0 | 32.87 | 1.01 | 32.51 | o | o |
| 4 | 0 | 20 | 10.94 | 42.46 | 3.88 | * | o |
| 5 | 0 | 30 | 9.50 | 36.45 | 3.84 | * | o |
| 6 | 80 | −80 | 12.26 | 44.05 | 3.59 | * | o |
| 7 | 175 | 5 | 14.19 | 47.01 | 3.31 | * | o |
| 8 | 70 | −20 | 33.64 | 11.52 | 2.92 | * | o |
| 9 | 120 | −60 | 9.61 | 25.40 | 2.64 | * | o |
| 10 | 175 | −5 | 17.59 | 46.21 | 2.63 | * | o |
| 11 | 90 | −90 | 17.73 | 45.23 | 2.55 | * | o |
| 12 | 20 | −60 | 39.55 | 16.38 | 2.41 | * | o |
| 13 | 60 | −20 | 39.55 | 16.38 | 2.41 | * | o |
| 14 | 100 | 40 | 40.17 | 19.46 | 2.06 | * | o |
| 15 | 80 | 40 | 30.99 | 16.30 | 1.90 | * | o |
| 16 | 30 | −30 | 46.40 | 31.23 | 1.49 | * | o |
| 17 | 160 | 40 | 21.34 | 30.61 | 1.43 | * | o | d=4.5 μm, L=4.50, L·Δn=0.72, λ=0.38 nm~0.78 nm
(1-18) When R=0.78.
The results are shown in Table 18:

TABLE 18

| No. | P | A | I+ | I− | CR | T | R |
|---|---|---|---|---|---|---|---|
| 1 | 90 | 0 | 30.34 | 0.06 | 516.13 | o | o |
| 2 | 85 | 5 | 31.83 | 0.11 | 289.63 | o | o |
| 3 | 95 | −5 | 27.22 | 0.53 | 51.82 | o | o |
| 4 | 90 | −80 | 15.90 | 46.79 | 2.94 | * | o |
| 5 | 85 | −85 | 16.34 | 47.98 | 2.94 | * | o |
| 6 | 5 | 25 | 12.96 | 37.63 | 2.90 | * | o |
| 7 | 60 | 0 | 33.10 | 11.51 | 2.88 | * | o |
| 8 | 0 | 0 | 17.80 | 48.19 | 2.71 | * | o |
| 9 | 80 | 80 | 16.11 | 43.40 | 2.69 | * | o |
| 10 | 20 | 0 | 23.65 | 42.13 | 1.78 | * | o |
| 11 | 110 | 30 | 40.31 | 23.22 | 1.74 | * | o |
| 12 | 25 | 5 | 21.69 | 36.85 | 1.70 | * | o |
| 13 | 65 | −65 | 27.25 | 43.64 | 1.60 | * | o |
| 14 | 100 | 40 | 37.90 | 24.78 | 1.53 | * | o |
| 15 | 40 | −40 | 46.75 | 39.60 | 1.18 | * | * |
| 16 | 30 | −30 | 44.25 | 41.19 | 1.07 | * | * |
| 17 | 50 | −50 | 42.13 | 39.99 | 1.05 | * | * | d=4.9 μm, L=4.90, L·Δn=0.78, λ=0.38 nm~0.78 nm
(1-19) When R=0.84.
The results are shown in Table 19:

TABLE 19

| No. | P | A | I+ | I− | CR | T | R |
|---|---|---|---|---|---|---|---|
| 1 | 85 | 5 | 27.05 | 0.05 | 534.38 | o | o |
| 2 | 90 | 0 | 27.91 | 0.08 | 359.67 | o | o |
| 3 | 80 | 10 | 24.74 | 0.33 | 75.31 | o | o |
| 4 | 95 | −5 | 27.20 | 0.41 | 66.98 | o | o |
| 5 | 80 | 20 | 21.82 | 2.13 | 10.26 | o | o |
| 6 | 0 | 0 | 18.31 | 46.63 | 2.55 | * | o |
| 7 | 5 | 5 | 17.82 | 45.37 | 2.55 | * | o |
| 8 | 175 | −5 | 17.82 | 45.37 | 2.55 | * | o |
| 9 | 5 | −5 | 18.92 | 46.29 | 2.45 | * | o |
| 10 | 160 | −30 | 9.41 | 21.84 | 2.32 | * | o |
| 11 | 90 | 30 | 25.56 | 11.24 | 2.28 | * | o |
| 12 | 60 | 0 | 25.04 | 11.21 | 2.23 | * | o |
| 13 | 120 | 0 | 25.98 | 12.12 | 2.14 | * | o |
| 14 | 20 | 0 | 19.11 | 40.80 | 2.14 | * | o |
| 15 | 40 | −30 | 39.66 | 40.58 | 1.02 | * | * |
| 16 | 40 | −40 | 42.34 | 41.57 | 1.02 | * | * |
| 17 | 50 | −50 | 42.47 | 41.94 | 1.10 | * | * | d=5.3 μm, L=5.30, L·Δn=0.84, λ=0.38 nm~0.78 nm
(1-20) When R=0.96.

The results are shown in Table 20:

TABLE 20

| No. | P | A | I+ | I− | CR | T | R |
|---|---|---|---|---|---|---|---|
| 1 | 175 | −85 | 15.58 | 0.07 | 238.44 | o | o |
| 2 | 90 | 0 | 19.55 | 0.30 | 66.13 | o | o |
| 3 | 95 | −5 | 22.94 | 1.67 | 13.75 | o | o |
| 4 | 105 | 15 | 23.56 | 7.01 | 3.36 | * | o |
| 5 | 40 | 10 | 9.82 | 23.41 | 2.38 | * | o |
| 6 | 30 | 20 | 13.36 | 28.60 | 2.14 | * | o |
| 7 | 0 | −30 | 15.38 | 32.68 | 2.12 | * | o |
| 8 | 90 | 70 | 18.77 | 39.58 | 2.11 | * | o |
| 9 | 20 | 0 | 18.71 | 39.33 | 2.10 | * | o |
| 10 | 20 | −10 | 19.04 | 38.84 | 2.04 | * | o |
| 11 | 20 | −20 | 19.84 | 36.42 | 1.84 | * | o |
| 12 | 60 | 60 | 14.22 | 25.72 | 1.81 | * | o |
| 13 | 10 | 10 | 24.48 | 42.89 | 1.75 | * | o |
| 14 | 5 | 5 | 25.92 | 45.33 | 1.75 | * | o |
| 15 | 0 | 0 | 26.42 | 46.18 | 1.75 | * | o | d=4.6 μm, L=4.60, L·Δn=0.96, λ=0.38 nm~0.78 nm
(1-21) When R=1.02.
The results shown in Table 21:

TABLE 21

| No. | P | A | I+ | I− | CR | T | R |
|---|---|---|---|---|---|---|---|
| 1 | 85 | 5 | 10.32 | 0.12 | 84.47 | o | o |
| 2 | 90 | 0 | 14.79 | 0.42 | 35.60 | o | o |
| 3 | 85 | −5 | 15.22 | 0.92 | 16.52 | o | o |
| 4 | 80 | −30 | 29.77 | 13.19 | 2.26 | * | o |
| 5 | 60 | −20 | 18.64 | 9.92 | 1.88 | * | o |
| 6 | 40 | −60 | 32.00 | 17.29 | 1.85 | * | o |
| 7 | 70 | −40 | 34.52 | 18.79 | 1.84 | * | o |
| 8 | 45 | −55 | 33.22 | 18.73 | 1.77 | * | o |
| 9 | 40 | −50 | 28.52 | 16.60 | 1.72 | * | o |
| 10 | 60 | −50 | 37.62 | 22.45 | 1.68 | * | o |
| 11 | 40 | −40 | 24.49 | 16.81 | 1.46 | * | o |
| 12 | 0 | 0 | 1.00 | 1.00 | 1.00 | * | * |
| 13 | 40 | 0 | 1.00 | 1.00 | 1.00 | * | * |
| 14 | 80 | −60 | 1.00 | 1.00 | 1.00 | * | * |
| 15 | 60 | −80 | 1.00 | 1.00 | 1.00 | * | * |
| 16 | 0 | 50 | 1.00 | 1.00 | 1.00 | * | * | d=6.4 μm, L=6.40, L·Δn=1.02, λ=0.38 nm~0.78 nm
(1-22) When R=1.05.
The results are shown in Table 22:

TABLE 22

| No. | P | A | I+ | I− | CR | T | R |
|---|---|---|---|---|---|---|---|
| 1 | 90 | 0 | 11.93 | 0.45 | 26.78 | o | o |
| 2 | 85 | −5 | 12.31 | 0.82 | 14.98 | o | o |
| 3 | 5 | −85 | 12.31 | 0.82 | 14.98 | o | o |
| 4 | 20 | −70 | 17.09 | 5.58 | 3.06 | * | o |
| 5 | 80 | −30 | 26.97 | 12.17 | 2.22 | * | o |
| 6 | 60 | −30 | 21.29 | 9.75 | 2.18 | * | o |
| 7 | 35 | −75 | 29.13 | 14.32 | 2.03 | * | o |
| 8 | 60 | −40 | 27.82 | 13.79 | 2.02 | * | o |
| 9 | 50 | −50 | 29.27 | 15.24 | 1.92 | * | o |
| 10 | 60 | −50 | 33.88 | 19.06 | 1.78 | * | o |
| 11 | 40 | −40 | 20.23 | 12.55 | 1.61 | * | o |
| 12 | 40 | −20 | 14.38 | 16.67 | 1.16 | * | * |
| 13 | 20 | 0 | 1.00 | 1.00 | 1.00 | * | * |
| 14 | 60 | −80 | 1.00 | 1.00 | 1.00 | * | * |
| 15 | 80 | −60 | 1.00 | 1.00 | 1.00 | * | * |
| 16 | 20 | −20 | 1.00 | 1.00 | 1.00 | * | * |
| 17 | 60 | 60 | 1.00 | 1.00 | 1.00 | * | * | d=6.6 μm, L=6.60, L·Δn=1.05, λ=0.38 nm~0.78 nm
(1-23) When R=1.06.

The results are shown in Table 23:

TABLE 23

| No. | P | A | I+ | I− | CR | T | R |
|---|---|---|---|---|---|---|---|
| 1 | 0 | −90 | 0.45 | 11.93 | 26.51 | ○ | ○ |
| 2 | 85 | −5 | 0.82 | 12.31 | 15.01 | ○ | ○ |
| 3 | 95 | 5 | 0.82 | 12.31 | 15.01 | ○ | ○ |
| 4 | 0 | 65 | 8.53 | 21.50 | 2.52 | * | ○ |
| 5 | 130 | 70 | 16.67 | 14.38 | 1.16 | * | * |
| 6 | 70 | 70 | 1.00 | 1.00 | 1.00 | * | * | d=5.1 μm, L=5.10, L·Δn=1.06, λ=0.38 nm~0.78 nm
(1-24) When R=1.08.
The results are shown in Table 24:

TABLE 24

| No. | P | A | I+ | I− | CR | T | R |
|---|---|---|---|---|---|---|---|
| 1 | 85 | −15 | 14.86 | 4.00 | 3.72 | * | ○ |
| 2 | 20 | −80 | 16.31 | 5.24 | 3.11 | * | ○ |
| 3 | 80 | −20 | 16.31 | 5.24 | 3.11 | * | ○ |
| 4 | 25 | −85 | 21.47 | 9.60 | 2.24 | * | ○ |
| 5 | 85 | −25 | 21.47 | 9.60 | 2.24 | * | ○ |
| 6 | 65 | −35 | 21.78 | 9.95 | 2.19 | * | ○ |
| 7 | 30 | −80 | 23.27 | 11.14 | 2.09 | * | ○ |
| 8 | 80 | −30 | 23.27 | 11.14 | 2.09 | * | ○ |
| 9 | 40 | −60 | 23.24 | 11.21 | 2.07 | * | ○ |
| 10 | 60 | −40 | 23.24 | 11.21 | 2.07 | * | ○ |
| 11 | 45 | −55 | 24.20 | 12.04 | 2.01 | * | ○ |
| 12 | 55 | −45 | 24.20 | 12.04 | 2.01 | * | ○ |
| 13 | 40 | −70 | 26.99 | 14.34 | 1.88 | * | ○ |
| 14 | 40 | 50 | 30.51 | 36.80 | 1.21 | * | * |
| 15 | 30 | 50 | 32.69 | 35.12 | 1.07 | * | * |
| 16 | 40 | 60 | 32.90 | 35.18 | 1.07 | * | * |
| 17 | 20 | 40 | 34.77 | 37.07 | 1.07 | * | * | d=5.8 μm, L=5.80, L·Δn=1.08, λ=0.38 mn~0.78 nm
(1-25) When R=1.12.
The results are shown in Table 25:

TABLE 25

| No. | P | A | I+ | I− | CR | T | R |
|---|---|---|---|---|---|---|---|
| 1 | 70 | −30 | 16.34 | 7.77 | 2.10 | * | ○ |
| 2 | 60 | −40 | 19.00 | 10.20 | 1.86 | * | ○ |
| 3 | 60 | −50 | 25.11 | 15.42 | 1.63 | * | ○ |
| 4 | 50 | −60 | 25.11 | 15.42 | 1.63 | * | ○ |
| 5 | 50 | 20 | 17.07 | 25.88 | 1.52 | * | ○ |
| 6 | 50 | −70 | 29.97 | 20.61 | 1.45 | * | ○ |
| 7 | 90 | 50 | 16.02 | 23.28 | 1.45 | * | ○ |
| 8 | 40 | 10 | 19.54 | 28.25 | 1.45 | * | ○ |
| 9 | 55 | −65 | 30.76 | 21.34 | 1.44 | * | ○ |
| 10 | 60 | −60 | 31.04 | 21.59 | 1.44 | * | ○ |
| 11 | 80 | 50 | 19.80 | 28.44 | 1.44 | * | ○ |
| 12 | 55 | 35 | 21.72 | 30.84 | 1.42 | * | ○ |
| 13 | 50 | 30 | 21.93 | 31.06 | 1.42 | * | ○ |
| 14 | 0 | 40 | 35.72 | 31.00 | 1.15 | * | * |
| 15 | 40 | −30 | 11.39 | 10.08 | 1.13 | * | * |
| 16 | 30 | 60 | 34.00 | 31.96 | 1.06 | * | * |
| 17 | 40 | 60 | 35.35 | 36.32 | 1.03 | * | * | d=5.4 μm, L=5.40, L·Δn=1.12, λ=0.38 nm~0.78 nm
(1-26) When R=1.9.
The results are shown in Table 26:

TABLE 26

| No. | P | A | I+ | I− | CR | T | R |
|---|---|---|---|---|---|---|---|
| 1 | 20 | 70 | 18.50 | 8.20 | 2.26 | * | ○ |
| 2 | 120 | −30 | 27.60 | 14.90 | 1.85 | * | ○ |

TABLE 26-continued

| No. | P | A | I+ | I− | CR | T | R |
|---|---|---|---|---|---|---|---|
| 3 | 140 | −40 | 32.60 | 20.70 | 1.57 | * | ○ |
| 4 | 60 | −40 | 16.00 | 25.10 | 1.57 | * | ○ |
| 5 | 40 | −60 | 16.00 | 25.10 | 1.57 | * | ○ |
| 6 | 110 | 60 | 24.10 | 35.30 | 1.46 | * | ○ |
| 7 | 90 | −90 | 43.60 | 48.00 | 1.10 | * | * |
| 8 | 110 | −70 | 38.90 | 36.40 | 1.07 | * | * |
| 9 | 170 | −80 | 5.80 | 2.30 | 2.52 | * | * |
| 10 | 80 | −20 | 8.80 | 7.50 | 1.17 | * | * | d=19.0 μm, L=19.0, L·Δn=1.900, λ=0.38 nm~0.78 nm
(1-27) When R=2.5.
The results are shown in Table 27:

TABLE 27

| No. | P | A | I+ | I− | CR | T | R |
|---|---|---|---|---|---|---|---|
| 1 | 110 | −15 | 12.80 | 7.30 | 1.75 | * | ○ |
| 2 | 105 | −20 | 12.70 | 7.30 | 1.74 | * | ○ |
| 3 | 20 | 70 | 14.60 | 9.00 | 1.62 | * | ○ |
| 4 | 115 | −20 | 16.70 | 11.10 | 1.50 | * | ○ |
| 5 | 110 | −25 | 16.60 | 11.10 | 1.50 | * | ○ |
| 6 | 120 | −30 | 21.90 | 16.30 | 1.34 | * | ○ |
| 7 | 140 | −40 | 26.90 | 22.50 | 1.20 | * | * |
| 8 | 110 | 60 | 29.00 | 34.20 | 1.18 | * | * |
| 9 | 60 | −40 | 20.50 | 23.50 | 1.15 | * | * |
| 10 | 90 | −90 | 43.80 | 47.90 | 1.09 | * | * |
| 11 | 130 | −90 | 26.00 | 28.10 | 1.08 | * | * |
| 12 | 160 | 20 | 36.60 | 38.40 | 1.05 | * | * |
| 13 | 170 | −30 | 33.20 | 34.30 | 1.03 | * | * |
| 14 | 90 | −50 | 28.60 | 28.10 | 1.02 | * | * |
| 15 | 0 | −90 | 3.90 | 0.00 | 975.00 | * | * |
| 16 | 170 | −80 | 5.50 | 2.50 | 2.20 | * | * |
| 17 | 80 | −20 | 9.40 | 7.10 | 1.32 | * | ○ | d=25.0 μm, L=25.00, L·Δn=2.500, λ=0.38 nm~0.78 nm
(1-28) In the above embodiments confirmed that practical implementations of the liquid crystal electrooptical element are possible if the twist angle, $\phi_r$, is in the range $160° \leq \phi_r \leq 200°$. The mutual settings for P and A differ between the reflective type element and transmission type element because, as previously indicated, the contrast ratio in reflective type elements differs from that in transmission type elements. Their relationship is tabulated as follows:

(1) Reflective type element:

(1) When $0.102 \leq R \leq 0.4$ or $0.78 \leq R \leq 0.96$,
  $[P + \alpha1 \leq A \leq P + \alpha2$ and $-P + \beta1 \leq A \leq -P + \beta2]$ or
  $[P + \gamma1 \leq A \leq P + \gamma2$ and $-P + \delta1 \leq A \leq -P + \delta2]$
(2) When $0.72 \leq R \leq 0.78$,
  $[P + \alpha1 \leq A \leq P + \alpha2$ and $-P + \beta1 \leq A \leq -P + \beta2]$ or
  $[P + \gamma1 \leq A \leq P + \gamma2]$
(3) When $0.40 \leq R \leq 0.72$, $0.96 \leq R \leq 0.99$, or $1.05 \leq R \leq 1.12$,
  $[P + \alpha1 \leq A \leq P + \alpha2]$ or
  $[P + \gamma1 \leq A \leq P + \gamma2]$
(4) When $0.99 \leq R \leq 1.02$,
  $[P + \alpha1 \leq A \leq P + \alpha2]$
(5) When $1.02 \leq R \leq 1.05$,
  $[P + \gamma1 \leq A \leq P + \gamma2]$ Provided
$\alpha1 = -109.4 \cdot R - 133.1$  $(0.102 \leq R \leq 1.02)$
  $-225.0$  $(1.05 \leq R \leq 1.12)$
$\alpha2 = -45.0$  $(0.102 \leq R \leq 0.32)$
  $6696.4 \cdot R^3 - 8720.1 \cdot R^2 + 3354.7 \cdot R - 445.0$
    $(0.32 \leq R \leq 0.64)$
  $1519.0 \cdot R^3 - 4175.2 \cdot R^2 + 3568.7 \cdot R - 1087.0$
    $(0.64 \leq R \leq 1.02)$
  $-333.3 \cdot R + 175.0$  $(1.05 \leq R \leq 1.12)$ -continued $\beta 1 = -9114.6 \cdot R^3 + 6666.7 \cdot R^2 - 1577.1 \cdot R + 74.0$
$\quad\quad\quad\quad\quad\quad\quad\quad\quad\quad\quad\quad\quad (0.102 \leq R \leq 0.36)$
$\quad -55.0 \quad\quad\quad\quad\quad\quad\quad\quad\quad\quad (0.36 \leq R \leq 0.40)$
$\quad -75.0 \quad\quad\quad\quad\quad\quad\quad\quad\quad\quad (0.72 \leq R \leq 0.96)$
$\beta 2 = 9114.6 \cdot R^3 - 6666.7 \cdot R^2 + 1577.1 \cdot R - 74.0$
$\quad\quad\quad\quad\quad\quad\quad\quad\quad\quad\quad\quad\quad (0.102 \leq R \leq 0.36)$
$\quad 55.0 \quad\quad\quad\quad\quad\quad\quad\quad\quad\quad\quad (0.36 \leq R \leq 0.40)$
$\quad 75.0 \quad\quad\quad\quad\quad\quad\quad\quad\quad\quad\quad (0.72 \leq R \leq 0.96)$
$\gamma 1 = 312.5 \cdot R^2 - 187.5 \cdot R - 37.0$
$\quad\quad\quad\quad\quad\quad\quad\quad\quad\quad\quad\quad\quad (.102 \leq R \leq 0.32)$
$\quad 5208.3 \cdot R^3 - 7500.0 \cdot R^2 + 3341.6 \cdot R - 537.0$
$\quad\quad\quad\quad\quad\quad\quad\quad\quad\quad\quad\quad\quad (0.32 \leq R \leq 0.64)$
$\quad 1030.2 \cdot R^3 - 2722.0 \cdot R^2 + 2225.9 \cdot R - 684.0$
$\quad\quad\quad\quad\quad\quad\quad\quad\quad\quad\quad\quad\quad (0.64 \leq R \leq 0.99)$
$\quad 197575.9 \cdot R^3 - 626821.6 \cdot R^2 + 662332.3 \cdot R - 233217.9$
$\quad\quad\quad\quad\quad\quad\quad\quad\quad\quad\quad\quad\quad (1.02 \leq R \leq 1.12)$
$\gamma 2 = -625.0 \cdot R^2 + 225.0 \cdot R + 27.0 \quad (0.102 \leq R \leq 0.32)$
$\quad 7254.4 \cdot R^3 - 10245.5 \cdot R^2 + 4448.2 \cdot R - 577.0$
$\quad\quad\quad\quad\quad\quad\quad\quad\quad\quad\quad\quad\quad (0.32 \leq R \leq 0.64)$
$\quad -558.0 \cdot R^2 + 736.6 \cdot R - 267.9 \quad (0.64 \leq R \leq 0.99)$
$\quad -5555.5 \cdot R^2 + 11500.0 \cdot R - 6024.9 \quad (1.02 \leq R \leq 1.12)$
$\delta 1 = -6746.0 \cdot R^3 + 5571.4 \cdot R^2 - 1504.0 \cdot R + 166.9$
$\quad\quad\quad\quad\quad\quad\quad\quad\quad\quad\quad\quad\quad (0.102 \leq R \leq 0.40)$
$\quad -55.6 \cdot R + 68.4 \quad\quad\quad\quad\quad\quad (0.78 \leq R \leq 0.96)$
$\delta 2 = 6746.0 \cdot R^3 - 5571.4 \cdot R^2 + 1504.0 \cdot R + 13.1$
$\quad\quad\quad\quad\quad\quad\quad\quad\quad\quad\quad\quad\quad (0.102 \leq R \leq 0.40)$
$\quad 55.6 \cdot R + 111.6 \quad\quad\quad\quad\quad\quad (0.78 \leq R \leq 0.96)$ (2) Transmission type element:

(1) When $0.1 \leq R \leq 0.22$,
$A = P + \alpha$, where $\alpha = -82 \cdot R + \alpha 1$ (2) When $0.22 \leq R \leq 0.42$,
$A = P + \alpha$, where $\alpha = -82 \cdot R + \alpha 1$, or
$A = -P + \beta 1$ (3) When $0.42 < R \leq 0.44$,
$A = P + \alpha$, where $\alpha = -137.5 \cdot R + \alpha 2$, or
$A = -P + \beta 1$ (4) When $0.44 \leq R \leq 0.473$
$A = P + \gamma$, where $-137.5 \cdot R - 75 \leq \gamma \leq -60$ (5) When $0.473 \leq R \leq 0.7$,
$A = P + \alpha$, where $\alpha = -137.5 \cdot R + \alpha 2$, or
$A = P + \alpha 3$ (6) When $0.7 \leq R \leq 1.06$,
$A = -P + \beta 1$
However,
$-99° \leq \alpha 1 \leq -58° \quad\quad -75° \leq \alpha 2 \leq -35°$
$-100° \leq \alpha 3 \leq -60° \quad\quad 70° \leq \beta 1 \leq 110°$ (3) The conditions for achieving a contrast ratio greater than 10 and an ON transmittance of 10% in a transmission type element wherein the twist angle, $\varnothing_r$, is 180° are indicated below:

(1) When $0.1 \leq R \leq 0.22$,
$A = P + \alpha$, where $\alpha = -82 \cdot R + \alpha 1$ (2) When $0.22 < R \leq 0.42$,
$A = P + \alpha$, where $\alpha = -82 \cdot R + \alpha 1$, or
$A = -P + \beta 1$ (3) When $0.42 < R \leq 0.44$,
$A = P + \alpha$, where $\alpha = -137.5 \cdot R + \alpha 2$, or
$A = -P + \beta 1$ (4) When $0.44 < R \leq 0.7$,
$A = P + \alpha$, where $\alpha = -137.5 \cdot R + \alpha 2$, or
$A = P + \alpha 3$ (5) When $0.7 < R \leq 1.06$,
$A = -P + \beta 1$
However,
$-94° \leq \alpha 1 \leq -63° \quad \mathbf{-70° \leq \alpha 2 \leq -40°}$
$-95° \leq \alpha 3 \leq -65° \quad \mathbf{75° \leq \beta 1 \leq 105°}$ Second Embodiment When $\varnothing_r = 90°$ In this embodiment, $p_o$, was adjusted so that the twist angle, $\varnothing_r$, was approximately 90°. As an example, product No. ZLI-4262 was employed as the liquid crystal medium and, for embodiment (2-1), the liquid crystal layer thickness, d, was equal to 2.0 $\mu$m, L=2.67 $\mu$m, and d/p$_o \approx$0.3.

Data related to various conditions for R are shown below. The tables here are interpretative in the same manner as in the first embodiment.

(2-1) When R=0.2.

These results are shown in Table 28:

TABLE 28

| No. | P | A | I$^+$ | I$^-$ | CR | T | R |
|---|---|---|---|---|---|---|---|
| 1 | 130 | 60 | 10.00 | 0.50 | 20.00 | O | O |
| 2 | 10 | −90 | 2.50 | 22.10 | 8.84 | * | O |
| 3 | 100 | 0 | 2.50 | 21.90 | 8.76 | * | O |
| 4 | 110 | −10 | 8.90 | 33.70 | 3.79 | * | O |
| 5 | 170 | 40 | 13.40 | 30.80 | 2.30 | * | O |
| 6 | 60 | −70 | 12.90 | 28.00 | 2.17 | * | O |
| 7 | 80 | 0 | 6.70 | 13.60 | 2.03 | * | O |
| 8 | 90 | −45 | 17.80 | 35.90 | 2.02 | * | O |
| 9 | 130 | −80 | 40.40 | 20.50 | 1.97 | * | O |
| 10 | 160 | −60 | 35.00 | 19.60 | 1.79 | * | O |
| 11 | 150 | −20 | 42.60 | 40.80 | 1.04 | * | * |
| 12 | 120 | −50 | 43.40 | 44.30 | 1.02 | * | * |
| 13 | 50 | −40 | 0.90 | 5.50 | 6.11 | * | * |
| 14 | 50 | −30 | 4.60 | 3.10 | 1.48 | * | * | d=2.0 $\mu$m, L=2.67, L·$\Delta$n=0.267, $\lambda$=0.38 nm~0.78 nm (2-2) When R=0.28.

The results are shown in Table 29:

TABLE 29

| No. | P | A | I$^+$ | I$^-$ | CR | T | R |
|---|---|---|---|---|---|---|---|
| 1 | 50 | −50 | 0.50 | 20.90 | 41.80 | O | O |
| 2 | 110 | 60 | 29.40 | 0.80 | 36.75 | O | O |
| 3 | 40 | −60 | 1.00 | 22.50 | 22.50 | O | O |
| 4 | 100 | −10 | 4.70 | 39.70 | 8.45 | * | O |
| 5 | 20 | −40 | 22.50 | 3.30 | 6.82 | * | O |
| 6 | 20 | 70 | 11.70 | 46.80 | 4.00 | * | O |
| 7 | 90 | 0 | 7.50 | 28.70 | 3.83 | * | O |
| 8 | 90 | −90 | 40.00 | 18.80 | 2.13 | * | O |
| 9 | 140 | 70 | 15.70 | 8.30 | 1.89 | * | O |
| 10 | 70 | −10 | 11.30 | 19.80 | 1.75 | * | O |
| 11 | 160 | −20 | 41.90 | 24.30 | 1.72 | * | O |
| 12 | 140 | −40 | 44.40 | 31.70 | 1.40 | * | O |
| 13 | 100 | −70 | 36.20 | 27.60 | 1.31 | * | * |
| 14 | 170 | −80 | 19.00 | 18.50 | 1.03 | * | * | d=2.8 $\mu$m, L=3.73, L·$\Delta$n=0.373, $\lambda$=0.38 nm~0.78 nm (2-3) When R=0.318.

The results are shown in Table 30:

TABLE 30

| No. | P | A | I$^+$ | I$^-$ | CR | T | R |
|---|---|---|---|---|---|---|---|
| 1 | 110 | −10 | 6.40 | 45.90 | 7.17 | * | O |
| 2 | 60 | −70 | 5.10 | 35.40 | 6.94 | * | O |
| 3 | 170 | 40 | 6.20 | 38.10 | 6.15 | * | O |
| 4 | 10 | −90 | 6.40 | 39.00 | 6.09 | * | O |
| 5 | 100 | 0 | 6.50 | 38.90 | 5.98 | * | O |
| 6 | 130 | −80 | 44.00 | 8.20 | 5.37 | * | O |
| 7 | 90 | −45 | 10.20 | 40.60 | 3.98 | * | O |
| 8 | 160 | −60 | 42.40 | 12.10 | 3.50 | * | O |
| 9 | 140 | −50 | 46.20 | 20.20 | 2.29 | * | O |
| 10 | 110 | −70 | 39.40 | 18.70 | 2.11 | * | O |
| 11 | 130 | 60 | 17.70 | 10.20 | 1.74 | * | O |
| 12 | 80 | 0 | 15.80 | 27.40 | 1.73 | * | O |
| 13 | 20 | −50 | 18.90 | 12.90 | 1.47 | * | O |
| 14 | 150 | −20 | 34.70 | 26.80 | 1.29 | * | * | d=2.0 $\mu$m, L=2.67, L·$\Delta$n=0.424, $\lambda$=0.38 nm~0.78 nm (2-4) When R=0.56.

The results are shown in Table 31:

TABLE 31

| No. | P | A | I⁺ | I⁻ | CR | T | R |
|---|---|---|---|---|---|---|---|
| 1 | 90 | −90 | 11.60 | 0.40 | 29.00 | O | O |
| 2 | 160 | −20 | 13.60 | 2.00 | 6.80 | * | O |
| 3 | 120 | −70 | 21.30 | 4.50 | 4.73 | * | O |
| 4 | 140 | −40 | 16.30 | 4.20 | 3.88 | * | O |
| 5 | 80 | −50 | 6.50 | 25.20 | 3.88 | * | O |
| 6 | 20 | 70 | 10.00 | 28.10 | 2.81 | * | O |
| 7 | 100 | −10 | 22.30 | 41.50 | 1.86 | * | O |
| 8 | 160 | −60 | 42.60 | 23.50 | 1.81 | * | O |
| 9 | 40 | −60 | 25.10 | 42.10 | 1.68 | * | O |
| 10 | 110 | 60 | 41.40 | 27.30 | 1.52 | * | O |
| 11 | 90 | 0 | 36.30 | 47.40 | 1.31 | * | * |
| 12 | 70 | −10 | 40.70 | 45.70 | 1.12 | * | * |
| 13 | 170 | −80 | 45.70 | 43.40 | 1.05 | * | * |
| 14 | 140 | 70 | 42.10 | 40.40 | 1.04 | * | * | d=4.0 μm, L=5.33, L·Δn=0.747, λ=0.38 nm~0.78 nm
(2-5) When R=0.84.
The results are shown in Table 32:

TABLE 32

| No. | P | A | I⁺ | I⁻ | CR | T | R |
|---|---|---|---|---|---|---|---|
| 1 | 60 | −60 | 36.70 | 4.30 | 8.53 | * | O |
| 2 | 140 | −50 | 5.90 | 43.40 | 7.36 | * | O |
| 3 | 130 | 60 | 28.80 | 5.40 | 5.33 | * | O |
| 4 | 130 | −80 | 6.80 | 27.00 | 3.97 | * | O |
| 5 | 160 | −60 | 13.00 | 42.40 | 3.26 | * | O |
| 6 | 150 | −20 | 10.80 | 27.00 | 2.50 | * | O |
| 7 | 170 | 40 | 35.20 | 14.20 | 2.48 | * | O |
| 8 | 20 | −60 | 36.40 | 20.80 | 1.75 | * | O |
| 9 | 90 | −45 | 33.40 | 24.10 | 1.39 | * | O |
| 10 | 50 | −10 | 23.80 | 20.80 | 1.14 | * | * |
| 11 | 80 | 0 | 39.00 | 43.40 | 1.11 | * | * |
| 12 | 10 | −90 | 45.50 | 43.20 | 1.05 | * | * |
| 13 | 100 | 0 | 45.60 | 43.40 | 1.05 | * | * |
| 14 | 110 | −10 | 43.00 | 43.30 | 1.01 | * | * | d=6.0 μm, L=8.00, L·Δn=1.120, λ=0.38 nm~0.78 nm

Third Embodiment

When $\phi_r=160°$

In this embodiment, $p_o$ was adjusted so that the twist angle, $\phi_r$, was approximately 160°. As an example, product No. ZLI-4262 was employed as the liquid crystal medium and, in the case of embodiment (3-1), the liquid crystal layer thickness, d, was equal to 2.0 μm, L=2.12 μm, and d/p$_o$≈0.5.

Data relative to various conditions of R are shown below.
(3-1) When R=0.2.
The results are shown in Table 33:

TABLE 33

| No. | P | A | I⁺ | I⁻ | CR | T | R |
|---|---|---|---|---|---|---|---|
| 1 | 100 | 0 | 0.20 | 11.10 | 55.50 | O | O |
| 2 | 20 | −70 | 0.70 | 28.30 | 40.43 | O | O |
| 3 | 60 | 0 | 16.80 | 1.90 | 8.84 | * | O |
| 4 | 130 | −80 | 40.10 | 10.00 | 4.01 | * | O |
| 5 | 60 | −70 | 14.60 | 43.30 | 2.97 | * | O |
| 6 | 160 | −60 | 33.10 | 12.80 | 2.59 | * | O |
| 7 | 110 | −30 | 22.60 | 10.20 | 2.22 | * | O |
| 8 | 100 | −45 | 26.80 | 12.30 | 2.18 | * | O |
| 9 | 170 | 40 | 14.60 | 22.50 | 1.54 | * | O |
| 10 | 150 | −20 | 43.90 | 38.30 | 1.15 | * | * |
| 11 | 160 | −90 | 9.50 | 0.20 | 47.50 | * | O | d=2.0 μm, L=2.12, L·Δn=0.212, λ=0.38 nm~0.78 nm
(3-2) When R=0.28.

The results are shown in Table 34:

TABLE 34

| No. | P | A | I⁺ | I⁻ | CR | T | R |
|---|---|---|---|---|---|---|---|
| 1 | 40 | −60 | 0.20 | 47.30 | 236.50 | O | O |
| 2 | 20 | −80 | 0.70 | 28.80 | 41.14 | O | O |
| 3 | 60 | −40 | 0.70 | 28.80 | 41.14 | O | O |
| 4 | 170 | −80 | 13.60 | 7.10 | 1.92 | * | O |
| 5 | 110 | 60 | 29.70 | 45.00 | 1.52 | * | O |
| 6 | 140 | 70 | 13.60 | 20.50 | 1.51 | * | O |
| 7 | 160 | −20 | 45.30 | 40.10 | 1.13 | * | * |
| 8 | 90 | −90 | 45.20 | 40.70 | 1.11 | * | * | d=2.8 μm, L=2.96, L·Δn=0.296, λ=0.38 nm~0.78 nm
(3-3) When R=0.318.
The results are shown in Table 3:

TABLE 35

| No. | P | A | I⁺ | I⁻ | CR | T | R |
|---|---|---|---|---|---|---|---|
| 1 | 40 | −60 | 0.60 | 45.40 | 75.67 | O | O |
| 2 | 100 | 0 | 0.60 | 13.20 | 22.00 | O | O |
| 3 | 10 | −90 | 0.60 | 13.20 | 22.00 | O | O |
| 4 | 130 | −80 | 44.40 | 9.10 | 4.88 | * | O |
| 5 | 130 | 60 | 16.20 | 36.60 | 2.26 | * | O |
| 6 | 170 | 40 | 8.10 | 18.30 | 2.26 | * | O |
| 7 | 90 | −45 | 11.30 | 8.20 | 1.38 | * | O |
| 8 | 150 | −20 | 38.40 | 33.10 | 1.16 | * | * |
| 9 | 20 | −20 | 39.40 | 42.00 | 1.07 | * | * | d=2.0 μm, L=2.12, L·Δn=0.337, λ=0.38 nm~0.78 nm
(3-4) When R=0.56.
The results are shown in Table 36:

TABLE 36

| No. | P | A | I⁺ | I⁻ | CR | T | R |
|---|---|---|---|---|---|---|---|
| 1 | 120 | −60 | 24.80 | 40.00 | 1.61 | * | O |
| 2 | 140 | −40 | 25.20 | 40.60 | 1.61 | * | O |
| 3 | 160 | −20 | 26.50 | 42.10 | 1.59 | * | O |
| 4 | 90 | −90 | 26.70 | 42.00 | 1.57 | * | O |
| 5 | 110 | 60 | 46.70 | 36.70 | 1.27 | * | * |
| 6 | 100 | −10 | 7.30 | 0.30 | 24.33 | * | * | d=4.0 μm, L=4.24, L·Δn=0.593, λ=0.38 nm~0.78 nm
(3-5) When R=0.84.
The results are shown in Table 37:

TABLE 37

| No. | P | A | I⁺ | I⁻ | CR | T | R |
|---|---|---|---|---|---|---|---|
| 1 | 90 | −10 | 28.90 | 1.60 | 18.06 | O | O |
| 2 | 80 | 0 | 28.90 | 2.70 | 10.70 | O | O |
| 3 | 150 | −20 | 15.00 | 35.90 | 2.39 | * | O |
| 4 | 90 | −45 | 18.50 | 8.90 | 2.08 | * | O |
| 5 | 170 | 40 | 24.70 | 18.40 | 1.34 | * | O |
| 6 | 130 | 60 | 38.50 | 34.30 | 1.12 | * | * |
| 7 | 20 | −60 | 42.70 | 38.90 | 1.10 | * | * |
| 8 | 130 | −80 | 10.90 | 10.10 | 1.08 | * | * |
| 9 | 60 | −60 | 36.70 | 38.10 | 1.04 | * | * | d=6.0 μm, L=6.35, L·Δn=0.889, λ=0.38 nm~0.78 nm

Fourth Embodiment

When $\phi_r$200°

In this embodiment, $p_o$ was adjusted so that the twist angle, $\phi_r$, was approximately 200°. As an example, product No. ZLI-4262 employed used as the liquid crystal medium and relative to embodiment (4-1), the liquid crystal layer thickness, d, was equal to 2.0 μm, L=1.89 μm, and d/p$_o$≈0.6.

Data relative to various conditions of R are shown below.
(4-1) When R=0.2.
These results are shown in Table 38:

TABLE 38

| No. | P | A | I⁺ | I⁻ | CR | T | R |
|---|---|---|---|---|---|---|---|
| 1 | 50 | −40 | 0.70 | 36.50 | 52.14 | O | O |
| 2 | 140 | 60 | 3.60 | 39.00 | 10.83 | O | O |
| 3 | 150 | −50 | 44.60 | 12.00 | 3.72 | * | O |
| 4 | 150 | −20 | 44.20 | 13.20 | 3.35 | * | O |
| 5 | 170 | 40 | 15.50 | 37.60 | 2.43 | * | O |
| 6 | 160 | −90 | 8.80 | 19.00 | 2.16 | * | O |
| 7 | 110 | −30 | 23.60 | 12.90 | 1.83 | * | O |
| 8 | 60 | 0 | 16.00 | 27.00 | 1.69 | * | O |
| 9 | 20 | −10 | 39.40 | 45.60 | 1.16 | * | * |
| 10 | 100 | −45 | 27.90 | 29.50 | 1.06 | * | * |
| 11 | 130 | −80 | 39.50 | 38.20 | 1.03 | * | * | d=2.0 μm, L=1.89, L·Δn=0.189, λ=0.38 nm~0.78 nm
(4-2) When R=0.28.
The results are shown in Table 39:

TABLE 39

| No. | P | A | I⁺ | I⁻ | CR | T | R |
|---|---|---|---|---|---|---|---|
| 1 | 40 | −60 | 0.40 | 28.60 | 71.50 | O | O |
| 2 | 60 | −40 | 0.70 | 47.10 | 67.29 | O | O |
| 3 | 140 | −40 | 45.30 | 2.10 | 21.57 | O | O |
| 4 | 160 | −20 | 45.40 | 11.80 | 3.85 | * | O |
| 5 | 140 | 70 | 12.60 | 46.00 | 3.65 | * | O |
| 6 | 90 | −60 | 27.90 | 44.70 | 1.60 | * | O |
| 7 | 110 | 60 | 28.20 | 35.80 | 1.27 | * | * |
| 8 | 90 | −90 | 45.90 | 40.60 | 1.13 | * | * | d=2.8 μm, L=2.65, L·Δn=0.265, λ=0.38 nm~0.78 nm
(4-3) When R=0.318.
The results are shown in Table 40:

TABLE 40

| No. | P | A | I⁺ | I⁻ | CR | T | R |
|---|---|---|---|---|---|---|---|
| 1 | 40 | −60 | 0.80 | 29.10 | 36.38 | O | O |
| 2 | 160 | −60 | 37.00 | 1.70 | 21.76 | O | O |
| 3 | 150 | −20 | 39.30 | 7.80 | 5.04 | * | O |
| 4 | 170 | 40 | 10.40 | 46.10 | 4.43 | * | O |
| 5 | 90 | −45 | 13.70 | 40.10 | 2.93 | * | O |
| 6 | 130 | 60 | 14.90 | 43.10 | 2.89 | * | O |
| 7 | 130 | −80 | 43.20 | 32.60 | 1.33 | * | O |
| 8 | 90 | −80 | 40.20 | 44.50 | 1.11 | * | * |
| 9 | 10 | −70 | 7.30 | 3.80 | 1.92 | * | * | d=2.0 μm, L=1.89, L·Δn=0.301, λ=0.38 nm~0.78 nm
(4-4) When R=0.56.
The results are shown in Table 41:

TABLE 41

| No. | P | A | I⁺ | I⁻ | CR | T | R |
|---|---|---|---|---|---|---|---|
| 1 | 170 | −80 | 30.50 | 0.30 | 101.67 | O | O |
| 2 | 20 | 70 | 1.30 | 34.40 | 26.46 | O | O |
| 3 | 140 | 70 | 36.20 | 2.40 | 15.08 | O | O |
| 4 | 40 | −30 | 36.20 | 2.40 | 15.08 | O | O |
| 5 | 100 | −30 | 3.20 | 35.10 | 10.97 | O | O |
| 6 | 160 | −70 | 39.90 | 5.60 | 7.13 | * | O |
| 7 | 110 | 60 | 44.20 | 7.20 | 6.14 | * | O |
| 8 | 100 | −10 | 5.30 | 19.20 | 3.62 | * | O |
| 9 | 100 | −60 | 17.40 | 47.50 | 2.73 | * | O |
| 10 | 140 | −40 | 25.30 | 40.10 | 1.58 | * | O |
| 11 | 90 | −90 | 31.10 | 42.10 | 1.35 | * | O | d=4.0 μm, L=3.79, L·Δn=0.531, λ=0.38 nm~0.78 nm
(4-5) When R=0.84.
The results are shown in Table 42:

TABLE 42

| No. | P | A | I⁺ | I⁻ | CR | T | R |
|---|---|---|---|---|---|---|---|
| 1 | 10 | −70 | 31.20 | 1.60 | 19.50 | O | O |
| 2 | 100 | 0 | 31.40 | 2.70 | 11.63 | O | O |
| 3 | 30 | −70 | 34.40 | 12.10 | 2.84 | * | O |
| 4 | 80 | −80 | 17.80 | 43.20 | 2.43 | * | O |
| 5 | 150 | −20 | 4.60 | 10.10 | 2.20 | * | O |
| 6 | 130 | −80 | 20.00 | 34.50 | 1.73 | * | O |
| 7 | 90 | −45 | 28.40 | 39.50 | 1.39 | * | O |
| 8 | 170 | 40 | 33.00 | 45.10 | 1.37 | * | O |
| 9 | 60 | −40 | 44.70 | 44.20 | 1.01 | * | * |
| 10 | 130 | 60 | 41.50 | 41.60 | 1.00 | * | * | d=6.0 μm, L=5.68, L·Δn=0.796, λ=0.38 nm~0.78 nm

Fifth Embodiment

When $\phi_r=270°$

In this embodiment, $p_o$ was adjusted so that the twist angle, $\phi_r$, was approximately 270°. As an example, product No. ZLI-4262 was employed as the liquid crystal medium and in the case of embodiment (5-1), the liquid crystal layer thickness, d, was equal to 2.0 μm, L=1.6 μm, and d/$p_o$≈0.8.

Data relative to various conditions of R are shown below.
(5-1) When R=0.2.
The results are shown in Table 43:

TABLE 43

| No. | P | A | I⁺ | I⁻ | CR | T | R |
|---|---|---|---|---|---|---|---|
| 1 | 100 | 0 | 1.30 | 15.90 | 12.23 | O | O |
| 2 | 90 | −10 | 1.30 | 15.90 | 12.23 | O | O |
| 3 | 10 | −70 | 3.80 | 21.70 | 5.71 | * | O |
| 4 | 140 | 60 | 3.20 | 12.80 | 4.00 | * | O |
| 5 | 160 | −90 | 9.20 | 29.40 | 3.20 | * | O |
| 6 | 170 | 40 | 15.60 | 5.80 | 2.69 | * | O |
| 7 | 60 | 0 | 16.00 | 32.90 | 2.06 | * | O |
| 8 | 100 | −45 | 28.30 | 18.00 | 1.57 | * | O |
| 9 | 150 | −20 | 44.40 | 31.00 | 1.43 | * | O |
| 10 | 110 | −30 | 24.50 | 19.80 | 1.24 | * | * |
| 11 | 130 | −80 | 39.10 | 41.80 | 1.07 | * | * |
| 12 | 140 | −60 | 44.70 | 47.30 | 1.06 | * | * |
| 13 | 20 | −20 | 31.35 | 31.40 | 1.00 | * | * |
| 14 | 30 | −70 | 0.80 | 8.20 | 10.25 | * | O | d=2.0 μm, L=1.60, L·Δn=0.160, λ=0.38 nm~0.78 nm
(5-2) When R=0.28.
The results are shown in Table 44:

TABLE 44

| No. | P | A | I⁺ | I⁻ | CR | T | R |
|---|---|---|---|---|---|---|---|
| 1 | 40 | −60 | 0.20 | 14.00 | 70.00 | O | O |
| 2 | 60 | −40 | 0.20 | 14.00 | 70.00 | O | O |
| 3 | 10 | −90 | 1.70 | 26.40 | 15.53 | O | O |
| 4 | 90 | 0 | 3.10 | 32.40 | 10.45 | * | O |
| 5 | 100 | −10 | 3.30 | 21.80 | 6.61 | * | O |
| 6 | 70 | −10 | 6.50 | 34.20 | 5.26 | * | O |
| 7 | 40 | −40 | 5.20 | 23.30 | 4.48 | * | O |
| 8 | 170 | −80 | 13.00 | 42.60 | 3.28 | * | O |
| 9 | 90 | −90 | 44.40 | 15.10 | 2.94 | * | O |
| 10 | 140 | 70 | 11.60 | 31.60 | 2.72 | * | O |
| 11 | 140 | −40 | 46.30 | 29.40 | 1.57 | * | O |
| 12 | 160 | −60 | 35.80 | 46.50 | 1.30 | * | * |
| 13 | 110 | 60 | 26.60 | 33.00 | 1.24 | * | * |
| 14 | 20 | 70 | 13.30 | 15.40 | 1.16 | * | * | d=2.8 μm, L=2.24, L·Δn=0.224, λ=0.38 nm~0.78 nm
(5-3) When R=0.318.

The results are shown in Table 45:

TABLE 45

| No. | P | A | I+ | I− | CR | T | R |
|---|---|---|---|---|---|---|---|
| 1 | 10 | −90 | 2.20 | 31.40 | 14.27 | O | O |
| 2 | 100 | 0 | 2.30 | 31.40 | 13.65 | O | O |
| 3 | 100 | −10 | 3.00 | 25.80 | 8.60 | * | O |
| 4 | 80 | 0 | 8.80 | 41.90 | 4.76 | * | O |
| 5 | 20 | −60 | 7.50 | 35.10 | 4.68 | * | O |
| 6 | 150 | −20 | 39.90 | 12.50 | 3.19 | * | O |
| 7 | 110 | −10 | 6.30 | 20.00 | 3.17 | * | O |
| 8 | 130 | 60 | 13.10 | 33.70 | 2.57 | * | O |
| 9 | 120 | −60 | 44.80 | 19.40 | 2.31 | * | O |
| 10 | 90 | −45 | 14.20 | 8.30 | 1.71 | * | O |
| 11 | 170 | 40 | 10.20 | 6.80 | 1.50 | * | O |
| 12 | 130 | −80 | 42.40 | 34.60 | 1.23 | * | * |
| 13 | 160 | −60 | 37.70 | 43.60 | 1.16 | * | * |
| 14 | 20 | −20 | 35.60 | 31.50 | 1.13 | * | * | d=2.0 μm, L=1.60, L·Δn=0.254, λ=0.38 nm~0.78 nm
(5-4) When R=0.56.
The results are shown in Table 46:

TABLE 46

| No. | P | A | I+ | I− | CR | T | R |
|---|---|---|---|---|---|---|---|
| 1 | 90 | −90 | 27.30 | 1.40 | 19.50 | O | O |
| 2 | 100 | −80 | 27.90 | 2.20 | 12.68 | O | O |
| 3 | 20 | 70 | 4.80 | 36.90 | 7.69 | * | O |
| 4 | 160 | −20 | 29.20 | 4.20 | 6.95 | * | O |
| 5 | 100 | −10 | 8.50 | 46.00 | 5.41 | * | O |
| 6 | 120 | −60 | 30.60 | 6.40 | 4.78 | * | O |
| 7 | 60 | −40 | 10.00 | 41.60 | 4.16 | * | O |
| 8 | 40 | −60 | 10.00 | 41.50 | 4.15 | * | O |
| 9 | 140 | −40 | 31.60 | 7.80 | 4.05 | * | O |
| 10 | 110 | 60 | 41.30 | 17.70 | 2.33 | * | O |
| 11 | 90 | 0 | 20.60 | 46.40 | 2.25 | * | O |
| 12 | 70 | −10 | 26.90 | 41.40 | 1.54 | * | O |
| 13 | 170 | −80 | 35.00 | 37.50 | 1.07 | * | * |
| 14 | 140 | 70 | 31.80 | 32.60 | 1.03 | * | * | d=4.0 μm, L=3.20, L·Δn=0.448, λ=0.38 nm~0.78 nm
(5-5) When R=0.84.
The results are shown in Table 47:

TABLE 47

| No. | P | A | I+ | I− | CR | T | R |
|---|---|---|---|---|---|---|---|
| 1 | 150 | −20 | 1.90 | 24.70 | 13.00 | O | O |
| 2 | 130 | 60 | 44.20 | 10.00 | 4.42 | * | O |
| 3 | 160 | −30 | 8.20 | 26.60 | 3.24 | * | O |
| 4 | 20 | −60 | 45.30 | 23.30 | 1.94 | * | O |
| 5 | 60 | −20 | 45.30 | 23.40 | 1.94 | * | O |
| 6 | 110 | −10 | 26.10 | 39.70 | 1.52 | * | O |
| 7 | 90 | −45 | 14.40 | 21.30 | 1.48 | * | O |
| 8 | 160 | −60 | 29.70 | 43.50 | 1.46 | * | O |
| 9 | 170 | 40 | 17.80 | 12.40 | 1.44 | * | O |
| 10 | 130 | −80 | 21.80 | 28.70 | 1.32 | * | * |
| 11 | 100 | 0 | 39.60 | 41.80 | 1.06 | * | * |
| 12 | 80 | 0 | 45.90 | 43.70 | 1.05 | * | * |
| 13 | 10 | −90 | 39.60 | 41.50 | 1.05 | * | * |
| 14 | 90 | −80 | 1.30 | 4.40 | 3.38 | * | * | d=6.0, L=4.80, L·Δn=0.672, λ=0.38 nm~0.78 nm

Sixth Embodiment

When ø$_r$140°, R=0.28.

In this embodiment, p$_o$ was adjusted by adding an appropriate amount of optically active compound to the liquid crystal medium, product No. ZLI- 4262, so that the twist angle, ø$_r$, was approximately 140°. In the example here, d=2.8 μm, L=3.15 μm, and d/p$_o$≈0.4.

The data from these results are shown in Table 48:

TABLE 48

| No. | P | A | I+ | I− | CR | T | R |
|---|---|---|---|---|---|---|---|
| 1 | 40 | −60 | 0.90 | 42.50 | 47.22 | O | O |
| 2 | 60 | −40 | 0.40 | 18.20 | 45.50 | O | O |
| 3 | 100 | −10 | 0.90 | 24.80 | 27.56 | O | O |
| 4 | 110 | −70 | 44.10 | 3.00 | 14.70 | O | O |
| 5 | 90 | 0 | 2.90 | 23.60 | 8.14 | * | O |
| 6 | 20 | 70 | 9.50 | 24.10 | 2.54 | * | O |
| 7 | 140 | −40 | 44.60 | 24.10 | 1.85 | * | O |
| 8 | 90 | −90 | 44.40 | 24.40 | 1.82 | * | O |
| 9 | 140 | 70 | 14.50 | 9.70 | 1.49 | * | O |
| 10 | 170 | −80 | 14.70 | 20.90 | 1.42 | * | O |
| 11 | 120 | −30 | 24.80 | 21.60 | 1.15 | * | * |
| 12 | 110 | 60 | 30.80 | 31.20 | 1.01 | * | * |
| 13 | 80 | −20 | 0.30 | 9.80 | 32.67 | * | O |
| 14 | 70 | −10 | 7.60 | 7.80 | 1.03 | * | * | d=2.8 μm, L=3.15, L·Δn=0.315, λ=0.38 nm~0.78 nm

Seventh Embodiment

When ø$_r$=220°, R=0.28.

In this embodiment, p$_o$ was adjusted by adding an appropriate amount of optically active compound to the liquid crystal medium, product No. ZLI-4262, so that the twist angle, ø$_r$, was approximately 220°. In the example here, d=2.8 μm, L=2.52 μm and d/p$_o$≈0.6.

The data is shown in Table 49:

TABLE 49

| No. | P | A | I+ | I− | CR | T | R |
|---|---|---|---|---|---|---|---|
| 1 | 40 | −60 | 0.40 | 16.50 | 41.25 | O | O |
| 2 | 60 | −40 | 1.20 | 40.80 | 34.00 | O | O |
| 3 | 90 | 0 | 1.90 | 23.90 | 12.58 | O | O |
| 4 | 100 | −10 | 2.00 | 21.50 | 10.75 | O | O |
| 5 | 70 | −10 | 6.50 | 42.50 | 6.54 | * | O |
| 6 | 140 | −40 | 45.20 | 11.20 | 4.04 | * | O |
| 7 | 140 | 70 | 12.70 | 46.20 | 3.64 | * | O |
| 8 | 70 | −60 | 12.70 | 31.70 | 2.50 | * | O |
| 9 | 170 | −80 | 12.00 | 24.80 | 2.07 | * | O |
| 10 | 150 | −60 | 41.20 | 21.30 | 1.93 | * | O |
| 11 | 90 | −90 | 45.70 | 24.20 | 1.89 | * | O |
| 12 | 120 | −40 | 35.60 | 23.30 | 1.53 | * | O |
| 13 | 20 | 70 | 12.20 | 18.50 | 1.52 | * | O |
| 14 | 110 | 60 | 27.50 | 23.80 | 1.16 | * | * | d=2.8 μm, L=2.52, L·Δn=0.252, λ=0.38 nm~0.78 nm

The results above are for only one example. We sought the conditions for achieving a contrast ratio of 1:2 or greater when the 160°≦ø$_r$≦200° by analyzing a plurality of measured results. For example, the combinations of angles P and A that satisfy conditions when R=0.102 are illustrated in FIG. 5. Combinations of P and A that may be employed are indicated in the cross-hatched regions. Considering the fact combinations of (P±nπ/2, A±nπ/2) and (P,A) are equivalent, the range is established by a group of eight straight lines whose slope is 1 or −1. Further, the range is dependent on the value of R.

When 0.102≦R≦0.4 or 0.78≦R≦0.96, the meaning of αi, βi γi, and δi (where i=1, 2 . . . ) in the expressions,

[P+α1≦A≦P+α2 and −P+β1≦A≦−P+β2] or

[P+γ1≦A≦P+γ2 and −P+δ1≦A≦−P+δ2]    (11)

is as follows:

When R=0.102, the recommended range for P and A is shown in the shaded areas in FIG. 5. P and P±π are equivalent and A and A±π are also equivalent, Further, fixing P and A at (P$_0$, A$_0$) and fixing P and A at (P$_0$±π/2, A$_0$±π/2)

are equivalent. Considering the foregoing, this shaded areas can be expressed as follows:

[P − 144.3 ≤ A ≤ P − 45.0 and −P − 27.2 ≤ A ≤ −P + 27.2] or
[P − 52.9 ≤ A ≤ P + 43.4 and −P + 64.3 ≤ A ≤ −P + 115.7]     (12)
When R = 0.2, the shaded areas can be expressed as follows:
[P − 155.0 ≤ A ≤ P − 45.0 and −P − 47.7 ≤ A ≤ −P + 47.7] or
[P − 62.0 ≤ A ≤ P + 47.0 and −P + 35.0 ≤ A ≤ −P + 145.0].    (13)

Here the constant items are expressed as $\alpha 1$, $\alpha 2$, $\beta 1$, $\beta 2$, $\gamma 1$, $\gamma 2$, $\delta 1$, $\delta 2$. As it is clear from the equation (12) and (13), $\alpha i \sim \delta i$ vary according to the value of R. Therefore, $\alpha 1 \sim \delta i$ are expressed relative to their dependency on R as set forth below and in the claims.

Relationships between angles P and A at particular values of R are set forth below:

(1) Reflective type element:

(1) When 0.102 ≤ R ≤ 0.4 or 0.78 ≤ R ≤ 0.96,
    [P + $\alpha 1$ ≤ A ≤ P + $\alpha 2$ and −P + $\beta 1$ ≤ A ≤ −P + $\beta 2$] or
    [P + $\gamma 1$ ≤ A ≤ P + $\gamma 2$ and −P + $\delta 1$ ≤ A ≤ −P + $\delta 2$]
(2) When 0.72 ≤ R ≤ 0.78
    [P + $\alpha 1$ ≤ A ≤ P + $\alpha 2$ and −P + $\beta 1$ ≤ A ≤ −P + $\beta 2$] or
    [P + $\gamma 1$ ≤ A ≤ P + $\gamma 2$]
(3) When 0.40 ≤ R ≤ 0.72, 0.96 ≤ R ≤ 0.99, or 1.05 ≤ R ≤ 1.12,
    [P + $\alpha 1$ ≤ A ≤ P + $\alpha 2$] or
    [P + $\gamma 1$ ≤ A ≤ P + $\gamma 2$]
(4) When 0.99 ≤ R ≤ 1.02
    [P + $\alpha 1$ ≤ A ≤ P + $\alpha 2$]
(5) When 1.02 ≤ R ≤ 1.05,
    [P + $\gamma 1$ ≤ A ≤ P + $\gamma 2$]

Provided
$\alpha 1 =$  −109.4 · R − 133.1                       (0.102 ≤ R ≤ 1.02)
         −225.0                                        (1.05 ≤ R ≤ 1.12)
$\alpha 2 =$  −45.0                                    (0.102 ≤ R ≤ 0.32)
         6696.4 · R³ − 8720.1 · R² + 3354.7 · R − 445.0
                                                       (0.32 ≤ R ≤ 0.64)
         1519.0 · R³ − 4175.2 · R² + 3568.7 · R − 1087.0
                                                       (0.64 ≤ R ≤ 1.02)
         −333.3 · R + 175.0                            (1.05 ≤ R ≤ 1.12)
$\beta 1 =$  −9114.6 · R³ + 6666.7 · R² − 1577.1 · R + 74.0
                                                       (0.102 ≤ R ≤ 0.36)
         −55.0                                         (0.36 ≤ R ≤ 0.40)
         −75.0                                         (0.72 ≤ R ≤ 0.96)
$\beta 2 =$  9114.6 · R³ − 6666.7 · R² + 1577.1 · R − 74.0
                                                       (0.102 ≤ R ≤ 0.36)
         55.0                                          (0.36 ≤ R ≤ 0.40)
         75.0                                          (0.72 ≤ R ≤ 0.96)
$\gamma 1 =$  312.5 · R² − 187.5 · R − 37.0             (.102 ≤ R ≤ 0.32)
         5208.3 · R³ − 7500.0 · R² + 3341.6 · R − 537.0
                                                       (0.32 ≤ R ≤ 0.64)
         1030.2 · R³ − 2722.0 · R² + 2225.9 · R − 684.0
                                                       (0.64 ≤ R ≤ 0.99)
         197575.9 · R³ − 626821.6 · R² + 662332.3 · R − 233217.9
                                                       (1.02 ≤ R ≤ 1.12)
$\gamma 2 =$  −625.0 · R² + 225.0 · R + 27.0            (0.102 ≤ R ≤ 0.32)
         7254.4 · R³ − 10245.5 · R² + 4448.2 · R − 577.0
                                                       (0.32 ≤ R ≤ 0.64)
         −558.0 · R² + 736.6 · R − 267.9               (0.64 ≤ R ≤ 0.99)
         −5555.5 · R² + 11500.0 · R − 6024.9           (1.02 ≤ R ≤ 1.12)
$\delta 1 =$  −6746.0 · R³ + 5571.4 · R² − 1504.0 · R + 166.9
                                                       (0.102 ≤ R ≤ 0.40)
         −55.6 · R + 68.4                              (0.78 ≤ R ≤ 0.96)
$\delta 2 =$  6746.0 · R³ − 5571.4 · R² + 1504.0 · R + 13.1
                                                       (0.102 ≤ R ≤ 0.40)
         55.6 · R + 111.6                              (0.78 ≤ R ≤ 0.96)

By satisfying the above conditions, it is possible to offer a display element suitable for practical implementation as a reflective type element. Some are also suitable for implementation as a transmission type display element.

Further, where $160° \leq \phi_r \leq 200°$, we analyzed the conditions for achieving a contrast ratio greater than 1:10 and an ON transmittance greater than approximately 10% to facilitate practical implementation of the element as a transmission type display element. The results are shown below:

(1) When 0.1 ≤ R ≤ 0.22,
    A=P+$\alpha$, where $\alpha$=−82·R+$\alpha 1$
(2) When 0.22<R ≤ 0.42,
    A=P+$\alpha$, where $\alpha$=−82·R+$\alpha 1$, or
    A=−P+$\beta 1$
(3) When 0.42<R ≤ 0.44,
    A=P+$\alpha$, where $\alpha$=−137.5·R+$\alpha 2$, or
    A=−P+$\beta 1$
(4) When 0.44<R<0.473,
    A=P+$\gamma$, where −137.5·R−75 ≤ $\gamma$ ≤ −60
(5) When 0.473 ≤ R ≤ 0.7,
    A=P+$\alpha$, where $\alpha$=−137.5·R+$\alpha 2$, or
    A=P+$\alpha 3$
(6) When 0.7<R ≤ 1.06,
    A=−P+$\beta 1$
However,
    −99° ≤ $\alpha 1$ ≤ −58°  −75° ≤ $\alpha 2$ ≤ −35°
    −100° ≤ $\alpha 3$ ≤ −60°  70° ≤ $\beta 1$ ≤ 110°

Also, when $\phi_r = 180°$, the conditions should be set as follows:

(1) When 0.1 ≤ R ≤ 0.22,
    A=P+$\alpha$, where $\alpha$=−82·R+$\alpha 1$
(2) When 0.22<R ≤ 0.42,
    A=P+$\alpha$, where $\alpha$=−82·R+$\alpha 1$, or
    A=−P+$\beta 1$
(3) When 0.42<R ≤ 0.44,
    A=P+$\alpha$, where $\alpha$=−137.5·R+$\alpha 2$, or
    A=−P+$\beta 1$
(4) When 0.44<R ≤ 0.7,
    A=P+$\alpha$, where $\alpha$=−137.5·R+$\alpha 2$, or
    A=P+$\alpha 3$
(5) When 0.7<R ≤ 1.06,
    A=−P+$\beta 1$
However,
    −94° ≤ $\alpha 1$ ≤ −63°  −70° ≤ $\alpha 2$ ≤ −40°
    −95° ≤ $\alpha 3$ ≤ −65°  75° ≤ $\beta 1$ ≤ 105°

By setting the conditions as indicated above, a display element can be offered that provides a suitable implementation for both a transmission type element and a reflective type element.

As the value for R increases above 1.06 $\mu$m, the value of L·$\Delta$n increases so that the Mauguin condition is satisfied, and a display condition suitable for implementation as a transmission type element could not be achieved regardless of how the polarization axes were set. If the value for R is made small, however, S⁺ becomes an optically isotropic medium and the contrast ratio increases. However, if the value R is made too small, the ON transmittance becomes lower. Further, since the lower limit of the birefringence of the liquid crystal material is about 0.06, it is difficult to make the value for R less than 0.10 in the production of display elements. Therefore, the preferred range of R is 0.10 ≤ R ≤ 1.06. Particularly in the range of about 0.18 ≤ R ≤ 0.30, both a very high contrast ratio and a very high ON transmittance can be concurrently achieved by setting P and A as described above.

By appropriately setting the polarization axes of the polarizing plates and the twist angle, $\phi_r$, a display characteristic can be achieved that provides for a display element suitable for implementation in both a transmission type display device and a reflective type display device so long as 0.10 ≤ R ≤ 1.06. If R>1.06, a display characteristic can be achieved that provides for a display element suitable for implementation in a reflective type display device.

In the above embodiments, only situations were discussed wherein the direction of the twist of the helical structure was clockwise when viewed in the Z axis direction, but if the twist is counterclockwise, then the angles of the polarization axes need only be measured in the counterclockwise direction.

Eighth Embodiment

This embodiment is shown in FIG. 2 wherein the twist angle, $ø_r=180°$. The embodiment of FIG. 2 is the same as that of FIG. 1 so that like elements carry the same numerical identification, but the differences between the first to the seventh embodiments and this embodiment are the values for $d/p_o$ and the electrode configuration as illustrated in FIG. 2. As illustrated in FIG. 2, ITO transparent electrode patterns 4A and 4B are formed and polyimide alignment films 2A and 2B are formed on glass layers 3A and 3B.

An optically active compound, product No. S811, available from E. Merck Co., was added to a liquid crystal medium, product No. MJ90179, available from Merck Co., ($\Delta n=0.167$), which demonstrates a nematic phase at room temperature, to adjust it to $p_o=2.9$ μm. Active compound, S811, induces a helical structure with a left hand twist. The cell was configured with polyimide alignment films, available from Nihon Gosei Gomu K K, product No. AL3046, formed on the upper and lower substrates and which had undergone rubbing in opposite parallel directions. The liquid crystal layer thickness, d, was 1.7 μm. When the above liquid crystal composition was provided in the spacing at spacer 6, the pretilt angles $θ_1$, $θ_2$ at the surfaces of upper and lower substrate alignment films became approximately 4° with opposite signs. Since $p_o/4<d<3p_o/4$, the alignment of the liquid crystal molecules took on a 180° helical twist with a helical axis in a direction normal to the planar surface of the substrate. This applies to the conditions $d/p_o=0.586$ and $0.8\ ø_r/360°≦d/p_o≦1.4\ ø_r/360°$. The two polarizing plates 7A and 7B had alignments of P=50° and A=−50°.

The drive voltage waveforms shown in FIG. 6 were applied to electrodes 4A and 4B. In FIG. 6, the scan electrode waveform is shown at 201, the signal electrode waveform is shown at 202, the composite waveform of 201 and 202 is shown at 203, and the electrooptical response of the cell is shown at 204. A metastable state approximating a 360° twist appears in selection period $t_{01}$, a metastable state with a 0° twist, which is also referred to as uniform state, appears in the next selection period $t_{11}$. The first state is optically distinguished as a dark state. When driven with a voltage waveform equivalent to a duty ratio of 1/400 where $V_1=28.0$ V, $V_2=1.5$ V and pulse duration $P_w=350$ μs ($t_{01}=t_{11}=700$ μs, $t_0=t_1=700$ μs×400), the light transmittance level in the nonselection period ($t_{02}=t_{12}$) was stable, the contrast ratio was 1:77, and the light transmittance in the bright state was approximately 60%. This compares to a light transmittance of 100% in a similar optical system wherein the two polarizing plates are disposed such that their polarization axes are parallel.

Ninth Embodiment

Utilizing the eighth embodiment structure, an optically active compound was added to the liquid crystal composition, available from Chisso Sekiyu Kagaku, K K, as product No. SS-4103 ($\Delta n=0.154$), to adjust $p_o$ to 3.04 μm. The cell was fabricated by rubbing polyimide alignment films, available from Nihon Gosei Gomu K K as product No. JALS-300, formed on the upper and lower substrates in opposing parallel directions (180°) and making the liquid crystal layer thickness, d=1.65 μm. When the above liquid crystal material was provided in the structure as shown in FIG. 2, the pretilt angles adjacent or at the surfaces of upper and lower substrate alignment films was approximately 6° with opposite signs. Since $p_o/4<d<3p_o/4$, the initial alignment of the liquid crystal molecules was a 180°-twisted state. The value for $d/p_o$ was equal to about 0.543. The two polarizing plates had alignments of P=50° and A=−50°, and the voltage waveforms in FIGS. 6A–6D were applied to electrodes 4A and 4B. When driven with a waveform equivalent to a duty ratio of 1/400 where $V_1=30.0$ v, $V_2=1.8$ v and pulse duration $P_w=300$ μs with an optical arrangement similar to that in the eighth embodiment, the light transmittance level in the nonselection period was stable as in the eighth embodiment, the contrast ratio was 1:112, and the light transmittance in the bright state was approximately 70%.

Tenth Embodiment

As in the ninth embodiment, $p_o$ was adjusted to 2.36 μm, d=1.65 μm, $d/p_o=0.70$, P=50°, A=50° and the voltage waveforms in FIG. 6 were applied to the electrodes. When driven with a waveform equivalent to a duty ratio of 1/400 where $V_1=30.0$ v, $V_2=1.8$ v and pulse duration $P_w=300$ μs in an optical arrangement similar to that in the eighth embodiment, the light transmittance level in the nonselection period was stable as in the eighth embodiment, the contrast ratio was 1:114, and the light transmittance in the bright state was approximately 70%.

Eleventh Embodiment

As in the ninth embodiment, $p_o$ was adjusted to 4.13 μm, d=1.65 μm, $d/p_o=0.40$, P=50°, A=50° and the voltage waveforms in FIG. 6 were applied to the electrodes. When driven with a waveform equivalent to a duty ratio of 1/400 where $V_1=30.0$ v, $V_2=1.8$ v and pulse duration $P_w=300$ μs in an optical arrangement similar to that in the eighth embodiment, the light transmittance level in the nonselection period was stable as in the eighth embodiment, the contrast ratio was 1:110, and the light transmittance in the bright state was approximately 70%.

Comparison Example 1

A sample was fabricated in accordance with the eighth embodiment structure having liquid crystal layer thickness, d=1.8 μm and $p_o=2.5$ μm ($d/p_o=0.72$). Other conditions were the same as in the eighth embodiment. Since $p_o/4<d<3p_o/4$, the initial alignment of the liquid crystal molecules was a 180°-twisted state. Though the 360° twisted state was maintained upon application of the voltage waveforms shown in FIGS. 6A–6D, the stability of the 0° uniform state was too low and relaxation from the uniform state to the initial state was observed in the nonselection period.

Comparison Example 2

A sample was fabricated in accordance with the eighth embodiment structure having liquid crystal layer thickness, d=1.8 μm and $p_o=4.9$ μm ($d/p_o=0.37$). Other conditions were the same as in the eighth embodiment. Since $p_o/4<d<3p_o/4$, the initial alignment of the liquid crystal molecules was a 180°-twisted state. Though the 0° uniform state was maintained upon application of the voltage waveforms shown in FIGS. 6A–6D, the stability of the 360° twisted state was too low and relaxation from the 360°-twisted state to the initial state was observed in the nonselection period.

Comparison Example 3

A sample was fabricated in accordance with the eighth embodiment structure employing the same liquid crystal medium and having liquid crystal layer thickness, d=1.7 μm, except that a pretilt angle of 26° was formed by employing an $SiO_2$ oblique deposition film for the liquid crystal orientation layers 2A and 2B. When the driving waveforms in FIGS. 6A–6D were applied to the cell electrodes 4A and 4B, only the metastable state with 0° uniform alignment appeared and could not be switched to a 360° twisted state.

By utilizing two metastable states which can be selected by applying selected voltage waveforms, a liquid crystal display device can be achieved with a high contrast ratio with an effective wide viewing angle. Also, since the selected state in this device can be maintained over a sufficiently long period for practical application as a memory type display device, a simple matrix drive system can be utilized in a high definition display having a high number of scan lines. This invention is not only applicable to direct view liquid crystal display devices, but it is also applicable to light valves, spatial light modulators, electrophotographic printer heads and the like.

Twelfth Embodiment

The cell was fabricated by disposing substrates, on which ITO transparent electrode patterns were formed and polyimide alignment films were applied to the glass surface and whose surfaces had undergone rubbing, opposite each other with the desired thickness, d, via spacers. A generalized cross section is shown in FIG. 2.

Embodiment 12-1

An optically active compound was added to a liquid crystal composition, available from E. Merck, product No. ZLI-1557 ($\Delta n=0.1147$), which exhibits a nematic phase at room temperature, to adjust the $p_o$ to 3.5 μm. The liquid crystal layer thickness, d, was equal to 1.8 μm. The cell was fabricated by rubbing a polyimide alignment film, available from Nihon Gosei Gomu K K, product No. AL3046 in rubbing direction 33 as illustrated in FIG. 7. Rubbing was performed on one substrate alignment film at a rubbing angle of 45° angle ($ø_o$ in FIG. 7 is equal to 45°) with respect to the sides of transparent electrodes 31, 32 and on the other substrate alignment film in a direction rotated 180° from the alignment direction shown in FIG. 7. When the above liquid crystal composition was provided in the structure as shown in FIG. 2, the pretilt angles at the surfaces upper and lower substrate alignment films was approximately 4° with opposite signs. Since $p_o/4<d<3p_o/4$, the initial alignment of the liquid crystal molecules was a 180°-twisted state. The value for $d/p_o$ was equal to about 0.40. The two polarizing plates had alignments of P=50° and A=–50°, and the voltage waveforms in FIG. 6 were applied to electrodes 4A and 4B as in the eighth embodiment. The circuit configuration utilized is shown in block form in FIG. 8. Liquid crystal panel 11 has backlight 12 for illumination means. Driving circuit 13 comprises the conventional shift register and logic circuitry for applying a voltage on the scan electrode group of liquid crystal panel 11. Driving circuit comprises the conventional shift register, latch and logic circuitry for applying voltage to the signal electrode group. The reference signal generator 15 and line-sequential scan circuit 16 comprising the conventional ROM and controller are connected to drive circuits 13 and 14. In this embodiment, a light transmittance level was achieved that is stable during the nonselection period ($t_{o2}$, $t_{12}$) with a contrast ratio of 1:77. A light transmittance in the bright state of 63% was uniformly achieved over all of the pixels. There was no development of a separate domain due to electrode shape effect.

Embodiment 12-2

This embodiment is the same as embodiment 12-1 except that the rubbing angle, $ø_o$, was equal to 10°. Display characteristics were obtained that were substantially the same as those achieved with embodiment 12-1.

Comparison Example 1

A cell was fabricated by matching the rubbing direction on one substrate with one side of the pixels ($ø_o=0°$ in FIG. 7) and leaving all the other conditions the same as in embodiment 12-1. Since $p_o/4<d<3p_o/4$, the initial alignment of the liquid crystal molecules was 180°-twisted state. When the voltage waveform was applied to select the 360° twisted metastable state, a domain of the uniform state appeared at the edges of the pixels due to the shape effect.

Thirteenth Embodiment

A display element was fabricated as in the case of embodiment 12-1, except for $p_o$ being adjusted to 3.2 μm. The rubbing directions and polarization axes of the polarizing plates are provided below. FIG. 9 illustrates the relationship of the observer, E, to the liquid crystal display, D, in relation to the coordinate axes X, Y and Z of the display, the liquid crystal display device, D, has its display surface in the X–Y plane. The observer, E, views the display surface along the line of sight, L, in the Z axis direction. The vertical direction of the liquid crystal display device as viewed by the observer, E, corresponds to the direction of the Y axis in FIG. 9. Using a similar coordinate system, FIG. 10 shows the disposition of the display surface, the rubbing directions and the polarization axes of the polarization axes. In FIG. 10, the direction of rubbing on the lower substrate, i.e., the side closest to the illumination means or the reflecting means, is 41, the direction of rubbing on the upper substrate, i.e., the side closest to the observer, E, is 42. The angles $a_1$ and $a_2$ are the respective angles formed by rubbing directions 41, 42 and the Y axis. The polarization axes of the polarizing plates disposed on the lower substrate and the upper substrate, respectively, are 43 and 44 where polarization axis 43 forms angle $b_1$ with the Y axis and polarization axis 44 forms angle $b_2$ with the Y axis. By providing that $a_1=a_2=0°$; $b_1=45°$; and $b_2=38°$, the metastable state wherein the twist angle of the liquid crystal is approximately $ø_r+180°$ equal to 360° is the dark state and the state in which the twist angle is approximately $ø_r-180°$ equal to 0° is the bright state.

The voltage waveforms shown in FIGS. 11A and 11B were applied to the electrodes of the display element according to this embodiment. In these figures, the composite waveforms of the scan electrode waveform are 401 and 403 and the signal electrode waveform, and the electrooptical responses of the display element are respectively shown at 402 and 404 for the composite waveforms. The 360° twisted metastable state is selected in selection periods $T_1$ and $T_4$, and the 0° uniform metastable state is selected in $T_2$ and $T_3$, where the 360° twisted metastable state is the dark state. When driven with a waveform ($T_1=T_2=T_3=T_4=600$ μs, $F_1=F_2=F_3=F_4=600$ μs×400) equivalent to a duty ratio of 1/400 having a pulse duration $P_w=300$ μs, a contrast ratio of 1:77 and a light transmittance in the bright state of approximately 63% were achieved. Also, when the observer, E, moves, varying the angle of the line of sight, L, relative to the Z axis in FIG. 9, the display element provided good viewing clarity and readability through an angular range of ±60° to the left or right in the X axis direction and through an angular range of ±45° up and down in the Y axis direction. As can be seen from the foregoing embodiment, a very large viewing angle is achieved compared to conventional TN and STN systems.

In this embodiment, a liquid crystal display device with a high contrast ratio and a wide effective viewing angle is achieved by utilizing two metastable states. Further, since the selected state can be maintained over a sufficiently long period for practical applications as a memory type display device, to a simple matrix drive can be utilized with a high definition display having a high number of scan lines. This invention is not only applicable to direct view liquid crystal display devices, but it is also applicable to light valves, spatial light modulators or the like.

Fourteenth Embodiment

An example of a liquid crystal electrooptical element with a high contrast ratio and an effective wide viewing angle is shown in FIG. 12 wherein the light transmittance in the non-pixel regions between adjacent pixels is lower than the light transmittance in pixel regions therebetween when the liquid crystal electrooptical element of this embodiment is driven by a multiplex drive system.

A photosensitive acrylic resin layer was formed on the glass substrate surface. After exposure employing a photo mask, the resin was developed to form a stripe pattern. An ITO transparent electrode pattern was formed on the stripe pattern by means of sputtering, and then an alignment film was applied and rubbed in a rubbing direction to complete the formation of one substrate. Relative to the other substrate, an ITO transparent electrode pattern was formed on a glass substrate, an $SiO_2$ insulating film was formed on top of that and then an alignment film was applied and rubbed in a rubbing direction to complete the formation of the other substrate. These two substrates were mated together with a spacer provided between them to yield a cell having a structure as shown in FIG. 12. The numerically labeled elements have the same numerical identification as the elements in FIG. 2. In FIG. 12, the resin layer is shown at 8, the thickness of the liquid crystal layer forming the pixel regions is d, and the thickness of the liquid crystal layer in the non-pixel element regions, i.e., the formed interval between adjacent pixel regions, is $d_o$. The drive circuitry was the same as that shown in FIG. 8.

An optically active compound was added to a liquid crystal composition, comprising product No. ZLI-1557, available from E. Merck Co. ($\Delta n=0.1147$), which exhibits a nematic phase at room temperature, to adjust the medium to $p_o=3.2$ $\mu$m. Polyimide film, available from Nihon Gosei Gomu K K, product No. JALS-300, was employed for the alignment films. The liquid crystal layer thickness, d, was 1.8 $\mu$m and $d_o=2.50$ $\mu$m. Rubbing was performed on the one substrate in a first direction that formed a 20° angle relative to the side extent of the pixels, and rubbing was performed on the other substrate in a direction rotated 180° from the first direction, i.e., $\phi_r=180°$. When the above mentioned liquid crystal material was provided in the structure as shown in FIG. 12, the pretilt angles at the surfaces upper and lower substrate alignment films was approximately 14° with opposite signs. Since $p_o/4<d<3p_o/4$, the initial alignment of the liquid crystal molecules in the pixel regions was a 180°-twisted state. When $d/p_o \geq 0.75$, the twist angle of the liquid crystal became $\phi_r+180°\cdot n$ (n=1, 2, 3, . . . ). Since $d_o/p_o>0.75$, the initial alignment in the non-pixel region was a 360°-twisted state.

The voltage waveforms shown in FIGS. 13A–13C were applied to the electrodes of the liquid crystal electrooptical element of this embodiment. The scan electrode waveform is shown at 301 in FIG. 13A, the signal electrode waveform is shown at 302 in FIG. 13B, the composite waveform of waveforms 301 and 302 is shown at 303 in FIG. 13C, which is equivalent to the driving waveform applied to the liquid crystal medium. The time periods $t_0$ and $t_1$ are the time frames in which the metastable states having twist angles approximating $\phi_r+180°$ and $\phi_r-180°$ are selected. The time periods $t_{01}$ and $t_{11}$ are selection time periods and the time periods $t_{02}$ and $t_{12}$ are nonselection time periods.

The optical response is the same as that shown in FIGS. 11A and 11B which was achieved by disposing the polarizing plates at P=50° and A=−50°, wherein $\phi_r+180°$ was equal to 360° comprising the dark state and $\phi_r-180°$ was equal to 0° comprising the bright state. Since the twist angle in the non-pixel regions is 360°, light in the non-pixel region is masked in this arrangement. In FIGS. 11A and 11B, the composite waveforms of the scan electrode waveforms are shown at 401 and 403 and signal electrode waveform, and the electrooptical response of liquid crystal electrooptical element of this embodiment is shown at 402 and 404. The metastable state approximating a 360° twist is selected in selection periods $T_1$, $T_4$, and the metastable state approximating a 0° twist is selected in selection periods $T_2$, $T_3$. When driven with a waveform ($T_1=T_2=T_3=T_4=500$ $\mu$s, $F_1=F_2=F_3=F_4=500$ $\mu$s×400) equivalent to a duty ratio of 1/400 where $V_1=30$ V, $V_2=1.0$ V and pulse duration $P_w=250$ $\mu$s, a contrast ratio of 1:102 and a light transmittance in the bright state of approximately 63% were achieved.

Thus, by providing the twist state in the non-pixel regions between adjacent pixel regions to be different from the twist state provided in the pixel regions, the light transmittance in non-pixel regions can be suppressed thereby increasing the contrast ratio.

Fifteenth Embodiment

This embodiment is similar to the fourteenth embodiment. A cross sectional view of this embodiment is shown in FIG. 14. Numerical identification for identical elements in FIG. 12 are the same in FIG. 14 except that a light masking material 9 is utilized in the non-pixel regions.

Light masking members 9 comprise a chromium (Cr) lattice pattern formed on the surface of lower glass substrate 5B, which lattice pattern functions as a orthogonally arranged, light masking lattice between which members are the pixels forming together the pixel pattern. Then, acrylic resin layer 8 is formed for purposes of insulation and functioning as a planarization layer, after which ITO transparent electrode pattern 4B are formed in a parallel stripe pattern. Then, alignment layer 2B is formed on top of electrode pattern 4B and rubbed to form a rubbing direction completing the formation of lower substrate 5B. Upper substrate 5A is prepared by forming ITO transparent electrode pattern 4A on glass substrate 5A, forming $SiO_2$ insulating layer 3A on electrode pattern 4A. Then, alignment layer 2A is formed on top of electrode pattern 4A and rubbed to form a rubbing direction completing the formation of lower substrate 5A. The completed substrates 5A and 5B are mated together in spatial relation with ITO transparent electrodes 4A and 4B in facing relation with the pixels being formed in the open regions of formed lattice pattern 9.

A liquid crystal composition and an alignment film similar to those employed in the fourteenth embodiment were employed. The liquid crystal layer thickness, d, was 1.8 $\mu$m. Rubbing was performed on the one substrate in a first direction that formed a 60° angle relative to the side extent of the pixels, and rubbing was performed on the other substrate in a direction rotated 180° from the first direction, i.e., $\phi_r=180°$. When the above liquid crystal composition was provided in the structure as shown in FIG. 14, the pretilt angles at the surfaces upper and lower substrate alignment films was approximately 14° with opposite signs. Since $p_o/4<d<3p_o/4$, the initial alignment of the liquid crystal molecules in the pixels was a 180°-twisted state.

In this embodiment, the non-pixel regions were masked by a metal lattice pattern 9, such as, formed by chromium. When measurement was performed utilizing the same polarizing plate arrangement and driving waveforms utilized in the fourteenth embodiment, a contrast ratio of 1:113 and a light transmittance in the bright state of 61% were achieved.

Thus, by disposing a light masking material in the non-pixel regions between adjacent pixel regions as described above, the light transmittance in non-pixel regions can be suppressed with increased contrast ratio.

Sixteenth Embodiment

Reference is made to FIG. 17 illustrating the sixteenth embodiment of this invention. Elements in FIG. 17 of identical numerical identification with corresponding elements in FIG. 14 are the same and, therefore, their description in fourteenth embodiment is applicable here. The added feature in this embodiment is the inclusion of a matrix of color filters 10 formed in between the light masking members 9 and in line with corresponding pixels.

Color filter members 10 are formed from a color filter layer formed on lower glass substrate 5B. A light masking members 9 are formed between the formed color filter members 10. Planarization layer 8 is then formed over the color filter/light masking layer to planarize the surface after which the pattern of transparent electrodes 4B are formed on planarization layer 8. Then, alignment film 2B is formed on transparent electrodes 4B. The preparation of lower substrate 5B is completed with a rubbing process performed on alignment film 2B.

A liquid crystal display device having a twist angle, $\phi_r=180°$, and liquid crystal layer thickness, $d=1.7$ μm, is provided in the formed gap between the spatially positioned substrates by employing the liquid crystal composition and alignment film as employed in the case of Embodiment 1. The resulting color liquid crystal display device achieved good display properties and characteristics.

In the employment of a color filter in the liquid crystal display device according to this invention, a color liquid crystal display panel having high contrast ratio can be achieved. Also, the device of this embodiment can be utilized in portable display devices, portable display electronic notebooks, PDA devices, game machines, and liquid crystal TV displays.

The invention as described herein solves basic problems existing in the prior art when employing a chiral nematic liquid crystal having metastable states was used as the liquid crystal electrooptical element, which was a lack of knowledge of what effect the initial state of the liquid crystal medium, the condition, the angles P and A formed by the polarization axes of the polarizing plates, and the rubbing directions on the alignment films all had together on the contrast ratio and the ON transmittance so that when the invention of this application is employed as a display element with a multiplex driving system, a high standard display characteristic is achieved for practical application.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as fall within the spirit and scope of the appended claims.

What is claimed is:

1. A liquid crystal electrooptical element, comprising:

first and second opposing substrates;

a group of substantially parallel electrodes disposed on an interior major surface of each of said first and second substrates, wherein said electrodes define a plurality of pixel areas and at least one non-pixel area between adjacent pixel areas;

first and second alignment films formed respectively on said electrode groups of said first and second substrates having first and second alignment directions;

first and second polarizers disposed relative to an exterior major surface of each of said first and second substrates; and a liquid crystal medium interposing said electrode groups of said first and second substrates having a helical pitch $p_o$, a difference ($\Delta n$) in refractive indices of said liquid crystal medium and exhibiting a twisted structure in an initial state with an initial twist angle of approximately $\phi_r$, said liquid crystal medium relaxable to a first metastable state having a twist angle of approximately $\phi_r+180°$ and a second metastable state having a twist angle of approximately $\phi_r-180°$;

wherein a ratio of a layer thickness d of said liquid crystal medium in said pixel areas to the helical pitch of said liquid crystal medium is within the range $0.8(\phi_r)/360° \leq d/p_o \leq 1.4 (\phi_r)/360°$;

wherein polarization axes angles P, A of said first and second polarizers relative to one of the first and second alignment directions are set based on the layer thickness d, the difference ($\Delta n$) in refractive indices of said liquid crystal medium, the initial twist angle, the twist angle of said first metastable state, and the twist angle of said second metastable state, so that one of said first and second metastable states comprises an ON display state and the other of said first and second metastable states comprises an OFF display state; and wherein a layer thickness $d_o$ of said liquid crystal medium in said at least one non-pixel area is greater than said thickness d.

2. The liquid crystal electrooptical element of claim 1, wherein $\phi_r$ ranges from 160° to 200°.

3. The liquid crystal electrooptical element of claim 1, further comprising a light-masking material applied to said non-pixel regions of said pixel matrix to reduce light transmittance therethrough relative to light transmittance of said pixels.

4. A liquid crystal electrooptical element, comprising:

first and second opposing substrates;

a group of substantially parallel electrodes disposed on an interior major surface of each of said first and second substrates, wherein said electrodes define a plurality of pixel areas and at least one non-pixel area between adjacent pixel areas;

first and second alignment films formed respectively on said electrode groups of said first and second substrates having first and second respective alignment directions;

first and second polarizers disposed relative to an exterior major surface of each of said first and second substrates; and a liquid crystal medium interposing said electrode groups of said first and second substrates having a helical pitch $p_o$, a difference ($\Delta n$) in the refractive indices of said liquid crystal medium and an initial state with an initial twist angle of approximately $\phi_r$, said liquid crystal medium relaxable to a first metastable state having a first twist angle of approximately $\phi_r+180°$ and a second metastable state having a second twist angle of approximately $\phi_r-180°$, said liquid crystal medium having a layer thickness d ranging from 1.6 to 25 μm;

wherein a ratio of the layer thickness d of said liquid crystal medium in said pixel areas to the helical pitch of said liquid crystal medium is within the range $0.8(\phi_r)/360° \leq d/p_o \leq 1.4(\phi_r)/360°$;

wherein polarization axes angles P, A of said first and second polarizers relative to one of the first and second alignment directions are set based on the layer thickness d, the difference ($\Delta n$) in refractive indices of said liquid crystal medium, the initial twist angle, the twist angle of said first metastable state, and the twist angle of said second metastable state, so that one of said first and second metastable states comprises an ON display state and the other of said first and second metastable states comprises an OFF display state; and wherein a layer thickness $d_o$ of said liquid crystal medium in said at least one non-pixel area is greater than said thickness d.

5. The liquid crystal electrooptical element of claim 4, wherein $\phi_r$ ranges from 160° to 200°.

6. The liquid crystal electrooptical element of claim 4, further comprising a light-masking material applied to said non-pixel regions of said pixel matrix to reduce light transmittance therethrough relative to light transmittance of said pixels.

7. The electrooptical element of claim 1, wherein the layer thickness d of said liquid crystal medium ranges from 1.6 to 25 μm.

8. The electrooptical element of claim 1, wherein the polarization axes angles P,A of said first and second polarizers are set according to a value of the product R (=d*Δn).

9. The electrooptical element of claim 4, wherein the polarization axes angles P,A of said first and second polarizers are set according to a value of the product R (=d*Δn).

10. A liquid crystal electrooptical element, comprising:

first and second opposing substrates;

a group of substantially parallel electrodes disposed on an interior major surface of each of said first and second substrates, wherein said electrodes define a plurality of pixel areas and at least one non-pixel area between adjacent pixel areas;

first and second alignment films formed respectively on said electrode groups of said first and second substrates having first and second alignment directions;

first and second polarizers disposed relative to an exterior major surface of each of said first and second substrates; and a liquid crystal medium interposing said electrode groups of said first and second substrates having a helical pitch $p_o$, a difference (Δn) in refractive indices of said liquid crystal medium and exhibiting a twisted structure in an initial state with an initial twist angle of approximately $\phi_r$, said liquid crystal medium relaxable to a plurality of metastable states having different twist angles from that of said initial state;

wherein a ratio of a layer thickness d of said liquid crystal medium in said pixel areas to the helical pitch of said liquid crystal medium is within the range $0.8(\phi_r)/360° \leq d/p_o \leq 1.4 (\phi_r)/360°$;

wherein polarization axes angles P, A of said first and second polarizers relative to one of the first and second alignment directions are set based on the layer thickness d, the difference (Δn) in refractive indices of said liquid crystal medium, the initial twist angle, and said plurality of metastable states, so that one of said plurality of metastable states comprises an ON display state and another of said plurality of metastable states comprises an OFF display state; and wherein a layer thickness $d_o$ of said liquid crystal medium in said at least one non-pixel area is greater than said thickness d.

11. The liquid crystal electrooptical element of claim 1, wherein the liquid crystal electrooptical element is embodied in a transmission-type liquid crystal display device and wherein the contrast ratio between the ON display state and the OFF display state is equal to or greater than ten.

12. The liquid crystal electrooptical element of claim 1, wherein the liquid crystal electrooptical element is embodied in a reflection-type liquid crystal display device.

13. The liquid crystal electrooptical element of claim 4, wherein the liquid crystal electrooptical element is embodied in a transmission-type liquid crystal display device and wherein the contrast ratio between the ON display state and the OFF display state is equal to or greater than ten.

14. The liquid crystal electrooptical element of claim 4, wherein the liquid crystal electrooptical element is embodied in a reflection-type liquid crystal display device.

15. The liquid crystal electrooptical element of claim 10, wherein the liquid crystal electrooptical element is embodied in a transmission-type liquid crystal display device and wherein the contrast ratio between the ON display state and the OFF display state is equal to or greater than ten.

16. The liquid crystal electrooptical element of claim 10, wherein the liquid crystal electrooptical element is embodied in a reflection-type liquid crystal display device.

17. The liquid crystal electrooptical element of claim 1, wherein $d_o/p_o$ is greater than 0.75.

18. The liquid crystal electrooptical element of claim 1, wherein the light transmittance in said at least one non-pixel area is lower than the light transmittance in said pixel areas.

19. The liquid crystal electrooptical element of claim 4, wherein $d_o/p_o$ is greater than 0.75.

20. The liquid crystal electrooptical element of claim 4, wherein the light transmittance in said at least one non-pixel area is lower than the light transmittance in said pixel areas.

21. The liquid crystal electrooptical element of claim 10, wherein $d_o/p_o$ is greater than 0.75.

22. The liquid crystal electrooptical element of claim 10, wherein the light transmittance in said at least one non-pixel area is lower than the light transmittance in said pixel areas.

* * * * *

UNITED STATES PATENT AND TRADEMARK OFFICE
CERTIFICATE OF CORRECTION

PATENT NO. : 6,072,558
DATED : June 6, 2000
INVENTOR(S) : Takaaki Tanaka, et al.

Page 1 of 1

It is certified that error appears in the above-identified patent and that said Letters Patent is hereby corrected as shown below:

Title page,
Item [54] Title: change "Metabstable" to -- Metastable --.

Title page 2,
Item [56] References Cited, U.S. Patent Documents: insert -- 5,563,427 10/1996 Yudasaka, et al. -- and -- 4,601,544 7/1986 Cheng, et al. --

Signed and Sealed this

Fourteenth Day of August, 2001

*Attest:*

Nicholas P. Godici

*Attesting Officer*

NICHOLAS P. GODICI
*Acting Director of the United States Patent and Trademark Office*